(12) United States Patent
Tsunoda et al.

(10) Patent No.: US 10,112,440 B2
(45) Date of Patent: Oct. 30, 2018

(54) TIRE

(71) Applicant: BRIDGESTONE CORPORATION, Chuo-ku, Tokyo (JP)

(72) Inventors: Katsuhiko Tsunoda, Yokohama (JP); Yoshihide Kouno, Kodaira (JP); Seiji Kon, Kodaira (JP); Keiichi Hasegawa, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 1067 days.

(21) Appl. No.: 14/378,110

(22) PCT Filed: Feb. 14, 2013

(86) PCT No.: PCT/JP2013/053553
§ 371 (c)(1),
(2) Date: Aug. 12, 2014

(87) PCT Pub. No.: WO2013/122157
PCT Pub. Date: Aug. 22, 2013

(65) Prior Publication Data
US 2015/0007921 A1    Jan. 8, 2015

(30) Foreign Application Priority Data

Feb. 14, 2012  (JP) .................. 2012-029912
Feb. 14, 2012  (JP) .................. 2012-029913
Feb. 14, 2012  (JP) .................. 2012-029914

(51) Int. Cl.
*B60C 1/00*    (2006.01)
*B60C 5/14*    (2006.01)
(Continued)

(52) U.S. Cl.
CPC .......... *B60C 1/0008* (2013.01); *B60C 1/0041* (2013.01); *B60C 5/007* (2013.01);
(Continued)

(58) Field of Classification Search
None
See application file for complete search history.

(56) References Cited

U.S. PATENT DOCUMENTS 4,580,611 A    4/1986  Merle
4,625,785 A    12/1986 Merle
(Continued)

FOREIGN PATENT DOCUMENTS

JP    3-143701 A    6/1991
JP    4-107104 U    9/1992
(Continued)

OTHER PUBLICATIONS

Communication dated Sep. 8, 2015, issued by the Japan Patent Office in corresponding Japanese Application No. 2012-029912.
(Continued)

*Primary Examiner* — Robert C Dye
*Assistant Examiner* — Kendra Ly
(74) *Attorney, Agent, or Firm* — Sughrue Mion, PLLC

(57) ABSTRACT

A tire containing at least a circular tire frame body that is formed from a resin material and has a layered structure, wherein the tire frame body includes at least one gas retaining layer.

10 Claims, 12 Drawing Sheets

(51) Int. Cl.
 *C08L 53/00*  (2006.01)
 *C08L 53/02*  (2006.01)
 *B60C 5/01*  (2006.01)
 *B60C 5/00*  (2006.01)
 *C08L 23/16*  (2006.01)
 *C08F 216/06*  (2006.01)
 *C08G 69/14*  (2006.01)
 *C08G 69/26*  (2006.01)
 *C08L 29/04*  (2006.01)
 *C08L 77/02*  (2006.01)
 *C08L 77/06*  (2006.01)

(52) U.S. Cl.
 CPC ............... *B60C 5/01* (2013.01); *B60C 5/14* (2013.01); *C08F 216/06* (2013.01); *C08G 69/14* (2013.01); *C08G 69/26* (2013.01); *C08L 23/16* (2013.01); *C08L 29/04* (2013.01); *C08L 77/02* (2013.01); *C08L 77/06* (2013.01); *C08G 2380/00* (2013.01); *C08L 2201/14* (2013.01); *C08L 2205/02* (2013.01); *C08L 2205/03* (2013.01)

(56) References Cited

U.S. PATENT DOCUMENTS

| | | | | |
|---|---|---|---|---|
| 4,711,284 A * | 12/1987 | Schmidt | ............ | B60C 5/18 152/452 |
| 4,755,243 A | 7/1988 | Merle | | |
| 6,906,139 B2 * | 6/2005 | Matsuda | ............ | B29C 71/02 525/191 |
| 2001/0041762 A1 * | 11/2001 | Ikawa | ............ | C08L 77/00 524/262 |
| 2006/0036033 A1 * | 2/2006 | Toyoshima | ............ | C08J 5/18 525/97 |
| 2008/0047646 A1 * | 2/2008 | Hong | ............ | B60C 1/0008 152/510 |
| 2008/0314493 A1 * | 12/2008 | Hara | ............ | B60C 1/0008 152/510 |
| 2012/0152428 A1 | 6/2012 | Kouno et al. | | |
| 2012/0214943 A1 * | 8/2012 | Sato | ............ | C08L 23/283 525/57 |
| 2013/0008574 A1 | 1/2013 | Kodama et al. | | |
| 2016/0068028 A1 | 3/2016 | Kouno et al. | | |

FOREIGN PATENT DOCUMENTS

| | | |
|---|---|---|
| JP | 2002-080644 A | 3/2002 |
| JP | 2003-104008 A | 4/2003 |
| JP | 2006-159522 A | 6/2006 |
| JP | 2010-037496 A | 2/2010 |
| JP | 2010-047733 A | 3/2010 |
| JP | 2010-507510 A | 3/2010 |
| JP | 2011-042233 A | 3/2011 |
| JP | 2011-042236 A | 3/2011 |
| JP | 2012-6452 A | 1/2012 |
| RU | 2429973 C2 | 9/2011 |
| WO | 2010/095654 A1 | 8/2010 |
| WO | 2011/021702 A1 | 2/2011 |

OTHER PUBLICATIONS

Communication dated Sep. 8, 2015, issued by the Japan Patent Office in corresponding Japanese Application No. 2012-029913.
Communication dated Sep. 8, 2015, issued by the Japan Patent Office in corresponding Japanese Application No. 2012-029914.
Communication dated Dec. 9, 2015 from the Russian Intellectual Property Office in application No. 2014136807/11.
International Search Report for PCT/JP2013/053553 dated Apr. 16, 2013.
Written Opinion for PCT/JP2013/053553 dated Apr. 16, 2013.

* cited by examiner

TIRE

CROSS REFERENCE TO RELATED APPLICATIONS

This application is a National Stage of International Application No. PCT/JP2013/053553 filed Feb. 14, 2013, claiming priority based on Japanese Patent Application Nos. 2012-029912 filed Feb. 14, 2012, 2012-029913 filed Feb. 14, 2012, and 2012-029914 filed Feb. 14, 2012 the contents of all of which are incorporated herein by reference in their entirety.

TECHNICAL FIELD

The present invention relates to a tire for fitting onto a rim, and in particular relates to a tire in which at least a portion is formed from a resin material.

BACKGROUND ART

Pneumatic tires configured with rubber, organic fiber materials, steel members, and the like are traditionally employed in vehicles such as cars.

Recently, the use of resin materials, in particular thermoplastic resins, thermoplastic elastomers, and the like, as tire materials is being investigated from the perspectives of weight reduction, ease of molding, and ease of recycling.

For example, Patent Document 1 (Japanese Patent Application Laid-Open (JP-A) No. 2003-104008) and Patent Document 2 (JP-A No. H03-143701) disclose a pneumatic tire formed using a thermoplastic polymer material.

RELATED ART PUBLICATIONS

Patent Documents

Patent Document 1: JP-A No. 2003-104008
Patent Document 2: JP-A No. H03-143701

SUMMARY OF INVENTION

Technical Problem

A tire employing a thermoplastic polymer material is more easily manufactured and lower in cost than a conventional rubber-made tire. Moreover, since a tire that employs a thermoplastic polymer material has ample flexibility, and also has a simpler structure than that of a conventional rubber-made tire, this has the advantage of enabling a lighter weight tire to be manufactured.

However, although a tire that employs a thermoplastic polymer material has ample flexibility, there is still room for improvement related to the gas retaining properties, such as to air in the tire.

In a conventional pneumatic vulcanized tire, in order to improve the gas retaining properties, an IIR-based rubber (a rubbery copolymer of isobutene and isoprene (butyl rubber)) is utilized as a gas retaining layer. However, a gas retaining layer formed from IIR-based rubber is heavy, and is not appropriate to use in tires that employ a polymer material with an objective of reducing weight. When a gas retaining layer formed from IIR-based rubber is provided to a tire that employs a polymer material, a vulcanization adhesive is required to bond the gas retaining layer to the tire frame body. Employing a vulcanization adhesive to bond the gas retaining layer in this manner creates many limitations in the manufacturing process, such as limiting the vulcanization molding time.

In consideration of the above circumstances, an object of the invention is to provide a tire constituted with a resin material, is lightweight, and has excellent retaining properties to gas retained in the tire frame body.

Solution to Problem

A tire according to the invention includes at least a circular tire frame body that is formed from a resin material and has a layered structure, wherein the tire frame body includes at least one gas retaining layer.

Advantageous Effects of Invention

As explained above, according to the invention, a tire constituted with a resin material, which is lightweight, and has excellent retaining properties to gas retained in the tire frame body, can be provided.

DESCRIPTION OF EMBODIMENTS

Figure 1A:
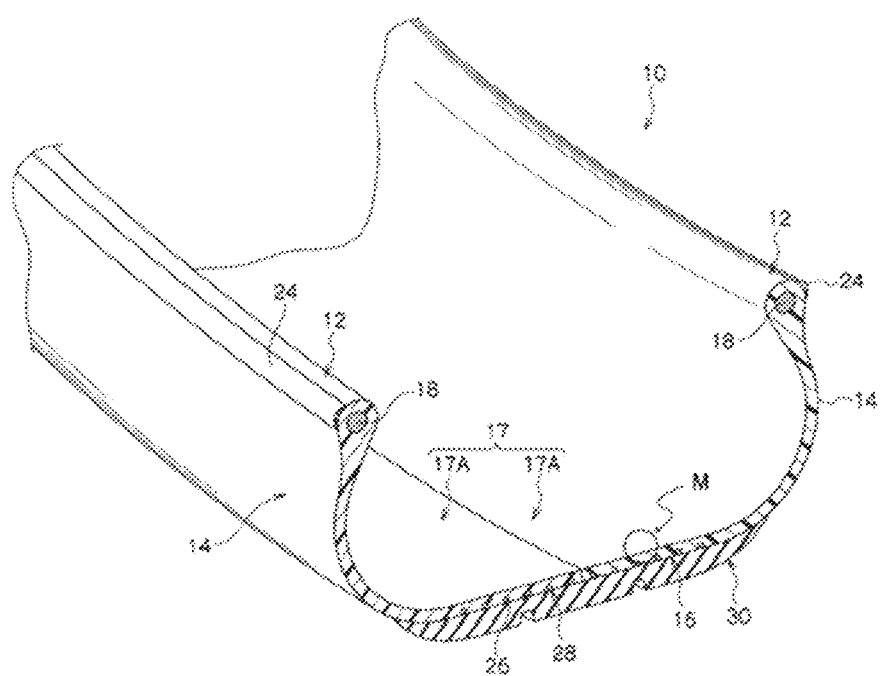
FIG. 1A is a perspective view illustrating a cross-section of a portion of a tire according to an exemplary embodiment of the invention.

As described above, a tire according to the invention includes at least a circular tire frame body that is formed from a resin material and has a layered structure, wherein the tire frame body includes at least one gas retaining layer.

The tire according to the invention includes a circular tire frame body formed from a resin material. The term "resin material" is a concept that encompasses thermoplastic resins (which also encompass thermoplastic elastomers) and thermosetting resins, and does not encompass vulcanized rubber.

Due to the tire according to the invention having a tire frame body that is formed from a resin material, the need for a vulcanization process, that was an essential process for a conventional rubber-made tire, is obviated, enabling, for example, the tire frame body to be formed by injection molding or the like. This thereby enables the manufacturing process to be simplified, enabling savings in time and cost to be achieved. Moreover, the tire frame body constituted with a resin material has a simpler structure than an ordinary conventional rubber-made tire, leading to the advantage of being lighter in weight. This thereby enables improvements in the abrasion resistance and rolling resistance of the tire.

The tire according to the invention has a tire frame body with a layered structure, and including a gas retaining layer. The tire according to the invention has a gas retaining layer in the tire frame body, enabling the gas retaining properties of the tire frame body to gases, such as air, nitrogen gas, or the like, to be improved. Thus the tire according to the invention is capable of being effectively employed in what is referred to as a pneumatic tire, in which the tire frame body is fitted onto a rim, and gas is filled into a void surrounded by the tire frame body and the rim. Raising the gas retaining properties of the tire also, at the same time, raises the internal pressure retaining properties of the tire.

Explanation follows regarding embodiments of the gas retaining layer and materials included in the gas retaining layer, and regarding resin materials included in the tire frame body according to the invention, followed by specific exemplary embodiments of the tire according to the invention, with reference to the drawings.

[Gas Retaining Layer]

The tire according to the invention includes a gas retaining layer.

The gas retaining layer may be a layer having a gas permeability coefficient at 80° C. (referred to below simply as the "gas permeability coefficient") of $2.0 \times 10^{-15}$ cm$^3$·cm/(cm$^2$·s·Pa) or less. Setting the gas permeability coefficient to $2.0 \times 10^{-15}$ cm$^3$·cm/(cm$^2$·s·Pa) or less enables sufficient improvement in the gas retaining properties of the tire frame body at a film thickness that exhibits sufficient flexibility as a tire structuring member. From the viewpoint of the gas retaining properties of the tire frame body, the gas permeability coefficient of the gas retaining layer is preferably $1.0 \times 10^{-15}$ cm$^3$·cm/(cm$^2$·s·Pa) or less. High gas retaining properties of the gas retaining layer have the advantage of also having high barrier properties to moisture.

The gas permeability coefficient of the gas retaining layer may be measured, for example, according to JIS K7126-1: 2006 (Method A: differential pressure method). More specifically, the gas permeability measuring apparatus "GTR-30X", manufactured by GTE Tec Corporation may be employed to measure the gas permeability coefficient, under conditions of cell temperature: 80° C., and absolute pressure difference: 0.30 Pa.

In the invention, the tire frame body has a layered structure of at least 2 or more layers in the tire radial direction. It is enough that the gas retaining layer may constitute a single layer or plural layers of the layered structure of the tire frame body. In such cases, from the viewpoint of the gas retaining properties, the gas retaining layer is preferably formed continuously over the entire region of the crown portion and the side portions of the tire frame body, namely over the entire region in the circumferential direction and width direction of the tire frame body. The gas retaining layer may be positioned at any of the outermost side, intermediate, or innermost side in the tire radial direction in the layered structure of the tire frame body; however, from the viewpoints of ease of design and effectively raising the gas retaining properties, the gas retaining layer is preferably positioned at inner side in the tire radial direction of the tire frame body, and more preferably positioned at the innermost side, or at the second layer position from the innermost side in the tire radial direction. In the invention, a reinforcing cord for reinforcing the tire frame body is not an essential configuration element; however, in cases in which a reinforcing cord is wound on the tire frame body, such as in embodiments described below, the gas retaining layer is preferably provided further to the radial direction inside than the reinforcing cord layer, so as not to make contact with the reinforcing cord.

The gas retaining layer preferably has a certain degree of flexibility. The flexibility of the gas retaining layer may be determined with reference to the stress under a 4% tensile elongation in a uniaxial tensile elongation test (JIS K7161-1994 Plastics-Determination of tensile properties). The stress of the gas retaining layer under a 4% tensile elongation is, from the viewpoint of improving the durability of the tire frame body and the gas retaining layer in relation to the elastic modulus of the tire frame body, preferably 70 MPa or less, and is more preferably 50 MPa or less, and particularly preferably 40 MPa or less. There is no particular lower limitation to the stress of the gas retaining layer under a 4% tensile elongation.

The thickness of the gas retaining layer is preferably as thick as possible from the viewpoint of gas retaining properties, and is preferably determined giving consideration to the flexibility (elastic modulus) of the gas retaining layer. From the viewpoints of balancing the gas retaining properties and the flexibility, the thickness of the gas retaining layer is preferably from 20 μm to 300 μm, and more preferably from 20 μm to 100 μm.

The method for forming the gas retaining layer is not particularly limited, and it may be integrally molded with the tire frame body, or material to form the gas retaining layer may be provided at the inside of the tire frame body after the shape of the tire frame body has been molded. The forming method may be by suitable application of a known method, such as co-extrusion, injection molding, blow molding or the like. In cases in which the gas retaining layer is post-attached to the tire frame body, for example, an adhesive layer may be further provided so as to bond together the gas retaining layer and the tire frame body.

The material for configuring the gas retaining layer is not particularly limited, as long as it is a material capable of achieving the gas permeability coefficient mentioned above; however, from the viewpoints of reducing the weight of the tire, and the durability of the tire frame body and the gas retaining layer, a resin material is preferably employed, and a thermoplastic resin is particularly preferably employed. Here, the term "resin material" is a concept that encompasses thermoplastic resins and thermosetting resins, and does not encompass vulcanized rubber. Examples of the thermosetting resin include, for example, phenolic resins, urea resins, melamine resins, epoxy resins, polyamide resins and the like.

Examples of the thermoplastic resin include, for example, urethane resins, olefin resins, vinyl chloride resins, and polyamide resins. Among these, a thermoplastic polyamide-based resin or an ethylene-vinyl alcohol copolymer (sometimes referred to below as "EVOH") is preferable as the thermoplastic resin employed in the gas retaining layer from the viewpoint of gas barrier properties. As the thermoplastic polyamide-based resin, from the viewpoint of gas barrier properties, preferably a polyamide that is a ring-opened polycondensate of ε-caprolactam (sometimes referred to below as "polyamide 6"), or a polyamide having m-xylenediamine as a structural unit (sometimes referred to below as "polyamide MX") is employed, and, in consideration of heat resistance, polyamide 6 is preferable.

<Ethylene-Vinyl Alcohol Copolymer (EVOH)>

The ethylene-vinyl alcohol copolymer is not particularly limited, and among the ethylene-vinyl alcohol copolymers, the characteristics thereof approach those of polyethylene as a proportion of ethylene in the composition becomes larger and a proportion of the vinyl alcohol in the composition becomes smaller. Thus, although the flexibility of the EVOH itself is improved, the melting point is lowered and that the gas barrier properties are impaired. On the other hand, as a proportion of the ethylene in the composition becomes smaller, and a proportion of the vinyl alcohol in the composition becomes larger, effect on the flexibility becomes impaired; however, the melting point rises, and there is a large improvement in the gas barrier properties. In consideration of balance of the flexibility and gas barrier properties of the EVOH, the ethylene content in the EVOH is preferably approximately from 28% by mol to 40% by mol.

The ethylene-vinyl alcohol copolymer may be employed singly, or in a combination of two or more types thereof, having different molecular weights, composition ratios or the like.

The flowability of the EVOH in consideration of molding workability of the EVOH and in particular the extrusion stability as a thin film, is preferably an MFR value measured at 250° C. under a load of 5005 g according to ASTMD 1238 (referred to below as "MFR (250° C./5005 g)") of 3.0 or more. There is no particular limitation to the upper limit of the MFR (250° C./5005 g) of the EVOH, and it is normally 20 or less.

Commercial products, such as "EVAL" series E-104, F-101, G-151, manufactured by Kuraray Co., Ltd., may be employed as the EVOH, and from the viewpoint of gas barrier properties, preferably a product is selected with an ethylene content of 50% or less.

The gas retaining layer may be configured to include an ethylene-vinyl alcohol copolymer and an elastomer. Configuring the gas retaining layer to include an ethylene-vinyl alcohol copolymer and an elastomer enables the flexibility of the gas retaining layer to be raised, in comparison to cases in which the gas retaining layer is formed employing an ethylene-vinyl alcohol copolymer alone. Moreover, due to the strength and adhesiveness of a gas retaining layer including an ethylene-vinyl alcohol copolymer and an elastomer being sufficient, there is the advantage that this enables the gas retaining layer to be thinner.

In an embodiment employing a combination of an ethylene-vinyl alcohol copolymer and an elastomer, the gas permeability coefficient of the gas retaining layer at 80° C. is preferably $7.5 \times 10^{-14}$ cm$^3$·cm/(cm$^2$·s·Pa) or less. Setting the gas permeability coefficient of the gas retaining layer to $7.5 \times 10^{-14}$ cm$^3$·cm/(cm$^2$·s·Pa) or less enables the gas retaining properties of the tire frame body to be sufficiently improved. From the viewpoint of the gas retaining properties of the tire frame body, the gas permeability coefficient of the gas retaining layer is more preferably $7.5 \times 10^{-15}$ cm$^3$·cm/(cm$^2$·s·Pa). High gas retaining properties of the gas retaining layer has the advantage that the barrier properties to moisture are also high.

In the above embodiment, preferably the gas retaining layer has a certain degree of flexibility. The flexibility of the gas retaining layer may be determined with reference to the stress under a 4% tensile elongation in a uniaxial tensile elongation test (JIS K7161-1994 Plastics-Determination of tensile properties). The elastic modulus of the gas retaining layer is, from the viewpoint of improving the durability of the tire frame body and the gas retaining layer in relation to the elastic modulus of the tire frame body, preferably stress under a 4% tensile elongation of 40 MPa or less, and more preferably 30 MPa or less. There is no particular lower limitation to the stress of the gas retaining layer under a 4% tensile elongation.

In an embodiment employing a combination of an ethylene-vinyl alcohol copolymer and an elastomer, the ethylene-vinyl alcohol copolymer is not particularly limited, and among the ethylene-vinyl alcohol copolymers, the characteristics thereof approach those of polyethylene as a proportion of ethylene in the composition becomes larger and a proportion of the vinyl alcohol in the composition becomes smaller. Thus, although the flexibility of the EVOH itself is improved, the melting point is lowered, and that the gas barrier properties are impaired. On the other hand, as a proportion of the ethylene in the composition becomes smaller, and a proportion of the vinyl alcohol in the composition becomes larger, effect on the flexibility becomes impaired; however, the melting point rises, and there is a large improvement in the gas barrier properties. In consideration of balance of the flexibility and gas barrier properties of the EVOH, the ethylene content in the EVOH is preferably approximately from 25% by mol to 50% by mol, and is preferably from 27% by mol to 40% by mol.

The ethylene-vinyl alcohol copolymer may be employed singly, or in a combination of two or more types thereof, having different molecular weights, composition ratios or the like.

In an embodiment employing a combination of an ethylene-vinyl alcohol copolymer and an elastomer, commercial products, such as "EVAL" series L-101, F-101, H-101, E-105, and G-156, manufactured by Kuraray Co., Ltd., may be employed as the EVOH.

In an embodiment employing a combination of an ethylene-vinyl alcohol copolymer and an elastomer, from the viewpoint of gas barrier properties, the gas permeability coefficient of the ethylene-vinyl alcohol copolymer is preferably $7.5 \times 10^{-14}$ cm$^3$·cm/(cm$^2$·s·Pa) or less, and is more preferably $7.5 \times 10^{-15}$ cm$^3$·cm/(cm$^2$·s·Pa) or less.

<Elastomer>

There is no particular limitation to the elastomer that may be employed in the gas retaining layer, and, for example, a thermoplastic elastomer may be employed. Examples of the thermoplastic elastomer include thermoplastic polyamide-based elastomers (TPA), thermoplastic polyester-based elastomers (TPC), thermoplastic polyolefin-based elastomers (TPO), thermoplastic polystyrene-based elastomers (TPS), thermoplastic polyurethane-based elastomers (TPU), and thermoplastic cross-linked rubbers (TPV), as well as other thermoplastic elastomers (TPZ), as defined in JIS K6418, and is preferably a thermoplastic polyolefin-based elastomer.

The flexibility of the elastomer may be determined with reference to the stress under a 4% according to JIS K7161-1994 Test Method for Tensile Properties of Plastics. The stress of the elastomer under a 4% tensile elongation is, from the viewpoint of improving the durability of the tire frame body and the gas retaining layer in relation to the elastic modulus of the tire frame body, preferably 10 MPa or less, and is more preferably 5 MPa or less.

Examples of the thermoplastic polyolefin-based elastomer include, for example, an ethylene-butene copolymer, an ethylene-propylene copolymer (EPR), a modified ethylene-butene copolymer, an ethylene-ethyl acrylate copolymer (EEA), a modified EEA, a modified EPR, a modified ethylene-propylene-diene ternary copolymer (EPDM), an ionomer, an α-olefin copolymer, a modified isoprene rubber (IR), a modified styrene-ethylene-butylene-styrene copolymer (SEBS), a halogenated isobutylene-paramethylstyrene copolymer, acrylic acid-modified ethylene, an ethylene-vinyl acetate copolymer, and acid-modified products thereof, and mixtures including these as main components. These may be employed singly, or in a mixture of two or more thereof.

A modified elastomer, or a mixture of a modified elastomer and an unmodified elastomer, may be employed as the elastomer. In particular, a modified product modified with an acid anhydride such as maleic acid anhydride, an acrylic acid alkylester such as glycidyl methacrylate, an epoxy or a modified product thereof, enable a fine alloy structure to be obtained with ethylene-vinyl alcohol copolymer as the base polymer, and so are preferable.

In the gas retaining layer, in a case in which the content of the elastomer with respect to the ethylene-vinyl alcohol copolymer is too small, then sufficient improvement effect in flexibility and durability due to compounding with a polyolefin cannot be obtained; however, in a case in which the content is too large, then sometimes the sea phase and the island phase reverse in the sea-island structure, described below, and the gas barrier properties may be impaired. The content ratio of the elastomer with respect to the ethylene-vinyl alcohol copolymer is accordingly preferably from 10% by volume to 48% by volume, and is more preferably from 25% by volume to 45% by volume.

Note that in cases in which a modified elastomer, such as an acid-modified elastomer, is employed as the elastomer, advantageous effects are obtained of using small amounts of specific energy during mixing and kneading (dispersion), and not requiring high technology for mixing and kneading; however, when the compounded amount thereof is large then gelification of the resin may occur, and a poor external appearance such as roughness (fish eyes) may occur during extrusion. From these viewpoints, in cases in which a modified elastomer is employed as the elastomer, the content of the modified elastomer in the ethylene-vinyl alcohol copolymer is preferably 20% by volume or less, for example from 5% by volume to 20% by volume. In particular, in the invention, preferably 40% by volume to 100% by volume of the elastomer in the ethylene-vinyl alcohol copolymer is acid-modified elastomer.

Generally an ethylene-vinyl alcohol copolymer and various elastomers, such as the polyolefin-based elastomer described above, are not compatible with each other. In the invention, forming a compatible state, namely a well dispersed state, in such an incompatible system, achieves an objective of the invention. However, to form a compatible state, it is important to modify at least a portion of the elastomer, with maleic acid anhydride or the like, and the average acid value (acid modification ratio) of the total elastomer employed to obtain the well dispersed form is preferably 3.0 mg-CH$_3$ONa/g or more.

The higher the acid value of the elastomer, the better the dispersed form; however, the viscosity of the ethylene-vinyl alcohol copolymer obtained increases as the acid value increases, the effect on the molding workability becomes impaired. Therefore, in order to reduce any increase in viscosity due to such an increase in acid value, the acid value of the elastomer is preferably at the lower within the range capable of obtaining the well dispersed state, and so the average acid value of the total elastomer employed is preferably 7.5 mg-CH$_3$ONa/g or less.

Even with the same average acid value, in cases in which the acid value of the modified elastomer contained in the elastomer employed is high, even if the average acid value is lowered by mixing such a modified elastomer with an unmodified elastomer, a foreign gelled substance may occur, thought to be due to localized hyperactivation during extrusion. The acid value of the modified elastomer employed is accordingly preferably 15.0 mg-CH$_3$ONa/g or less.

Namely, for example, according to the comparison between a mixed elastomer A having an average acid value of the total elastomer of approximately 5 (=30×17/100) which is obtained by mixing an acid-modified elastomer having an acid value of 30 mg-CH$_3$ONa/g with an unmodified elastomer at a weight ratio of 17:83, and a mixed elastomer B having an average acid value of the total elastomer of 5 which is obtained by mixing an acid-modified elastomer having an acid value of 10 with an unmodified elastomer at a weight ratio of 50:50, the working stabilities are greatly different even though the viscosity and dispersion size of the ethylene-vinyl alcohol copolymers obtained therefrom appear to be equivalent. In the mixed elastomer A, a foreign gelled substance occasionally occurs during extrusion. On the other hand, good stability can be obtained with the mixed elastomer B. The acid value of the modified elastomer employed is accordingly preferably 15.0 mg-CH$_3$ONa/g or less. Note that the lower limit to the acid value of the modified elastomer is the lower limit of the average acid value of the elastomer described above, of 3 mg-CH$_3$ONa/g.

Commercial products may be employed as the unmodified elastomer, such as, for example, the "TAFMER A" series of α-olefin elastomers, manufactured by Mitsui Chemicals, Inc. Commercial products may be employed as the acid-modified elastomer, such as, for example, the "TAFMER M" series of α-olefin elastomers, manufactured by Mitsui Chemicals, Inc.

<Salami Structure>

The flexibility and durability is improved by compounding an elastomer with the ethylene-vinyl alcohol copolymer; however, a drop in the gas barrier properties is unavoidable. However, by forming a fine alloy structure of the ethylene-vinyl alcohol copolymer and the elastomer, and in particular by adopting what is referred to as a salami structure, in which an elastomer island phase is dispersed in a sea phase of ethylene-vinyl alcohol copolymer, and also ethylene-vinyl alcohol copolymer is dispersed in scattered dot shapes within the island phase of the elastomer (a pond phase), any drop in the gas barrier properties due to compounding the elastomer can be suppressed, and so this structure is preferable.

The proportion of the ethylene-vinyl alcohol copolymer phase present in scattered dot shapes within the island phase of the elastomer (pond phase) with respect to the total amount of the ethylene-vinyl alcohol copolymer (the sum of the ethylene-vinyl alcohol copolymer configuring the sea phase and the ethylene-vinyl alcohol copolymer present in scattered dot shapes within the island phase of the elastomer (pond phase)) (this proportion is referred to below as the "scattered dot shape dispersion ratio") is preferably approximately from 2.5% by volume to 30% by volume, and is more preferably from 5% by volume to 20% by volume. Setting this proportion in the range of from 2.5% by volume to 30% by volume enables sufficient effect to be obtained by the presence of the scattered dot shapes of the ethylene-vinyl alcohol copolymer phase within the island phase of the elastomer, and enables the gas barrier properties to be suppressed from falling due to the ethylene-vinyl alcohol copolymer phase, serving as the sea phase, becoming too small.

Regarding the size of the island phase of the elastomer, and the size of the ethylene-vinyl alcohol copolymer phase within the elastomer island phase, the size of the elastomer island phase is preferably approximately from 0.4 μm to 4.0 μm. The size of the ethylene-vinyl alcohol copolymer phase (pond phase) present as scattered dot shapes within the island phase of the elastomer is preferably approximately from 0.05 μm to 1.0 μm, and more preferably from 0.1 μm to 0.5 μm. The size of each phase may, for example, be measured by a scanning electron microscope.

The ethylene-vinyl alcohol copolymer may include, as a resin component, a resin component other than the ethylene-vinyl alcohol copolymer, and in such cases, in order to secure the gas barrier properties, the ethylene-vinyl alcohol copolymer is preferably 70% by mass or greater of the total resin component in the ethylene-vinyl alcohol copolymer.

A mixture of ethylene-vinyl alcohol copolymer and an elastomer, and in particular a mixture of an ethylene-vinyl alcohol copolymer and an elastomer having morphology of a sea-island structure such as described above, may be manufactured by, for example, the following methods (1) or (2).

(1) A method in which an ethylene-vinyl alcohol copolymer and a polyolefin are mixed together at a specific compounding ratio and kneaded to produce a master batch, then the master batch and an ethylene-vinyl alcohol copolymer are mixed and kneaded.

(2) A method in which an ethylene-vinyl alcohol copolymer and a polyolefin blend are melt-kneaded by high-shear.

Examples of combinations of the ethylene-vinyl alcohol copolymer and an elastomer to form the salami structure include a combination of commercial products EVOH "L-101", manufactured by Kuraray Co., Ltd., and "TAF-MER MH7010", manufactured by Mitsui Chemicals, Inc. (compounding ratio: 60:40 (by volume)); or a combination of commercial products EVOH "F-101", manufactured by Kuraray Co., Ltd., and "HPR AR201", manufactured by Du Pont-Mitsui Polychemicals Co., Ltd. (compounding ratio: 60:40 (by volume)).

<Thermoplastic Polyamide-Based Resin>

Examples of the thermoplastic polyamide-based resin include polyamides that configure the hard segment of a thermoplastic polyamide-based elastomers described below. Preferable examples of the thermoplastic polyamide-based resin employed in the gas retaining layer, from the viewpoint of gas barrier properties, include a polyamide (polyamide 6) that is a ring-opened polycondensate of ε-caprolactam, or a polyamide having m-xylenediamine as a structural unit (polyamide MX), and is preferably polyamide 6 in consideration of heat resistance.

The polyamide 6 may be represented by, for example, $\{CO-(CH_2)_5-NH\}_n$. The polyamide MX having m-xylenediamine as a structural unit may be represented by, for example, the structural Formula (A-1) below (wherein n in (A-1) represents the number of repeating monomer units). A commercial product such as "UBE Nylon" 1022B or 1011FB, manufactured by Ube Industries, Ltd., may, for example, be employed as the polyamide 6. A commercial product, such as MX Nylon-S S6011, S6021, or S6001, manufactured by Mitsubishi Gas Chemical Company, Inc., may, for example, be employed as the polyamide MX.

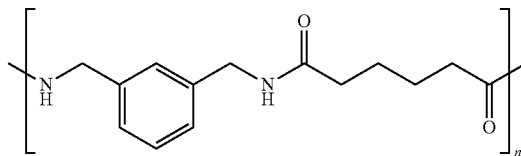

The thermoplastic polyamide-based resin may be a homopolymer configured by only the structural unit described above, or may be a copolymer of the structural unit described above and other monomer. In the case of a copolymer, the content ratio of the structural unit described above in each thermoplastic polyamide-based resin is preferably 60% by mass or more.

As material included in the gas retaining layer, a resin composition including the thermoplastic polyamide-based resin and the elastomer described above may be employed.

In such cases, the tire according to the invention may be configured including at least a circular tire frame body that is formed from a resin material and has a layered structure, wherein the tire frame body includes at least one gas retaining layer that includes the resin composition consisting of a thermoplastic polyamide-based resin and an elastomer, and that has a gas permeability coefficient of $2.0\times10^{-14}$ $cm^3 \cdot cm/(cm^2 \cdot s \cdot Pa)$ or less at 80° C.

In cases in which a combination of a thermoplastic polyamide-based resin and an elastomer is employed, including the thermoplastic polyamide-based resin and the elastomer enables the flexibility of the gas retaining layer to be raised compared to cases in which the gas retaining layer is formed by employing a thermoplastic polyamide-based resin alone. A gas permeability coefficient of the gas retaining layer larger than $2.0\times10^{-14}$ $cm^3 \cdot cm/(cm^2 \cdot s \cdot Pa)$ prevents sufficient improvement in the gas retaining properties of the tire frame body from being achieved.

In cases in which a combination of a thermoplastic polyamide-based resin and an elastomer is employed, the gas permeability coefficient of the gas retaining layer (the gas permeability coefficient of the resin composition) is preferably $1.0\times10^{-14}$ $cm^3 \cdot cm/(cm^2 \cdot s \cdot Pa)$ or less. Setting the gas permeability coefficient to $1.0\times10^{-14}$ $cm^3 \cdot cm/(cm^2 \cdot s \cdot Pa)$ or less enables sufficient improvement to be made in the gas retaining properties of the tire frame body. High gas retaining properties of the gas retaining layer has the advantage of also having high barrier properties to moisture.

In cases in which a combination of a thermoplastic polyamide-based resin and an elastomer is employed, the gas permeability coefficient of the employed thermoplastic polyamide-based resin is preferably, from the viewpoint of gas barrier properties, $2.0\times10^{-14}$ $cm^3 \cdot cm/(cm^2 \cdot s \cdot Pa)$ or less, and more preferably $1\times10^{-14}$ $cm^3 \cdot cm/(cm^2 \cdot s \cdot Pa)$ or less <Elastomer>

In cases in which a combination of a thermoplastic polyamide-based resin and an elastomer is employed, there is no particular limitation to the elastomer that may be employed in the gas retaining layer, and, for example, a thermoplastic elastomer may be employed. Examples of the thermoplastic elastomer include thermoplastic polyamide-based elastomers (TPA), thermoplastic polyester-based elastomers (TPC), thermoplastic polyolefin-based elastomers (TPO), thermoplastic polystyrene-based elastomers (TPS), thermoplastic polyurethane-based elastomers (TPU), and thermoplastic cross-linked rubbers (TPV), as well as other thermoplastic elastomers (TPZ), as defined in JIS K6418, and is preferably a thermoplastic polyolefin-based elastomer.

The flexibility of the elastomer may be determined with reference to the stress under a 4% tensile elongation according to JIS K7161-1994 Test Method for Tensile Properties of Plastics. The stress of the elastomer under a 4% tensile elongation is, from the viewpoint of improving the durability of the tire frame body and the gas retaining layer in relation to the elastic modulus of the tire frame body, preferably a stress under a 4% tensile elongation of 10 MPa or less, and is more preferably 5 MPa or less.

Examples of the thermoplastic polyolefin-based elastomer include an ethylene-butene copolymer, an ethylene-propylene copolymer (EPR), a modified ethylene-butene copolymer, an ethylene-ethyl-acrylate copolymer (EEA), a modified EEA, a modified EPR, a modified ethylene-propylene-diene ternary copolymer (EPDM), an ionomer, an α-olefin copolymer, a modified isoprene rubber (IR), a modified styrene-ethylene-butylene-styrene copolymer (SEBS), a halogenated isobutylene-paramethylstyrene copolymer, acrylic acid-modified ethylene, an ethylene-vinyl acetate copolymer, and acid-modified products thereof, and mixtures including these as main components. These may be employed singly, or in a mixture of two or more thereof.

A modified elastomer, or a mixture of a modified elastomer and an unmodified elastomer, may be employed as the elastomer. In particular, a modified product modified with an acid anhydride such as maleic acid anhydride, an acrylic acid alkylester such as glycidyl methacrylate, an epoxy or a modified product thereof, enable a fine alloy structure to be obtained with the thermoplastic polyamide-based resin as the base polymer, and so are preferable.

In the gas retaining layer, in a case in which the content of the elastomer with respect to the thermoplastic polyamide-based resin is too small, then sufficient improvement effect in flexibility and durability due to compounding with a polyolefin cannot be obtained; however, in a case in which the content is too large, then sometimes the sea phase and the island phase reverse in the sea-island structure, described below, and the gas barrier properties become impaired. The content ratio of the elastomer with respect to the thermoplastic polyamide-based resin is accordingly preferably from 10% by volume to 48% by volume, and is more preferably from 20% by volume to 45% by volume.

Note that in cases in which a modified elastomer, such as an acid-modified elastomer, is employed as the elastomer, advantageous effects are obtained of using small amounts of specific energy during mixing and kneading (dispersion), and not requiring high technology for mixing and kneading; however, when the compounded amount thereof is large then gelification of the resin may occurs, and a poor external appearance such as roughness (fish eyes) may occur during extrusion. From these viewpoints, in cases in which a modified elastomer is employed as the elastomer, the content of the modified elastomer in the thermoplastic polyamide-based resin is preferably 20% by volume or less, for example from 5% by volume to 20% by volume. In particular, in the invention, preferably 40% by volume to 100% by volume of the elastomer in the thermoplastic polyamide-based resin is acid-modified elastomer.

Generally a thermoplastic polyamide-based resin and various elastomers, such as the polyolefin-based elastomer described above, are not compatible with each other. In the invention, forming a compatible state, namely a well dispersed state, in such an incompatible system, achieves an objective of the invention. However, to form a compatible state, it is important to modify at least a portion of the elastomer, with maleic acid anhydride or the like, and the average acid value (acid modification ratio) of the total elastomer employed to obtain the well dispersed form is preferably 3.0 mg-$CH_3ONa$/g or more.

The higher the acid value of the elastomer, the better the dispersed form; however, the viscosity of the thermoplastic polyamide-based resin obtained increases as the acid value increases, the effect on the molding workability becomes impaired. Therefore, in order to reduce any increase in viscosity due to such an increase in acid value, the acid value of the elastomer is preferably at the lower within the range capable of obtaining the well dispersed state, and so the average acid value of the total elastomer employed is preferably 7.5 mg-$CH_3ONa$/g or less.

Even with the same average acid value, in cases in which the acid value of the modified elastomer contained in the elastomer employed is high, even if the average acid value is lowered by mixing such a modified elastomer with an unmodified elastomer, a foreign gelled substance may occur, thought to be due to localized hyperactivation during extrusion. The acid value of the modified elastomer employed is accordingly preferably 15.0 mg-$CH_3ONa$/g or less.

Namely, for example, according to the comparison between a mixed elastomer A having an average acid value of the total elastomer of approximately 5 (=30×17/100) which is obtained by mixing an acid-modified elastomer having an acid value of 30 mg-$CH_3ONa$/g with an unmodified elastomer at a weight ratio of 17:83, and a mixed elastomer B having an average acid value of the total elastomer of 5 which is obtained by mixing an acid-modified elastomer having an acid value of 10 with an unmodified elastomer at a weight ratio of 50:50, the working stabilities are greatly different even though the viscosity and dispersion size of the thermoplastic polyamide-based resin obtained therefrom appear to be equivalent. In the mixed elastomer A, a foreign gelled substance occasionally occurs during extrusion. On the other hand, good stability can be obtained with the mixed elastomer B. The acid value of the modified elastomer employed is accordingly preferably 15.0 mg-$CH_3ONa$/g or less. Note that the lower limit to the modified elastomer acid value is the lower limit of the average acid value of the elastomer described above, of 3 mg-$CH_3ONa$/g.

Commercial products may be employed as the unmodified elastomer, such as, for example, the "TAFMER A" series of α-olefin elastomers, manufactured by Mitsui Chemicals, Inc. Commercial products may be employed as the acid-modified elastomer, such as, for example, the "TAFMER M" series of α-olefin elastomers, manufactured by Mitsui Chemicals, Inc.

<Salami Structure>

The flexibility and durability is improved by compounding an elastomer with the thermoplastic polyamide-based resin; however, a drop in the gas barrier properties is unavoidable. However, by forming a fine alloy structure of the thermoplastic polyamide-based resin and the elastomer, and in particular by adopting what is referred to as a salami structure, in which an elastomer island phase is dispersed in a sea phase of thermoplastic polyamide-based resin, and also thermoplastic polyamide-based resin is dispersed in scattered dot shapes within the island phase of the elastomer (a pond phase), any drop in the gas barrier properties due to compounding the elastomer can be suppressed, and so this structure is preferable.

The proportion of the thermoplastic polyamide-based resin phase present in scattered dot shapes within the island phase of the elastomer (pond phase) with respect to the total amount of the thermoplastic polyamide-based resin (the sum of the thermoplastic polyamide-based resin configuring the sea phase and the thermoplastic polyamide-based resin present in scattered dot shapes within the island phase of the elastomer (pond phase)) (this proportion is referred to below as the "scattered dot shape dispersion ratio") is preferably approximately from 2.5% by volume to 30% by volume, and is more preferably from 3% by volume to 20% by volume. Setting this proportion in the range of from 2.5% by volume to 30% by volume enables sufficient effect to be obtained by the presence of the scattered dot shapes of the thermoplastic polyamide-based resin phase within the island phase of the elastomer, and enables the gas barrier properties to be suppressed from falling due to the thermoplastic polyamide-based resin phase, serving as the sea phase, becoming too small.

Regarding the size of the island phase of the elastomer, and the size of the thermoplastic polyamide-based resin phase within the elastomer island phase, the size of the elastomer island phase is preferably approximately from 0.4 µm to 4.0 µm. The size of the thermoplastic polyamide-based resin phase (pond phase) present as scattered dot shapes within the island phase of the elastomer is preferably approximately from 0.05 µm to 1.0 µm, and more preferably from 0.1 µm to 0.5 µm. The size of each phase may, for example, be measured by a scanning electron microscope.

The thermoplastic polyamide-based resin may include, as a resin component, a resin component other than the thermoplastic polyamide-based resin, and in such cases, in order to secure the gas barrier properties, the thermoplastic polyamide-based resin is preferably 70% by mass or greater of the total resin component in the thermoplastic polyamide-based resin.

A mixture of thermoplastic polyamide-based resin and an elastomer, and in particular a mixture of a thermoplastic polyamide-based resin and an elastomer having morphology of a sea-island structure such as described above, may be manufactured by, for example, the following methods (1) or (2).

(1) A method in which a thermoplastic polyamide-based resin and a polyolefin are mixed together at a specific compounding ratio and kneaded to produce a master batch, then the master batch and a thermoplastic polyamide-based resin are mixed and kneaded.

(2) A method in which a thermoplastic polyamide-based resin and a polyolefin blend are melt-kneaded by high-shear.

Examples of a combination of the thermoplastic polyamide-based resin and an elastomer to form the salami structure include, for example, a combination of commercial products "Nylon 6 1022B", manufactured by Ube Industries, Ltd., and "TAFMER MH7010", manufactured by Mitsui Chemicals, Inc. (compounding ratio: 65:45 (by volume)).

The gas retaining layer is preferably configured using only materials (gas barrier components) that achieve the gas permeability coefficient of the gas retaining layer, such as the above resin materials; however, an anti-aging layer, or additives, such as an antioxidant, may be included if required. In such cases, the content of the gas barrier components in the gas retaining layer is, from the viewpoint of the gas retaining properties of the gas retaining layer, preferably 51% by volume or greater, and more preferably 55% by volume or greater, with respect to the total solid content. The content of the additives is preferably 5% by mass or less, and is normally approximately from 0.2 to 3.0% by mass, with respect to the total solid content.

[Resin Material]

Explanation next follows regarding a resin material for forming the tire frame body. The term "resin material" is a concept that encompasses thermoplastic resins (which also encompass thermoplastic elastomers) and thermosetting resins; and it does not encompass vulcanized rubber.

Examples of the thermosetting resin include, for example, phenolic resins, urea resins, melamine resins, epoxy resins, polyamide resins, ester resins and the like.

Examples of the thermoplastic resin include, for example, urethane resins, olefin resins, vinyl chloride resins, polyamide resins, ester resins and the like.

A thermoplastic elastomer generally refers to a thermoplastic resin material formed by a copolymer including a polymer that constitutes a hard segment that is crystalline and has a high melting point, and a polymer that constitutes a soft segment that is amorphous and has a low glass transition temperature. Examples of the thermoplastic elastomer include, for example, thermoplastic polyamide-based elastomers (TPA), thermoplastic polyester-based elastomers (TPC), thermoplastic polyolefin-based elastomers (TPO), thermoplastic polystyrene-based elastomers (TPS), thermoplastic polyurethane-based elastomers (TPU), and thermoplastic cross-linked rubbers (TPV), as well as other thermoplastic elastomers (TPZ), as defined in JIS K6418:2007. In consideration of elasticity required during running, formability during manufacture, and the like, the tire frame body preferably employs a thermoplastic resin as the resin material, and more preferably employs a thermoplastic elastomer. In cases in which a thermoplastic amide-based resin or EVOH is employed as the gas retaining layer, a thermoplastic polyamide-based elastomer is particularly preferably employed.

In the following resin materials, reference to the same type indicates modes of both being ester-based, both being styrene-based, or the like.

<Thermoplastic Polyamide-Based Elastomer>

The thermoplastic polyamide-based elastomer refers to a thermoplastic resin material that is formed by a copolymer including a polymer that constitutes a hard segment that is crystalline and has a high melting point, and a polymer that constitutes a soft segment that is amorphous and has a low glass transition temperature, wherein the polymer that constitutes the hard segment has amide bonds (—CONH—) in the main chain thereof. Examples of the polyamide-based thermoplastic elastomer include, for example, thermoplastic amide-based elastomers (TPA) as defined in JIS K6418: 2007, and thermoplastic polyamide-based elastomers as described in JP-A No. 2004-346273.

Examples of the thermoplastic polyamide-based elastomer include materials in which at least a polyamide constitutes a hard segment that is crystalline and has a high melting point, and other polymer (such as, for example, a polyester, or a polyether) constitutes a soft segment that is amorphous and has a low glass transition temperature. The thermoplastic polyamide-based elastomer may also employ a chain extender, such as a dicarboxylic acid, as well as the hard segment and the soft segment. Examples of polyamides forming the hard segment may include polyamides generated with a monomer represented by the following Formula (1) or Formula (2).

$$H_2N-R^1-COOH \qquad \text{Formula (1)}$$

In Formula (1), $R^1$ represents a hydrocarbon molecular chain having a carbon number of from 2 to 20, or a alkylene group having a carbon number of from 2 to 20.

Formula (2)

In Formula (2), $R^2$ represents a hydrocarbon molecular chain having a carbon number of from 3 to 20, or an alkylene group having a carbon number of from 3 to 20.

In Formula (1), $R^1$ is preferably a hydrocarbon molecular chain having a carbon number of from 3 to 18 or an alkylene group having a carbon number of from 3 to 18, further preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15. In addition, in Formula (2), $R^2$ is preferably a hydrocarbon molecular chain having a carbon number of from 3 to 18 or an alkylene group having a carbon number of from 3 to 18, further preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15.

Examples of the monomer represented by Formula (1) or Formula (2) include ω-aminocarboxylic acid and lactam. In addition, examples of the polyamide forming the hard segment include a polycondensate of these ω-aminocarboxylic acid or lactam, a ω-condensation polymer of diamine and dicarboxylic acid, and the like.

Examples of the ω-aminocarboxylic acid may include an aliphatic ω-aminocarboxylic acid having a carbon number of from 5 to 20 such as 6-aminocaproic acid, 7-aminoheptanoic acid, 8-aminooctanoic acid, 10-aminocapric acid, 11-aminoundecanoic acid and 12-aminododecanoic acid, and the like. In addition, examples of the lactam may include an aliphatic lactam having a carbon number of from 5 to 20 such as lauryl lactam, ε-caprolactam, undecanolactam, ω-enantholactam and 2-pyrrolidone, and the like.

Examples of the diamine may include diamine compounds such as aliphatic diamines having a carbon number 2 to 20, e.g., ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine and m-xylene diamine. In addition, the dicarboxylic acid may be represented by HOOC—$(R^3)$m-COOH ($R^3$ is a hydrocarbon molecular chain having a carbon number of from 3 to 20, and m is 0 or 1), and may include, for example, aliphatic dicarboxylic acids having a carbon number of from 2 to 20 such as oxalic acid, succinic acid, glutaric acid, adipic acid, pimelic acid, suberic acid, azelaic acid, sebacic acid and dodecanedioic acid.

As the polyamide forming the hard segment, polyamides obtained by ring-opening polycondensation of lauryl lactam, ε-caprolactam or undecanolactam may be preferably used.

In addition, examples of the soft segment-forming polymer include polyester, polyether, and include, for example, polyethylene glycol, polypropylene glycol, polytetramethylene ether glycol, ABA type triblock polyether, and the like, which may be used alone or in a combination of 2 or more kinds thereof. In addition, polyether diamine obtained by reacting ammonia, and the like to the end of polyether, and the like may be used.

Herein, the "ABA type triblock polyether" means a polyether represented by the following Formula (3).

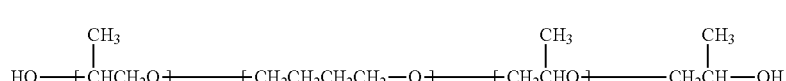

Formula (3)

In Formula (3), x and z represent an integer of 1 to 20. y represents an integer of 4 to 50.

In Formula (3), x and z are preferably an integer of 1 to 18, respectively, further preferably an integer of 1 to 16, and particularly preferably an integer of 1 to 14, and most preferably an integer of 1 to 12. In addition, in Formula (3), y is preferably an integer of 5 to 45, respectively, further preferably an integer of 6 to 40, and particularly preferably an integer of 7 to 35, and most preferably an integer of 8 to 30.

Examples of the combination of the hard segment and the soft segment may include each combination of the hard segment and the soft segment exemplified above. Among them, the combination is preferably a combination of a ring-opening polycondensate of lauryl lactam/polyethylene glycol, a combination of a ring-opening polycondensate of lauryl lactam/polypropylene glycol, a combination of a ring-opening polycondensate of lauryl lactam/polytetramethylene ether glycol, a combination of a ring-opening polycondensate of lauryl lactam/ABA type triblock polyether, and particularly preferably a combination of an open loop polycondensate of lauryl lactam/ABA type triblock polyether.

A number average molecular weight of the polymer constituting the hard segment (polyamide) is preferably from 300 to 15,000 from a viewpoint of the melt-formability. In addition, the number average molecular weight of the polymer constituting the soft segment is preferably from 200 to 6,000 from viewpoints of the toughness and the flexibility at low temperature. Furthermore, a mass ratio (x:y) of the hard segment (x) and the soft segment (y) is preferably from 50:50 to 90:10, and further preferably from 50:50 to 80:20 from a viewpoint of the formability.

The thermoplastic polyamide-based elastomer can be synthesized with copolymerization of the hard segment-forming polymer and the soft segment-forming polymer by a known method.

As the thermoplastic polyamide-based elastomer, for example, commercial products such as "UBESTA, XPA" series of Ube Industries, Ltd. (for example, XPA9063X1, XPA9055X1, XPA9048X2, XPA9048X1, XPA9040X1, XPA9040X2, and the like), "VESTAMID" series of Daicel-Evonik, Ltd. (for example, E40-S3, E47-S1, E47-S3, E55-S1, E55-S3, EX9200, and E50-R2), and the like may be used.

<Thermoplastic Polystyrene-Based Elastomer>

Examples of the thermoplastic polystyrene-based elastomer include materials in which at least polystyrene constitutes a hard segment, and other polymer (for example, polybutadiene, polyisoprene, hydrogenated polybutadiene, hydrogenated polyisoprene, or the like) constitutes a soft segment that is amorphous and has a low glass transition temperature. As the hard segment-forming polystyrene, for example, those obtained by a known radical polymerization method or ionic polymerization method may be suitably used, and examples thereof include polystyrene having anionic living polymerization.

Examples of the soft segment-forming polymer include polybutadiene, polyisoprene, poly(2,3-dimethyl-butadiene).

Examples of the combination of the hard segment and the soft segment described above include respective combinations of the hard segments and soft segments exemplified above. Among them, a combination of polystyrene/polybutadiene, or a combination of polystyrene/polyisoprene is preferred. In addition, the soft segment is preferably hydrogenated in order to suppress an unintended cross-linking reaction of the thermoplastic elastomer.

The number average molecular weight of the polymer (polystyrene) that constitutes the hard segment is preferably from 5,000 to 500,000, and preferably from 10,000 to 200,000.

The number average molecular weight of the polymer that constitutes the soft segment is preferably from 5,000 to 1,000,000, further preferably from 10,000 to 800,000, and particularly preferably from 30,000 to 500,000. Furthermore, the mass ratio (x:y) of the hard segment (x) and the soft segment (y) is preferably from 5:95 to 80:20, and further preferably from 10:90 to 70:30, from a viewpoint of the formability.

The thermoplastic polystyrene-based elastomer may be synthesized by copolymerization of the hard segment-forming polymer and the soft segment-forming polymer by a known method.

Examples of the thermoplastic polystyrene-based elastomer include styrene-butadiene-based copolymers [SBS (polystyrene-poly(butylene) block-polystyrene), SEBS (polystyrene-poly(ethylene/butylene) block-polystyrene)], styrene-isoprene copolymers [polystyrene-polyisoprene block-polystyrene), styrene-propylene-based copolymers [SEP (polystyrene-(ethylene/propylene) block), SEPS (polystyrene-poly(ethylene/propylene) block-polystyrene), SEEPS (polystyrene-poly(ethylene-ethylene/propylene) block-polystyrene), SEB (polystyrene(ethylene/butylene) block) and the like.

As the thermoplastic polystyrene-based elastomer, for example, "TUFTEC" series manufactured by Asahi Kasei Corporation (for example, H1031, H1041, H1043, H1051, H1052, H1053, TUFTEC H1062, H1082, H1141, H1221, H1272), SEBS (8007, 8076, and the like), SEPS (2002, 2063, and the like) manufactured by KURARAY CO., LTD, or the like may be used.

<Thermoplastic Polyurethane-Based Elastomer>

Examples of the thermoplastic polyurethane-based elastomer include materials in which at least polyurethane constitutes a hard segment that forms pseudocross-linking by physical cohesion, and other polymer constitutes the soft segment that is amorphous and has a low glass transition temperature, and for example, may be represented by a copolymer that contains a soft segment containing a unit structure represented by the following Formula A, and a hard segment containing a unit structure represented by the following Formula B.

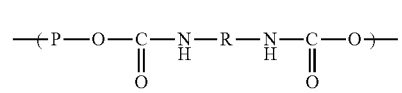

Formula A

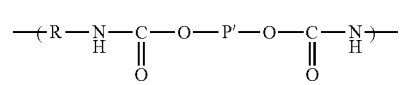

Formula B

Wherein, in the Formulae, P represents a long chain aliphatic polyether or a long chain aliphatic polyester. R represents an aliphatic hydrocarbon, an alicyclic hydrocarbon, or an aromatic hydrocarbon. P' represents a short chain aliphatic hydrocarbon, an alicyclic hydrocarbon, or an aromatic hydrocarbon.

Examples of the long chain aliphatic polyether or long chain aliphatic polyester represented by P in Formula A include a long chain aliphatic polyether or long chain aliphatic polyester having a molecule weight of from 500 to 5000. The P is derived from a diol compound containing the long chain aliphatic polyether or long chain aliphatic polyester represented by P. Examples of such a diol compound include polyethylene glycol, polypropylene glycol, polytetramethylene ether glycol, poly(butylene adipate) diol, poly-ε-caprolactone diol, poly(hexamethylene carbonate) diol, ABA type triblock polyether mentioned above, and the like which have molecule weights within the ranges described above.

These diol compounds may be used alone, or in combination of 2 or more kinds thereof.

In Formula A or Formula B, R is derived from a diisocyanate compound containing an aliphatic hydrocarbon, alicyclic hydrocarbon, or aromatic hydrocarbon that is represented by R.

Examples of aliphatic diisocyanate compound containing the aliphatic hydrocarbon represented by R include 1,2-ethylene diisocyanate, 1,3-propylene diisocyanate, 1,4-butane diisocyanate, and 1,6-hexamethylene diisocyanate.

Examples of diisocyanate compound containing the alicyclic hydrocarbon represented by R include 1,4-cyclohexane diisocyanate and 4,4-cyclohexane diisocyanate.

Examples of aromatic diisocyanate compound containing the aromatic hydrocarbon represented by R include 4,4'-diphenylmethane diisocyanate and tolylene diisocyanate.

These diisocyanate compounds may be used alone, or in combination of 2 or more kinds thereof.

Examples of the short chain aliphatic hydrocarbon, alicyclic hydrocarbon, or aromatic hydrocarbon represented by P' in Formula B include a short chain aliphatic hydrocarbon, alicyclic hydrocarbon, or aromatic hydrocarbon which has a molecule weight of less than 500. In addition, P' is derived from a diol compound containing the short chain aliphatic hydrocarbon, alicyclic hydrocarbon, or aromatic hydrocarbon represented by P'.

Examples of aliphatic diol compound containing the short chain aliphatic hydrocarbon represented by P' include glycols and polyalkylene glycols, and for example, include ethylene glycol, propylene glycol, trimethylene glycol, 1,4-butanediol, 1,3-butanediol, 1,5-pentanediol, 1,6-hexane diol, 1,7-heptane diol, 1,8-octanediol, 1,9-nonanediol, and 1,10-decanediol.

Examples of alicyclic diol compound containing the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Examples of aromatic diol compound containing the aromatic hydrocarbon represented by P' include hydroquinone, resorcin, chlorohydroquinone, bromohydroquinone, methyl hydroquinone, phenyl hydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenylsulfone, 4,4'-dihydroxybenzophenone, 4,4'-dihydroxydiphenyl methane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These compounds may be used alone, or in combination of 2 or more kinds thereof.

The number average molecular weight of the polymer (polyurethane) that constitutes the hard segment is preferably from 300 to 1500 from a viewpoint of the melt-formability. The number average molecular weight of the polymer that constitutes the soft segment is preferably from 500 to 20,000, further preferably from 500 to 5,000, and particularly preferably from 500 to 3,000, from the viewpoints of the flexibility and the thermal stability of the thermoplastic polyurethane-based elastomer. In addition, the mass ratio (x:y) of the hard segment (x) and the soft segment (y) is preferably from 15:85 to 90:10, and further preferably from 30:70 to 90:10 from a viewpoint of the formability.

The thermoplastic polyurethane-based elastomer may be synthesized by copolymerization of the hard segment-forming polymer and the soft segment-forming polymer by a known method. As the thermoplastic polyurethane-based elastomer, for example, the thermoplastic polyurethane described in JP-A No. 5-331256 may be used.

Specifically, the thermoplastic polyurethane-based elastomer is preferably a combination of a hard segment constituted with an aromatic diol, and an aromatic diisocyanate, and a soft segment constituted with a polycarbonate ester, and more preferably a combination of tolylene diisocyanate (TDI)/polyester-based polyol copolymers, TDI/polyether-based polyol copolymers, TDI/caprolactone-based polyol copolymers, TDI/polycarbonate-based polyol copolymers, 4,4'-diphenylmethane diisocyanate (MDI)/polyester-based polyol copolymers, MDI/polyether-based polyol copolymers, MDI/caprolactone-based polyol copolymers, MDI/polycarbonate-based polyol copolymers, or MDI+hydroquinone/polyhexamethylene carbonate copolymer being preferable, and TDI/polyester-based polyol copolymer, TDI/polyether-based polyol copolymer, MDI/polyester polyol copolymer, MDI/polyether-based polyol copolymer, or MDI+hydroquinone/polyhexamethylene carbonate copolymer.

In addition, as a commercial product of the thermoplastic polyurethane-based elastomer, for example, commercial products such as "ELASTOLLAN" series manufactured by BASF Corporation (for example, ET680, ET880, ET690, ET890 and the like), "KURAMIRON U" series manufactured by KURARAY CO., LTD (for example, 2000's, 3000's, 8000's, 9000's), "MIRACTRAN" series manufactured by Nippon Miractran Co, Ltd. (for example, XN-2001, XN-2004, P390RSUP, P480RSU1, P26mRNAT, E490, E590, P890) and the like may be used.

<Thermoplastic Polyolefin-Based Elastomer>

Examples of the thermoplastic polyolefin-based elastomer include materials in which at least polyolefin constitutes a hard segment that is crystalline and has a high melting temperature, and other polymer (for example, the polyolefin described above, other polyolefin, a polyvinyl compound) constitutes a soft segment that is amorphous and has a low glass transition temperature. Examples of the hard segment-forming polyolefin include polyethylene, polypropylene, isotactic polypropylene, and polybutene.

Examples of the thermoplastic polyolefin-based elastomer include olefin-α-olefin random copolymers and olefin block copolymers, and for example, include propylene block copolymers, ethylene-propylene copolymers, propylene-1-hexene copolymers, propylene-4-methyl-1 pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers.

The thermoplastic polyolefin-based elastomer is preferably a propylene block copolymer, an ethylene-propylene copolymer, a propylene-1-hexene copolymer, a propylene-4-methyl-1 pentene copolymer, a propylene-1-butene copolymer, an ethylene-1-hexene copolymer, an ethylene-4-methyl-pentene copolymer, an ethylene-1-butene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, or a propylene-vinyl acetate copolymer, and further preferably an ethylene-propylene copolymer, a propylene-1-butene copolymer, an ethylene-1-butene copolymer, an ethylene-methyl methacrylate copolymer, an ethylene-methyl acrylate copolymer, an ethylene-ethyl acrylate copolymer, or an ethylene-butyl acrylate copolymer.

In addition, the polyolefin resin may be used in combination of 2 or more kinds thereof, such as a combination of ethylene and propylene. In addition, the content ratio of the polyolefin in the thermoplastic polyolefin-based elastomer is preferably 50 mass % or more and 100 mass % or less.

The number average molecular weight of the thermoplastic polyolefin-based elastomer is preferably from 5,000 to 10,000,000. When the number average molecular weight of the thermoplastic polyolefin-based elastomer is within 5,000 to 10,000,000, the mechanical properties of the thermoplastic resin material are satisfactory, and the workability is also excellent. The number average molecule weight is further preferably from 7,000 to 1,000,000, and particularly preferably from 10,000 to 1,000,000, from the similar viewpoints. This can further improve the mechanical properties and the workability of the thermoplastic resin material. In addition, the number average molecular weight of the polymer that constitutes the soft segment is preferably 200 to 6000 from the viewpoints of the toughness and the flexibility at low temperature. Furthermore, the mass ratio (x:y) of the hard segment (x) and the soft segment (y) is preferably from 50:50 to 95:5, and further preferably from 50:50 to 90:10, from a viewpoint of the formability.

The thermoplastic polyolefin-based elastomer may be synthesized by copolymerization using a known method.

Examples of the thermoplastic polyolefin-based elastomer to be used include "TAFMER" series manufactured by Mitsui Chemicals, Inc. (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, P-0680), "NUCREL" series of DuPont-Mitsui Polychemicals Co., Ltd. (for example, AN4214C, AN4225C, AN42115C, N0903HC, N0908C, AN42012C, N410, N1035, N1050H, N11008C, N1110H, N1207C, N1214, AN4221C, N1525, N1560, N0200H, AN4228C, AN4213C, N035C), "ELVALOY AC" series (for example, 1125AC, 1209AC, 1218AC, 1609AC, 1820AC, 1913AC, 2112AC, 2116AC, 2615AC, 2715AC, 3117AC, 3427AC, 3717AC), "ACRYFT" series and "EVATATE" series of Sumitomo Chemical Company, Limited, and "ULTRACENT" series of TOSOH CORPORATION.

Moreover, commercial products employable as the thermoplastic polyolefin-based elastomer also include, for example, products from the "PRIME TPO" series (examples include, E-2900H, F-3900H, E-2900, F-3900, J-5900, E-2910, F-3910, J-5910, E-2710, F-3710, J-5910, E-2740, F-3740, R110MP, R110E, T310E, and M142E), manufactured by Prime Polymer Co., Ltd.

<Thermoplastic Polyester-Based Elastomer>

Examples of the thermoplastic polyester-based elastomer include materials in which at least polyester constitutes the hard segment that is crystalline and has high a melting temperature, and other polymer (for example, polyester, polyether or the like) constitutes the soft segment that is amorphous and has a low glass transition temperature.

As the hard segment-forming crystalline polyester, an aromatic polyester may be used. The aromatic polyester may be formed from, for example, an aromatic dicarboxylic acid or an ester-forming derivative thereof and an aliphatic diol. The aromatic polyester is preferably polybutylene terephthalate that is derived from terephthalic acid and/or dimethyl terephthalate and 1,4-butanediol. Examples of the preferred hard segment-forming aromatic polyester further include a polyester that is derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol having a molecule weight of 300 or less, for example, aliphatic diols such as ethylene glycol, trimethylene glycol, pentamethylene glycol, hexamethylene glycol, neopentyl glycol, or decamethylene glycol, alicyclic diols such as 1,4-cyclohexane dimethanol or tricyclodecane dimethylol, and aromatic diols such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl, and the like, or a copolymerized polyester from a combination of 2 or more kinds of these dicarboxylic acid components and diol components. In addition, a multifunctional carboxylic acid component, multifunctional oxyacid component or a multifunctional hydroxy component, which has 3 or more functionality, and the like may be also copolymerized within a range of 5 mole % or less.

Examples of the hard segment-forming polyester include polyethylene terephthalate, polybutylene terephthalate, polystyrene terephthalate, polyethylene naphthalate, polybutylene naphthalate, and the like, and the hard segment-forming aromatic polyester is preferably polybutylene terephthalate.

Examples of the polymer that forms the soft segment include a polymer selected from aliphatic polyester and aliphatic polyether.

Examples of the aliphatic polyether include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide-addition polymer of poly(propylene oxide) glycol, a copolymer of ethylene oxide and tetrahydrofuran, and the like.

Examples of the aliphatic polyester include poly(ε-caprolactone), polyenantholactone, polycaprylolactone, polybutylene adipate, polyethylene adipate, and the like.

Among these aliphatic polyether and aliphatic polyester, poly(tetramethylene oxide) glycol, an ethylene oxide adduct of poly(propylene oxide) glycol, poly(ε-caprolactone), polybutylene adipate, polyethylene adipate, and the like are preferred from a viewpoint of elastic properties of the obtained copolymer.

The number average molecular weight of the soft segment-forming polymer is preferably from 300 to 6000 from the viewpoints of the toughness and the flexibility at low temperature. Furthermore, the volume ratio (x:y) of the hard segment (x) and the soft segment (y) is preferably from 99:1 to 20:80, and is further preferably from 98:2 to 30:70, from a viewpoint of the formability.

Meanwhile, examples of the combination of the hard segment and the soft segment may include each combination of the hard segment and the soft segment exemplified above. Among them, a combination in which polybutylene terephthalate is the hard segment and aliphatic polyether is the soft segment is preferable, and a combination in which polybutylene terephthalate is the hard segment and poly(ethylene oxide) glycol is the soft segment is further preferable.

In addition, as the thermoplastic elastomer, those obtained by acid-modifying a thermoplastic elastomer may be used.

The "those obtained by acid-modifying a thermoplastic elastomer" refers to a thermoplastic elastomer to which an unsaturated compound having an acidic group such as a carboxylic acid group, a sulfuric acid group or a phosphoric acid group is bonded. For example, when an unsaturated carboxylic acid (generally, maleic anhydride) is used as the unsaturated compound having an acidic group, examples of those obtained by acid-modifying a thermoplastic elastomer include an olefin-based thermoplastic elastomer to which an unsaturated binding site of an unsaturated carboxylic acid is bonded (for example, by graft polymerization).

From a viewpoint of suppressing deterioration of the thermoplastic polyamide-based elastomer and the thermoplastic elastomer besides the thermoplastic polyamide-based elastomer, the compound having an acidic group is preferably a compound having a carboxylic acid group that is a weak acid group, examples of acrylic acid, methacrylic acid, itaconic acid, crotonic acid, isocrotonic acid, maleic acid and the like.

As the thermoplastic polyester-based elastomer, a commercial product may be used, and for example, "HYTREL" series manufactured by DuPont-Toray Co., Ltd. (for example, 3046, 5557, 6347, 4047, 4767), "PELPRENE" series manufactured by TOYOBO CO., LTD. (for example, P30B, P40B, P40H, P55B, P70B, P150B, P250B, P450B, P150M, S1001, S2001, S5001, S6001, S9001), or the like may be used.

The thermoplastic elastomer may be synthesized by copolymerization of the hard segment-forming polymer and the soft segment-forming polymer by a known method.

The melting point of the resin material is normally approximately from 100° C. to 350° C., and, from the viewpoint of tire manufacturability, is preferably approximately from 100° C. to 250° C., and more preferably from 100° C. to 200° C.

Moreover, the durability of the tire and productivity may be improved. Various additives, such as rubbers, elastomers, thermoplastic resins, various fillers (for example, silica, calcium carbonate, or clays), an anti-aging agent, oil, a plasticizer, a colorant, or a weather resistant agent, may be included in (blended into) the resin material as desired.

The tensile elastic modulus as defined in JIS K7113: 1995 of the resin material (in the present specification below the "elastic modulus" refers to the tensile elastic modulus, unless otherwise stated) is preferably from 100 MPa to 1000 MPa, further preferably from 100 MPa to 800 MPa, and particularly preferably from 100 MPa to 700 MPa. When the tensile elastic modulus of the resin material is 100 MPa to 1000 MPa, it is possible to perform the rim fitting effectively while retaining the shape of the tire frame.

The tensile yield strength as defined in JIS K7113: 1995 of the resin material is preferably 5 MPa or more, preferably 5 MPa to 20 MPa, and further preferably 5 MPa to 17 MPa. When the tensile yield strength of the resin material is 5 MPa or more, the tire can bear with deformation for the load on the tire at the time of the running or the like.

The tensile yield elongation as defined in JIS K7113: 1995 of the resin material is preferably 10% or more, preferably from 10 to 70%, and further preferably from 15 to 60%. When the tensile yield elongation of the resin material is 10% or more, the elastic region is large, and the fittability onto a rim can be improved.

The tensile elongation at break as defined in JIS K7113: 1995 of the resin material is preferably 50% or more, preferably 100% or more, further preferably 150% or more, and particularly preferably 200% or more. When the tensile elongation at break of the resin material is 50% or more, the fittability onto a rim is good, and it is possible to render the thermoplastic resin material to hardly fracture against the collision.

The deflection temperature under load (at the load of 0.45 MPa) as defined in ISO75-2 or ASTM D648 of the resin material is preferably 50° C. or more, preferably from 50 to 150° C., and further preferably from 50 to 130° C. When the deflection temperature under load of the resin material is 50° C. or more, it is possible to suppress deformation of the tire frame body even in a case where vulcanization is performed in the manufacture of the tire.

First Exemplary Embodiment

A tire according to a first exemplary embodiment of the invention includes at least a circular tire frame body that is formed from a resin material and has a layered structure, wherein the tire frame body includes at least one gas retaining layer having a gas permeability coefficient of $2.0 \times 10^{-15}$ $cm^3 \cdot cm/(cm^2 \cdot s \cdot Pa)$ or less at 80° C.

A tire according to the first exemplary embodiment of the invention includes the circular tire frame body formed from a resin material. Due to a tire according to the first exemplary embodiment of the invention having a tire frame body that is formed from a resin material, the need for a vulcanization process, that was an essential process for a conventional rubber-made tire, is obviated, enabling, for example, the tire frame body to be molded by injection molding or the like. This thereby enables the manufacturing process to be simplified, and enables savings in time and cost to be achieved. Moreover, the tire frame body formed using a resin material has a simpler structure than an ordinary conventional rubber-made tire, leading to the advantage of being lighter in weight. This thereby enables improvements in the abrasion resistance and rolling resistance of the tire.

A tire according to the first exemplary embodiment of the invention has a tire frame body with a layered structure, including at least one gas retaining layer having a gas permeability coefficient of $2.0 \times 10^{-15}$ $cm^3 \cdot cm/(cm^2 \cdot s \cdot Pa)$ or less at 80° C. A tire according to the first exemplary embodiment of the invention has the gas retaining layer provided to the tire frame body, enabling the gas retaining properties of the tire frame body with respect to gases, such as air, nitrogen gas, or the like, to be improved. Thus a tire according to the first exemplary embodiment of the invention is capable of being effectively employed in what is referred to as a pneumatic tire, in which the tire frame body is fitted onto a rim, and gas is filled into a void surrounded by the tire frame body and the rim. Raising the gas retaining properties of the tire also, at the same time, raises the internal pressure retaining properties of the tire.

A tire according to the first exemplary embodiment of the invention may be configured such that the gas retaining layer includes a thermoplastic resin. A tire according to the first exemplary embodiment of the invention enables the gas retaining properties to be improved while suppressing an increase in tire weight due to forming the gas retaining layer with a thermoplastic resin. The thermoplastic resin also has excellent adhesiveness (thermal fusing properties) to the tire frame body, due to the compatibility to the resin material forming the tire frame body. The gas retaining layer for which the thermoplastic resin is employed accordingly has excellent adhesiveness to the resin material contained in the tire frame body, enabling the durability and productivity of the tire frame body to be improved.

A tire according to the first exemplary embodiment of the invention may be configured such that the gas retaining layer has a stress under a 4% tensile elongation of 70 MPa or less. Setting the tensile elastic modulus of the gas retaining layer to a stress under a 4% tensile elongation of 70 MPa or less enables sufficient flexibility of the gas retaining layer, and enables it to be close to the elastic modulus of the tire frame body formed by a resin material. This thereby enables cracks to be suppressed from developing in the gas retaining layer, such as due to impacts or the like which is caused by the force applied from the outside, and enables delamination from the tire frame body to be suppressed.

The stress of the gas retaining layer under a 4% tensile elongation is preferably 50 MPa or less and is more preferably 40 MPa or less.

A tire according to the first exemplary embodiment of the invention may be configured to employ a thermoplastic resin as the resin material forming the tire frame body.

A tire according to the first exemplary embodiment of the invention may be configured to employ a thermoplastic elastomer as the resin material forming the tire frame body.

Exemplary Embodiment 1-1

Hereinafter, with respect to a first exemplary embodiment of the invention, a tire according to an exemplary embodiment 1-1 will be described with reference to the drawings.

Figure 1B:
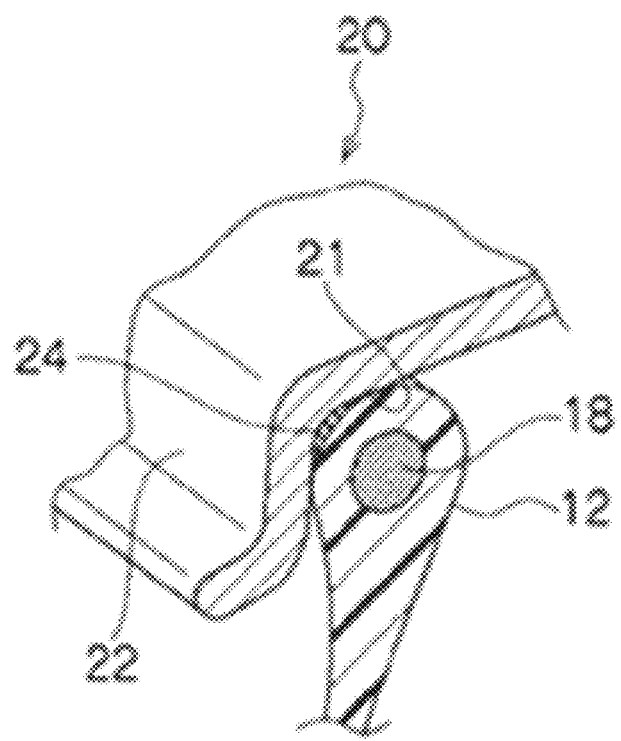
FIG. 1B is a cross-section of a bead portion fitted onto a rim.

A tire 10 of the exemplary embodiment will be described. In the present exemplary embodiment, a gas retaining layer formed of a thermoplastic polyamide-based resin (polyamide 6) is provided at the innermost side of the tire radial direction of the tire case 10. FIG. 1A is a perspective diagram illustrating the cross-section of a part of the tire according to an embodiment of the present invention. FIG. 1B is a cross-sectional diagram of a bead portion fitted onto a rim. As illustrated in FIG. 1A, the tire 10 of the present exemplary embodiment has substantially the same cross-sectional shape as that of conventional general pneumatic tires.

Figure 2:
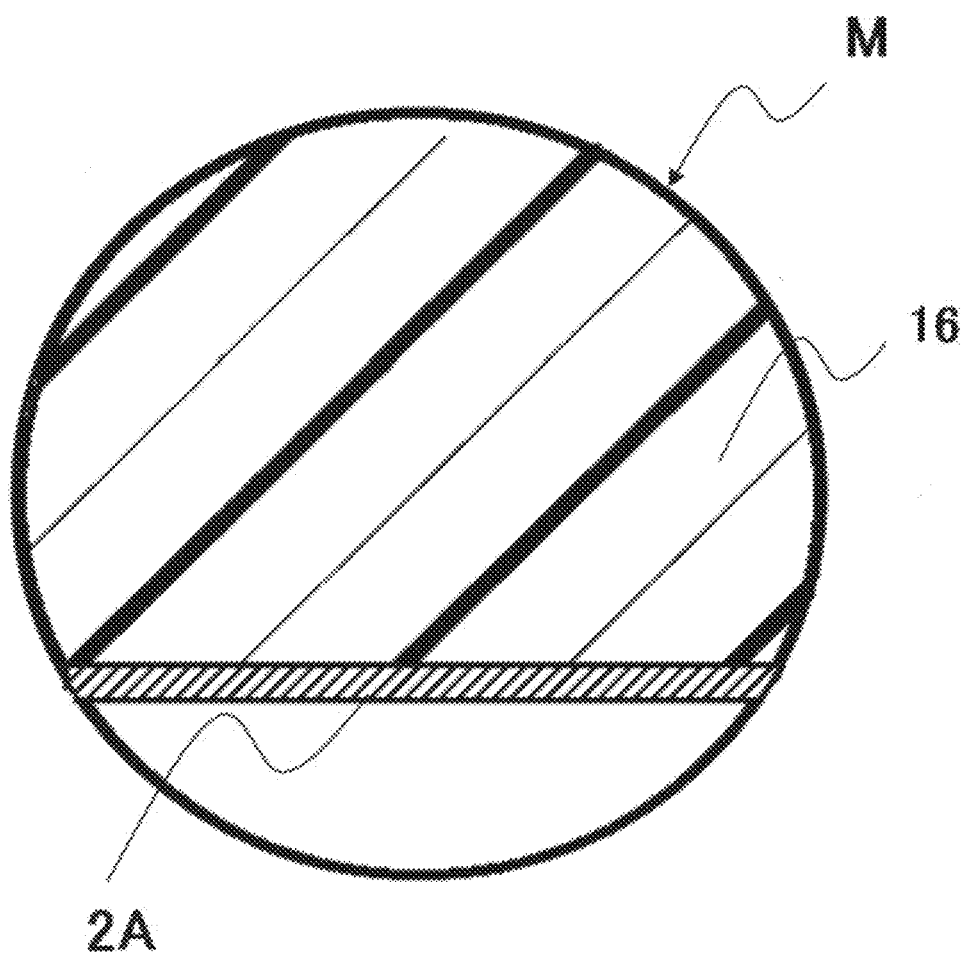
FIG. 2 is an enlarged diagram illustrating a gas barrier layer according to an exemplary embodiment 1-1.

As illustrated in FIG. 1A, the tire 10 has a tire case 17 which includes: a pair of bead portions 12 that are each in contact with a bead sheet 21 and a rim flange 22 of a rim 20 illustrated in FIG. 1B; side portions 14 that extend from the bead portions 12 to the exterior in the tire radial direction; and a crown portion 16 (an outer circumference) that connects the external edge in the tire radial direction of one of the side portions 14 and the external edge in the tire radial direction of the other of the side portions 14. A gas retaining layer 2A is provided to the inner peripheral portion face of the tire case, as illustrated by the enlargement (FIG. 2) of region M in FIG. 1A. FIG. 2 is an enlarged diagram to explain a gas retaining layer of the present exemplary embodiment.

The tire case 17 in the present exemplary embodiment is formed of a thermoplastic polyamide-based elastomer ("UBESTA XPA9055X1", manufactured by Ube Industries, Ltd., melting point 162° C.). The tire case 17 in the present exemplary embodiment is formed from a single thermoplastic resin material (the thermoplastic polyamide-based elastomer); however, the present invention is not intended to be limited to this configuration, and similarly to conventional general pneumatic tires, thermoplastic resin materials having different characteristics may be used respectively for the various parts (side portion 14, crown portion 16, bead portion 12, and the like) of the tire case 17. Furthermore, the tire case 17 may also be reinforced with a reinforcing material by embedding the reinforcing material (a polymer material, or a fiber, cord, non-woven fabric, woven fabric or the like made of metal) in the tire case 17 (for example, bead portion 12, side portion 14, and crown portion 16).

The tire case 17 of the present exemplary embodiment is a product produced by bonding a pair of tire case half parts (tire frame pieces) 17A formed of a thermoplastic polyamide-based elastomer. The tire case half part 17A is formed by molding one bead portion 12, one side portion 14, and a half-width crown portion 16 into one unit through injection molding or the like, arranging annular tire case half parts 17A having the same shape to face each other, and bonding the case half parts at the tire equatorial plane area. Meanwhile, regarding the tire case 17, formation of the tire case is not limited to that made by bonding two members, and the tire case may also be formed by bonding three or more members.

The tire case half part 17A formed of the thermoplastic polyamide-based elastomer may be molded by, for example, vacuum forming, pressure forming, injection molding, or melt casting. Therefore, when compared with the case of molding a tire case from rubber as in conventional cases, it is not necessary to perform vulcanization, and the production process can be simplified to a large extent, and the molding time may be shortened.

Furthermore, in the present exemplary embodiment, since the tire case half parts 17A have laterally symmetrical shapes, that is, one of the tire case halves 17A and the other one of the tire case halves 17A have the same shape, there is an advantage in that only one kind of mold is necessary for molding the tire case half parts 17A.

According to the present exemplary embodiment, as illustrated in FIG. 1B, an annular bead core 18 formed from a steel cord is embedded in the bead portion 12, similarly to the conventional general pneumatic tires. However, the present invention is not intended to be limited to this configuration, and as long as rigidity of the bead portion 12 is secured and there is no problem with the fitting with the rim 20, the bead core 18 may be omitted. The bead core may also be formed from an organic fiber cord, a resin-coated organic fiber cord, a rigid resin, or the like, in addition to the steel cord.

In the present exemplary embodiment, a annular sealing layer 24 formed of a material, such as a rubber, having a sealing property superior to that of the thermoplastic polyamide-based elastomer constituting the tire case 17 is formed in the area which is brought into contact with the rim 20 of the bead portion 12, or at least in the area which is brought into contact with a rim flange 22 of the rim 20. The sealing layer 24 may be formed in the area where the tire case 17 (bead portion 12) is brought into contact with the bead sheet 21. Regarding the material having a sealing property superior to that of the thermoplastic polyamide-based elastomer that constitutes the tire case 17, a material which is soft as compared with the thermoplastic polyamide-based elastomer that constitutes the tire case 17 may be used. As the rubber that can be used in the sealing layer 24, it is preferable to use a rubber of the same kind as the rubber used in the outer surface of the bead portion of conventional general pneumatic tires made of rubber. Furthermore, if the sealing property to the rim 20 can be secured only with the thermoplastic polyamide-based elastomer, the rubber sealing layer 24 may be omitted, and other thermoplastic resin (including a thermoplastic elastomer) having a sealing property superior to that of the thermoplastic polyamide-based elastomer may be used. Examples of such other thermoplastic resin include resins such as a polyurethane-based resin, an olefin-based resin, or a polystyrene-based resin; and blends of these resins with rubbers or elastomers. Furthermore, thermoplastic elastomers may also be used and examples thereof include a thermoplastic polyester-based elastomer, a thermoplastic polyurethane-based elastomer, a thermoplastic polystyrene-based elastomer, a thermoplastic polyolefin-based elastomer, combinations of these elastomers, and blends of these elastomers with rubbers.

As illustrated in FIG. 1A, in the crown portion 16, reinforcing cords 26 having higher rigidity than the thermoplastic polyamide-based elastomer that constitutes the tire case 17 are wound in a circumferential direction of the tire case 17. When viewed from a cross-sectional direction of the tire case dissected along the axial direction of the tire case 17, the reinforcing cords 26 are helically wound in a state that at least portions of the reinforcing cords are embedded in the crown portion 16, whereby a reinforcing cord layer 28 is formed. On the outer circumferential side in the tire radial direction of the reinforcing cord layer 28, a tread 30 formed of a material having an abrasion resistance superior to that of the thermoplastic polyamide-based elastomer that constitutes the tire case 17, for example, a rubber, is disposed.

The gas retaining layer 2A will be described by using FIG. 2. The gas retaining layer 2A in the present exemplary embodiment is constituted with polyamide 6 (Nylon 6 "1022B", manufactured by Ube Industries, Ltd.). In the present exemplary embodiment, the film thickness of the gas retaining layer 2A is approximately 100 μm, the gas permeability coefficient is $2.00 \times 10^{-15}$ cm³·cm/(cm²·s·Pa), and the stress under a 4% tensile elongation is 40 MPa. The gas retaining layer 2A in FIG. 2 is positioned at the inside in the tire radial direction of the crown portion 16, however, in the present exemplary embodiment, the gas retaining layer is provided across the entire region of the radial direction inside of the tire case 17, including at the side portions 14.

Figure 3:
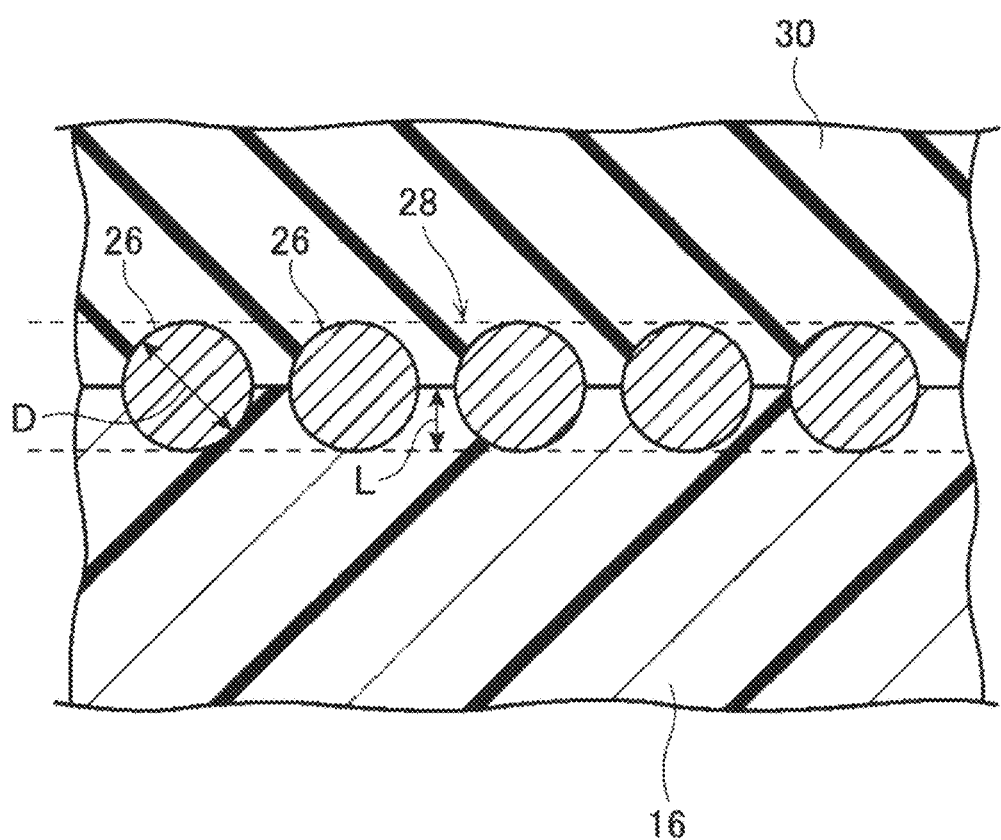
FIG. 3 is a cross-section taken along the tire rotation axis of a tire according to the exemplary embodiment 1-1, and illustrating a state in which reinforcing cord is embedded in a crown portion of a tire case.

The reinforcing cord layer 28 that is constituted with the reinforcing cords 26 will be described by using FIG. 3. FIG. 3 is a cross-sectional diagram, dissected along the axis of tire rotation, illustrating the state in which the reinforcing cords are embedded in the crown portion of the tire case of the tire of the exemplary embodiment 1-1. As illustrated in FIG. 3, from a cross-sectional view dissected along the axial direction of the tire case 17, the reinforcing cords 26 are helically wound in a state that at least portions of the reinforcing cords are embedded in the crown portion 16, and the reinforcing cords 26 form, together with a part of an outer circumference of the tire case 17, the reinforcing cord layer 28 illustrated in the dotted-lined area in FIG. 3. The part of the reinforcing cords 26 that is embedded in the crown portion 16 is in a state of closely adhering to the thermoplastic polyamide-based elastomer that constitutes the crown portion 16 (tire case 17). As the reinforcing cord 26, a monofilament (single wire) of a metal fiber, an organic fiber or the like; a multifilament (twisted wire) obtained by twisting these fibers, such as a steel cord produced by twisting steel fiber; or the like may be used. In the present exemplary embodiment, a steel cord is used as the reinforcing cord 26.

Furthermore, the depth L in FIG. 3 represents the depth of embedding of the reinforcing cord 26 in the direction of the axis of tire rotation in the tire case 17 (crown portion 16). The depth L of embedding of a reinforcing cord 26 in the crown portion 16 is preferably ⅕ or more, and more preferably greater than ½, of the diameter D of the reinforcing cord 26. Further, it is most preferable that the entirety of the reinforcing cord 26 be embedded in the crown portion 16. When the depth L of embedding of the reinforcing cord 26 is greater than ½ of the diameter D of the reinforcing cord 26, it is difficult for the reinforcing cord 26 to escape from the embedded section from the viewpoint of dimension thereof. Furthermore, when the entirety of the reinforcing cord 26 is embedded in the crown portion 16, the surface (outer circumferential surface) becomes flat, and inclusion of air in the surroundings of the reinforcing cords can be suppressed even when members are mounted on the crown portion 16 where the reinforcing cords 26 are embedded. The reinforcing cord layer 28 corresponds to the belt that is disposed on the outer circumferential surface of the carcass of a conventional pneumatic tire made of rubber.

As described above, a tread 30 is disposed on the outer circumferential side in the tire radial direction of the reinforcing cord layer 28. For the rubber used in the tread 30, a rubber of the same kind as the rubber used in conventional pneumatic tires made of rubber is preferably used. Meanwhile, instead of the tread 30, a tread formed from a thermoplastic resin material of a different kind, which has abrasion resistance superior to that of the thermoplastic polyamide-based elastomer that constitutes the tire case 17, may be used. Furthermore, in the tread 30, a tread pattern including plural grooves is formed on the contact surface with the road surface, similarly to conventional pneumatic tires made of rubber.

Hereinafter, the method for producing a tire of the present invention will be described.

(Tire Frame Piece Molding Step)

First, tire case half parts that are each supported by a thin metal supporting ring are arranged to face each other. Subsequently, a bonding mold, which is not depicted in the drawings, is arranged so as to be in contact with the outer circumferential surfaces of the colliding parts of the tire case half parts. Here, the bonding mold is configured to press the vicinity of the bonding section (colliding part) of a tire case half part 17A with a predetermined pressure. Subsequently, the vicinity of the bonding sections of the tire case half parts are pressed at a temperature equal to or higher than the melting temperature of the thermoplastic resin material that constitutes the tire case. By heating the bonding sections of the tire case half parts under pressure using the bonding mold, the bonding sections melt and the tire case half parts fuse together, whereby these members are integrated to form the tire case 17. In the present exemplary embodiment, the bonding sections of the tire case half parts are heated using a bonding mold. However, the production method of the present invention is not intended to be limited to this, and for example, the tire case half parts may also be bonded by heating the bonding sections using a high-frequency heater or the like that is separately provided, or softening or melting the bonding sections in advance by hot air, irradiation of infrared radiation, or the like, followed by pressing the bonding sections using a bonding mold.

(Reinforcing Cord Member Winding Step)

Figure 4:
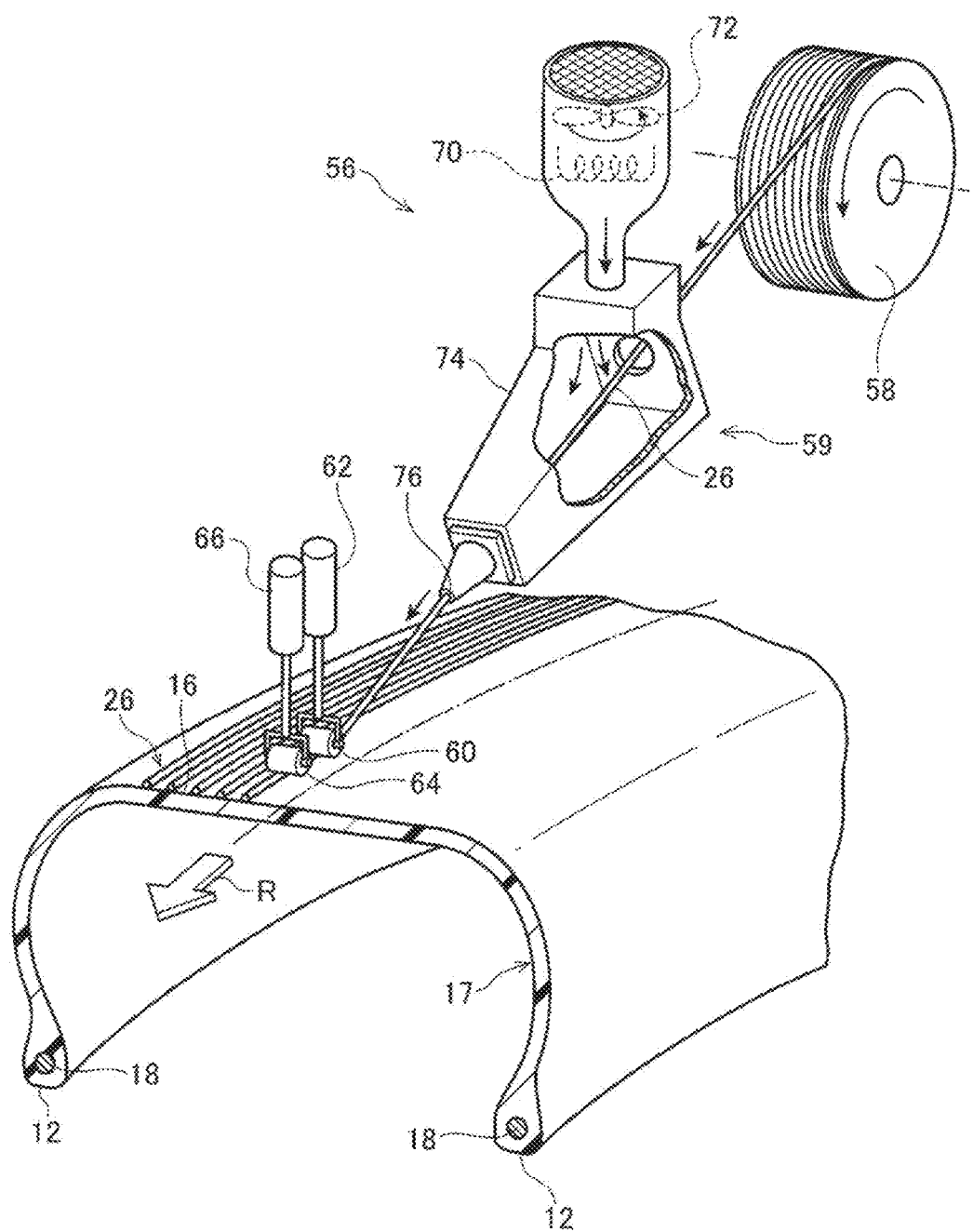
FIG. 4 is an explanatory diagram to explain an operation to embed reinforcing cord in a crown portion of a tire case using a cord heating device and rollers.

Next, the reinforcing cord winding step will be described by using FIG. 4. FIG. 4 is an explanatory diagram for explaining the operation of embedding reinforcing cords in the crown portion of the tire case by using a cord heating device and rollers. In FIG. 4, a cord feeding apparatus 56 includes: a reel 58 having a reinforcing cord 26 wound around; a cord heating device 59 disposed downstream in the cord conveyance direction of the reel 58; a first roller 60 disposed downstream in the conveyance direction of the reinforcing cord 26; a first cylinder apparatus 62 that moves in the direction of contacting and detaching the first roller 60 with respect to the outer circumferential surface of the tire; a second roller 64 disposed downstream in the reinforcing cord 26 conveyance direction of the first roller 60; and a second cylinder apparatus 66 that moves in the direction of contacting and detaching the second roller 64 with respect to the outer circumferential surface of the tire. The second roller 64 may be used as a cooling roller made of a metal. Furthermore, in the present exemplary embodiment, the surface of the first roller 60 or second roller 64 is coated with a fluororesin (in the present exemplary embodiment, TEFLON (registered trademark)) in order to suppress attachment of the molten or softened thermoplastic polyamide-based elastomer. While, in the present exemplary embodiment, the cord feeding apparatus 56 is configured to have two rollers of the first roller 60 or the second roller 64, the present invention is not intended to be limited to this configuration, and the cord feeding apparatus 56 may be configured to have only one of the above-mentioned rollers (that is, having one roller).

The cord heating device 59 includes a heater 70 that generates hot air and a fan 72. Furthermore, the cord heating device 59 includes: a heating box 74 into which the hot air is supplied therein, and in which the reinforcing cord 26 passes therethrough; and a discharge port 76 through which a heated cord 26 is discharged.

In the present step, first, the temperature of the heater 70 of the cord heating device 59 is raised, and the air in the surroundings which is heated by the heater 70 is sent to the heating box 74 by the wind generated by rotation of the fan 72. Subsequently, a reinforcing cord 26 that is wound off from the reel 58 is sent into and heated in the heating box 74 in which the internal space has been heated by hot air (for example, the reinforcing cord 26 is heated to a temperature of approximately 100° C. to 200° C.). The heated reinforcing cord 26 is passed through the discharge port 76 and is helically wound, with a certain tension, around the outer circumferential surface of the crown portion 16 of the tire case 17 that rotates in the direction of arrow R in FIG. 4. Here, when the heated reinforcing cord 26 is brought into contact with the outer circumferential surface of the crown portion 16, the thermoplastic polyamide-based elastomer at the contact area melts or softens, and at least a portion of the heated reinforcing cord 26 is embedded in the outer circumferential surface of the crown portion 16. At this time, since the heated reinforcing cord 26 is embedded in the thermoplastic polyamide-based elastomer that has melted or softened, a state in which there is no gap between the thermoplastic polyamide-based elastomer and the reinforcing cord 26, that is, a state in which the two members are closely adhered, is achieved. As a result, incorporation of air into the area where the reinforcing cord 26 is embedded is suppressed. By heating the reinforcing cord 26 to a temperature higher than the melting temperature of the thermoplastic polyamide-based elastomer of the tire case 17, melting or softening of the thermoplastic polyamide-based elastomer at the area of contact with the reinforcing cord 26 is enhanced. In this manner, it becomes easy to embed the reinforcing cord 26 in the outer circumferential surface of the crown portion 16, and also, incorporation of air can be effectively suppressed.

The depth L of embedding of the reinforcing cord 26 may be adjusted by means of the heating temperature of the reinforcing cord 26, the tension applied to the reinforcing cord 26, the pressing pressure applied by the first roller 60, or the like. In the present exemplary embodiment, it is configured such that the depth L of embedding of the reinforcing cord 26 is 1/5 or more of the diameter D of the reinforcing cord 26. Meanwhile, the depth L of embedding of the reinforcing cord 26 is more preferably greater than 1/2 of the diameter D, and it is most preferable that the entirety of the reinforcing cord 26 be embedded.

In this manner, by winding the heated reinforcing cord 26 while embedding the reinforcing cord in the outer circumferential surface of the crown portion 16, the reinforcing cord layer 28 is formed on the outer circumferential side of the crown portion 16 of the tire case 17.

(Gas Retaining Layer Forming Step)

Then the tire case 17 is positioned in a blow molding machine, which is not depicted in the drawings. Melted polyamide 6 is then extruded from the dies, blow molding so as to form a layer of polyamide 6 over the entire inside surface in the tire radial direction of the tire case 17. At this time, the extruded amount of the melted polyamide 6 is determined such that the film thickness of the gas retaining layer 2A, described above, is 100 μm. The gas retaining layer 2A is thereby formed on the inside surface in the tire radial direction of the tire case 17. Note that blow molding may be performed in accordance with a known method.

Subsequently, a vulcanized band-shaped tread 30 is wound once on the outer circumferential surface of the tire case 17, and the tread 30 is adhered to the outer circumferential surface of the tire case 17 using an adhesive or the like. As the tread 30, a precure tread that is used in conventionally known retreaded tires, may be used. The present step is a step similar to the step of adhering a precure tread to the outer circumferential surface of a casing of a retreaded tire.

Then, a sealing layer 24 formed of a vulcanized rubber is adhered to the bead portion 12 of the tire case 17 using an adhesive or the like, thereby obtaining the tire 10.

(Operation)

The tire 10 of the present exemplary embodiment is formed with the gas retaining layer 2A with gas permeability coefficient of $2.0 \times 10^{-15}$ $cm^3 \cdot cm/(cm^2 \cdot s \cdot Pa)$ at the inner side in the tire radial direction of the tire case 17A, thereby enabling the gas retaining properties of the tire 10 to be raised. Thus when the tire 10 of the present exemplary embodiment is fitted onto the rim 20, the retaining properties to gas filled inside the tire 10 are high.

In the present exemplary embodiment, the gas retaining layer 2A is formed of the polyamide 6, that is a thermoplastic polyamide-based resin, and so increase in weight of the tire 10 is suppressed even when the gas retaining layer 2A is formed, and the adhesiveness (thermal fusing properties) to the tire case 17 formed of a thermoplastic polyamide-based elastomer is also high. Moreover, due to the stress of the gas retaining layer 2A under a 4% tensile elongation being 40 MPa, the durability of the gas retaining layer 2A, such as to impacts to the tire 10, is also high.

In the tire 10 of the present exemplary embodiment, since the tire case 17 is formed of a thermoplastic polyamide-based elastomer, the tire 10 is excellent in heat resistance, tensile elastic modulus, tensile strength, and fracture strain, and moreover weight is also lighter due to the structure being simpler than a conventional rubber-made tire. Accordingly, the tire 10 of the present exemplary embodiment has high abrasion resistance and high durability. Moreover, the melting point of the thermoplastic polyamide-based elastomer configuring the tire case 17 is 162° C., and hence due to, for example, approximately 210° C. being sufficient to perform binding of the tire case pieces 17A, this enables energy consumption to be suppressed, and enables costs for heating to be suppressed.

Polyamide elastomers have high adhesiveness to the reinforcing cord 26, and moreover excellent fixing ability, such as welding strength. Therefore, the phenomenon in which air remains (incorporation of air) in the vicinity of the reinforcing cord 26 in the reinforcing cord winding step can be suppressed. When the resin material has high adhesiveness and welding properties to the reinforcing cord 26, and incorporation of air into the vicinity of the reinforcing cord members is suppressed, it is possible to effectively prevent the movement of the reinforcing cord 26 which is caused by the force applied thereto at the time of driving or the like. As a result, for example, since the movement of the reinforcing cord members is suppressed, even in the case where a tire-constituting member is arranged so as to cover the entirety of the reinforcing cord members in an outer circumference of the tire frame body, the occurrence of separation or the like between these members (including the tire frame body) is suppressed, and durability of the tire 10 is enhanced.

Furthermore, in the tire 10 of the present exemplary embodiment, since the reinforcing cord 26 having a higher rigidity than that of the thermoplastic polyamide-based elastomer is helically wound in a circumferential direction on the outer circumferential surface of the crown portion 16 of the tire case 17 that is formed of the thermoplastic resin material, the resistance to puncture, resistance to cutting, and rigidity in a circumferential direction of the tire are enhanced. In addition, as the rigidity in a circumferential direction of the tire 10 is enhanced, creeping in the tire case 17 formed of the thermoplastic resin material is prevented.

Since, in the cross-sectional view dissected along the axial direction of the tire case 17 (cross-section illustrated in FIG. 1), at least a portion of the reinforcing cord 26 is embedded in the outer circumferential surface of the crown portion 16 of the tire case 17 formed of a thermoplastic polyamide-based elastomer, and the reinforcing cord is adhering to the thermoplastic polyamide-based elastomer, incorporation of air at the time of production is suppressed, and the movement of the reinforcing cord 26 caused by the force applied thereto at the time of driving or the like is prevented. As a result, the occurrence of separation or the like of the reinforcing cord 26, tire case 17 and tread 30 is suppressed, and durability of the tire 10 is enhanced.

As illustrated in FIG. 3, since the depth L of embedding of the reinforcing cord 26 is ⅕ or more of the diameter D, incorporation of air at the time of production is effectively suppressed, and the movement of the reinforcing cord 26 caused by the force applied thereto at the time of driving or the like is further suppressed.

As such, when the reinforcing cord layer 28 is composed by including a thermoplastic polyamide-based elastomer, the difference in hardness between the tire case 17 and the reinforcing cord layer 28 can be made small as compared with the case of fixing the reinforcing cord 26 using a cushion rubber, and therefore, the reinforcing cords 26 can be further adhered and fixed to the tire case 17. As a result, the incorporation of air described above can be effectively prevented, and the reinforcing cord members can be effectively prevented from moving around at the time of driving.

Furthermore, when the reinforcing cord 26 is a steel cord, since the reinforcing cord 26 can be easily separated and collected from the thermoplastic polyamide-based elastomer by heating at the time of disposal of the tire, it is advantageous in view of the recyclability of the tire 10.

Furthermore, since the polyamide-based thermoplastic elastomer has a lower loss factors (Tan δ) as compared with vulcanized rubbers, the rolling property of the tire can be enhanced when the reinforcing cord layer 28 contains a large proportion of a thermoplastic polyamide-based elastomer.

Moreover, the thermoplastic polyamide-based elastomer has an advantage in that the elastomer has high in-plane shear rigidity, leading to excellent steering stability at the time of driving the tire and excellent abrasion resistance.

Since the tread 30 that is brought into contact with the road surface is constructed from a rubber material having a higher abrasion resistance than the thermoplastic polyamide-based elastomer, abrasion resistance of the tire 10 is enhanced.

Furthermore, since the annular bead core 18 formed of a metal material is embedded in the bead portion 12, the tire case 17, that is, the tire 10, is maintained rigid against the rim 20, similarly to the conventional pneumatic tires made of rubber.

Also, since a sealing layer 24 which is formed of a rubber material and has a higher sealing property than the thermoplastic polyamide-based elastomer, is provided at the area of the bead portion 12 which is in contact with the rim 20, the sealing property between the tire 10 and the rim 20 is enhanced. Therefore, as compared with the case of sealing the rim 20 with a thermoplastic polyamide-based elastomer, air leakage in the tire is further suppressed. Also, as the sealing layer 24 is provided, rim fittability is also enhanced.

In the above exemplary embodiment, the reinforcing cord 26 is heated, and the thermoplastic polyamide-based elastomer at the area that is brought into contact with the heated reinforcing cord 26 is melted or softened. However, the present invention is not intended to be limited to this configuration, and it is also acceptable to adopt a configuration in which the reinforcing cord 26 is not heated, but the outer circumferential surface of the crown portion 16 where the reinforcing cord 26 is to be embedded is heated using a hot air generating apparatus, followed by embedding the reinforcing cord 26 in the crown portion 16.

In the exemplary embodiment 1-1, the heat source of the cord heating device 59 includes a heater and a fan. However, the present invention is not limited to this configuration, and a configuration in which the reinforcing cord 26 is directly heated by radiant heat (for example, infrared radiation) may be adopted.

In the configuration of the exemplary embodiment 1-1, the area of the thermoplastic resin material having the reinforcing cord 26 embedded therein which has been melted or softened, is forcibly cooled using a second roller 64 made of a metal. However, the present invention is not intended to be limited to this configuration, and a configuration in which cold air is directly blown to the area where the thermoplastic resin material has been melted or softened, to forcibly cool and solidify the area where the thermoplastic resin material has been melted or softened, may also be adopted.

In the configuration of the exemplary embodiment 1-1, the reinforcing cord 26 is heated. However, for example, a configuration in which an outer circumference of the reinforcing cord 26 is coated with the same thermoplastic resin material as that used in the tire case 17 may also be adopted. In this case, when the coated reinforcing cord is wound around the crown portion 16 of the tire case 17, the thermoplastic resin material that is coating the reinforcing cord is also heated together with the reinforcing cord 26, whereby incorporation of air at the time of embedding in the crown portion 16 can be effectively suppressed.

The tire 10 of the exemplary embodiment 1-1 is a so-called tubeless tire in which an air chamber is formed between the tire 10 and the rim 20 by mounting the bead portion 12 on the rim 20. However, the present invention is not intended to be limited to this configuration, and a complete tube shape may also be employed.

Furthermore, helically winding the reinforcing cord 26 is easier in view of production, but a method of winding the reinforcing cords 26 discontinuously in the width direction, or the like may also be considered.

The exemplary embodiment of the present invention has been explained by way of embodiments. However, these embodiments are only examples, and various modifications may be carried out to the extent that the gist is maintained. Also, it is needless to say that the scope of the present invention is not intended to be limited to these embodiments.

Exemplary Embodiment 1-2

Hereinafter, a tire according to an exemplary embodiment 1-2 will be described with reference to the drawings.

In the present exemplary embodiment, a gas retaining layer configured to include an ethylene-vinyl alcohol copolymer (EVOH) is provided at the second layer from the innermost side in the tire radial direction of a tire case 200. In the same manner as the exemplary embodiment 1-1, the tire of the present exemplary embodiment exhibits a cross-section profile that is substantially the same as an ordinary conventional rubber-made pneumatic tire. The same reference numbers are accordingly appended to similar configuration to that of the exemplary embodiment 1-1 in the following drawings. A gas retaining layer 2B is provided as illustrated by the enlargement (FIG. 6) of region M in FIG. 5A. FIG. 6 is an enlarged diagram to explain the gas retaining layer of the present exemplary embodiment.

Figure 5A:
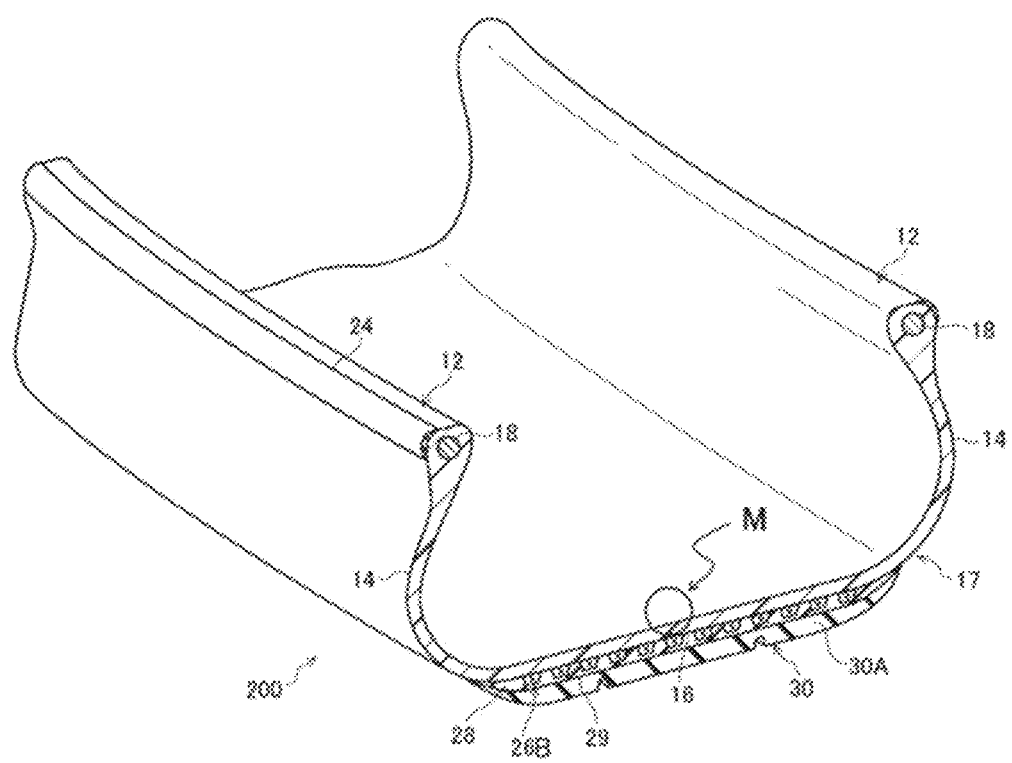
FIG. 5A is a cross-section taken along the tire width direction of a tire according to an exemplary embodiment of the invention.
Figure 5B:
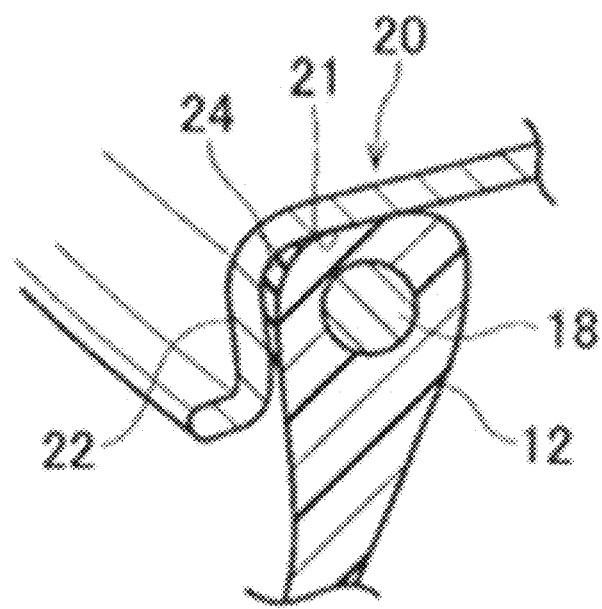
FIG. 5B is an enlarged cross-section taken along the tire width direction of a bead portion, in a fitted state of a rim onto the tire.
Figure 6:
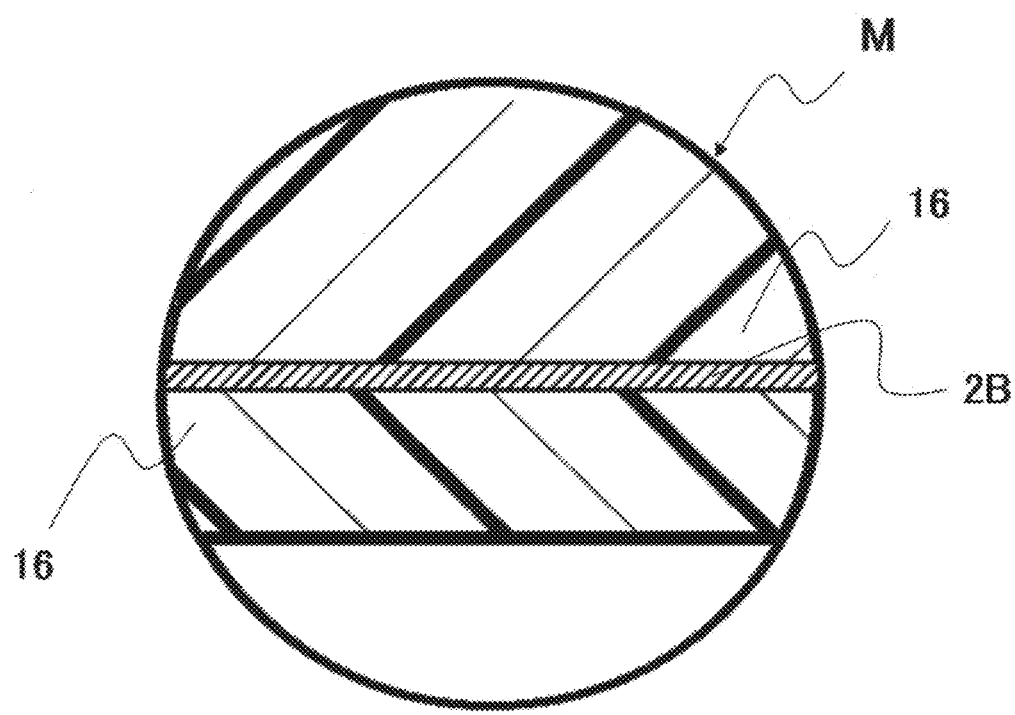
FIG. 6 is an enlarged diagram illustrating a gas barrier layer according to an exemplary embodiment 1-2.
Figure 7:
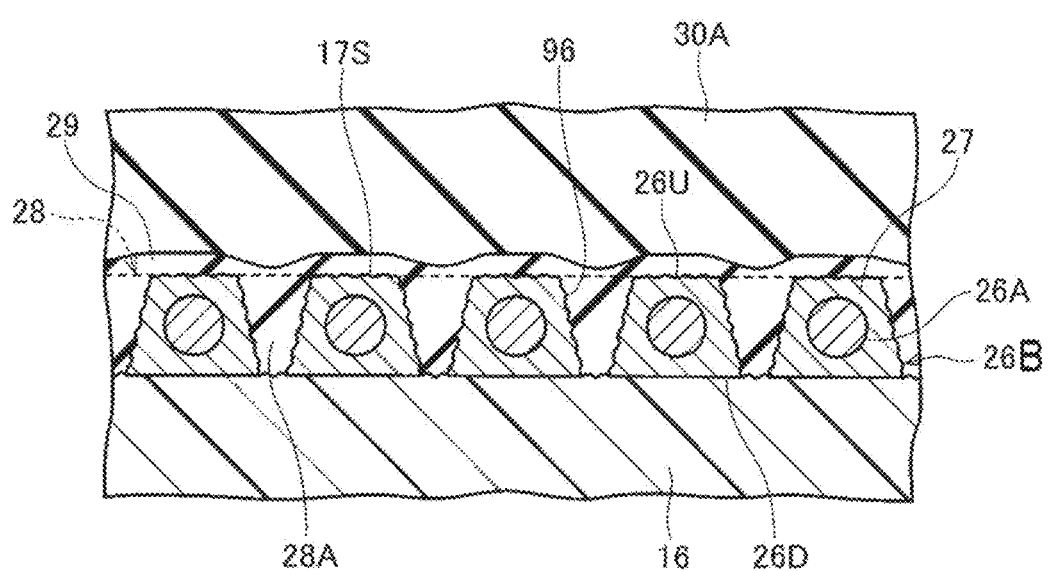
FIG. 7 is a cross-section taken along the tire width direction and illustrating the periphery of a reinforcement layer of a tire according to the exemplary embodiment 1-2.

FIG. 5A is a cross-sectional diagram of a tire according to an exemplary embodiment 1-2, dissected along a tire width direction, and FIG. 5B is a magnified diagram of the cross-section of the bead portion in a state in which a rim is fitted onto the tire according to the exemplary embodiment 1-2, dissected along a tire width direction. FIG. 7 is a cross-sectional diagram illustrating the vicinity of the reinforcing layer of a tire according to the exemplary embodiment 1-2, dissected along a tire width direction.

Similarly to in the exemplary embodiment 1-1, described above, in the tire according to the exemplary embodiment 1-2, a tire case 17 is formed of a thermoplastic polyamide-based elastomer ("UBESTA XPA9055X1", manufactured by Ube Industries, Ltd., melting point 162° C.).

As shown in FIGS. 5 and 7, in a tire 200 according to the present exemplary embodiment, a reinforcing cord layer 28 (indicated by the dashed line in FIG. 7) in which coated cord members 26B are wound in a circumferential direction, is superposed on a crown portion 16. The reinforcing cord layer 28 constitutes an outer circumference of the tire case 17 and reinforces the rigidity in a circumferential direction of the crown portion 16. The outer circumferential surface of the reinforcing cord layer 28 is included in the outer circumferential surface 17S of the tire case 17.

Explanation follows regarding the gas retaining layer 2B, with reference to FIG. 6. The gas retaining layer 2B in the present exemplary embodiment is constituted with EVOH ("L-101", manufactured by Kuraray Co., Ltd.). In the present exemplary embodiment, the film thickness of the gas retaining layer 2B is approximately 100 μm, the gas permeability coefficient is $1.00 \times 10^{-17}$ cm$^3$·cm/(cm$^2$·s·Pa), and the stress under a 4% tensile elongation is 52 MPa. The gas retaining layer 2B in FIG. 6 is positioned at the inner side (at the second layer from the innermost side) in the tire radial direction of the crown portion 16; however, in the present exemplary embodiment, the gas retaining layer 2B is provided across the entire region of the inner side in the tire radial direction of the tire case 17, including at side portions 14.

The coated cord members 26B are each formed by coating a cord member 26A having a higher rigidity than that of the thermoplastic polyamide-based elastomer that forms the tire case 17, with a resin material for coating 27 that is different from the thermoplastic polyamide-based elastomer that forms the tire case 17. Furthermore, the coated cord members 26B and the crow section 16 are bonded (for example, welded, or adhered with an adhesive) in the contact area between the coated cord members 26B and the crown portion 16.

The elastic modulus of the resin material for coating 27 is preferably set within the range of 0.1 times to 10 times the elastic modulus of the resin material that forms the tire case 17. When the elastic modulus of the resin material for coating 27 is 10 times or less the elastic modulus of the thermoplastic resin material that forms the tire case 17, the crown portion does not become too hard, and the rim fitting is facilitated. Also, when the elastic modulus of the resin material for coating 27 is 0.1 times or more the elastic modulus of the thermoplastic resin material that forms the tire case 17, the resin that constitutes the reinforcing cord layer 28 does not become too soft, the in-plane shear rigidity of the belt is excellent, and the cornering power is enhanced.

In the present exemplary embodiment, the same material as the thermoplastic resin material [in the present exemplary embodiment, "UBESTA XPA9055X1", manufactured by Ube Industries, Ltd.] is used as the resin material for coating 27.

Furthermore, as illustrated in FIG. 7, the coated cord members 26B each have a substantially trapezoidal cross-sectional shape. Meanwhile, in the following, the upper surface of the coated cord member 26B (the outer surface in the tire radial direction) is indicated with reference symbol 26U, and the lower surface (the inner surface in the tire radial direction) is indicted with reference symbol 26D. In the present exemplary embodiment, a coated cord member 26B is configured to have a substantially trapezoidal cross-sectional shape. However, the present invention is not intended to be limited to this configuration, and any shape may be employed, except for a cross-sectional shape which becomes broader in width from the lower surface 26D side (inner side in the tire radial direction) toward the upper surface 26U side (outer side in the tire radial direction).

As illustrated in FIG. 7, since the coated cord members 26B are arranged at an interval in a circumferential direction, gaps 28A are formed between adjacent coated cord members 26B. Therefore, the outer circumferential surface of the reinforcing cord layer 28 is provided with surface asperities, and the outer circumferential surface 17S of the tire case 17 in which this reinforcing cord layer 28 constitutes an outer circumference is also provided with surface asperities.

On the outer circumferential surface 17S (including the surface asperities) of the tire case 17, finely roughened surface asperities 96 are uniformly formed, and a cushion rubber 29 is bonded thereon by means of a bonding agent. In regard to this cushion rubber 29, the rubber part of the inner side in the radial direction flows into the roughened surface asperities 96.

Furthermore, a tread 30 formed of a material, such as a rubber, having an abrasion resistance superior to that of the resin material that forms the tire case 17 is bonded to the top (outer circumferential surface) of the cushion rubber 29.

As the rubber used for the tread 30 (tread rubber 30A), a rubber of the same kind as that of the rubber used in the conventional pneumatic tires made of rubber is preferably used. Instead of the tread 30, a tread formed of a resin material of other kind and having an abrasion resistance superior to that of the resin material that forms the tire case 17 may be used. Furthermore, in the tread 30, a tread pattern (not depicted in the drawings) having plural grooves is formed on the contact surface with the road surface, similarly to the conventional pneumatic tires made of rubber.

Next, the method for producing a tire of the present exemplary embodiment will be described.

(Frame Forming Step)

First, tire case half parts 17A are formed in the same manner as in the exemplary embodiment 1-1 described above, and they are heated and pressed using a bonding mold, to thereby form a tire case 17.

(Reinforcing Cord Member Winding Step)

The tire producing apparatus used in the present exemplary embodiment is similar to that is the exemplary embodiment 1-1, except that a coated cord member 26B that has a substantially trapezoidal cross-sectional shape and that is obtained by coating a cord member 26A with a resin material for coating 27 (the thermoplastic resin material in the present exemplary embodiment), is wound around the reel 58 in the cord feeding apparatus 56 illustrated in FIG. 4 of the exemplary embodiment 1-1.

First, the temperature of the heater 70 is increased, and the air in the surroundings that has been heated by the heater 70 is sent to the heating box 74 by means of the wind generated by rotation of the fan 72. The coated cord member 26B that is wound off from the reel 58 is sent into the heating box 74 in which the internal space has been heated by hot air, so as to be heated (for example, the temperature at the outer circumferential surface of the coated cord member 26B is adjusted to a temperature equal to or higher than the melting temperature of the resin material for coating 27). Here, as the coated cord member 26B is heated, the resin material for coating 27 is brought to a state of being melted or softened.

The coated cord member 26B is passed through the discharge port 76 and is helically wound, with a certain tension, around the outer circumferential surface of the crown portion 16 of the tire case 17 that rotates in the near side direction of the plane of paper. At this time, the lower surface 26D of the coated cord member 26B is brought into contact with the outer circumferential surface of the crown portion 16. The resin material for coating 27 that is in a molten or softened state at the contact area spreads over the outer circumferential surface of the crown portion 16, and the coated cord member 26B is welded to the outer circumferential surface of the crown portion 16. As a result, the bonding strength between the crown portion 16 and the coated cord member 26B is enhanced.

(Roughening Treatment Step)

Next, in the blasting apparatus that is not depicted in the drawings, a projection material is injected out at a high speed onto the outer circumferential surface 17S toward the outer circumferential surface 17S of the tire case 17, while rotating the tire case 17. The projection material that has been injected collides with the outer circumferential surface 17S, and forms finely roughened surface asperities 96 having an arithmetic mean roughness Ra of 0.05 mm or larger on the outer circumferential surface 17S.

When finely roughened surface asperities are formed on the outer circumferential surface 17S of the tire case 17 in this manner, the outer circumferential surface 17S becomes hydrophilic, and the wettability of the bonding agent that will be described below is enhanced.

(Superposing Step)

Next, a bonding agent is applied on the outer circumferential surface 17S of the tire case 17 that has been subjected to a roughening treatment.

Note that examples of the bonding agent include a triazinethiol-based adhesive, a chlorinated rubber-based adhesive, a phenolic resin adhesive, an isocyanate-based adhesive, and a halogenated rubber-based adhesive, and there are no particular limitations. However, it is preferable that the bonding agent is capable of reacting at a temperature at which the cushion rubber 29 is vulcanized (90° C. to 140° C.).

Next, a cushion rubber 29 in an unvulcanized state is wound once on the outer circumferential surface 17S where the bonding agent has been applied, and on the cushion rubber 29, for example, a bonding agent such as a rubber cement composition is applied. A tread rubber 30A that is in a vulcanized or semi-vulcanized state is wound once thereon, thereby obtaining a tire case in a raw state.

(Vulcanizing Step)

Next, the raw tire case is accommodated in a vulcanizing can or mold and is subjected to vulcanization. At this time, an unvulcanized cushion rubber 29 flows into the roughened surface asperities 96 that are formed on the outer circumferential surface 17S of the tire case by the roughening treatment. After completion of the vulcanization, an anchor effect is exhibited by the cushion rubber 29 that has flown into the roughened surface asperities 96, and the bonding strength between the tire case 17 and the cushion rubber 29 is thus enhanced. In other words, the bonding strength between the tire case 17 and the tread 30 is enhanced by means of the cushion rubber 29.

(Gas Retaining Layer Forming Step)

Then the tire case 17 is positioned in a blow molding apparatus that is not depicted in the drawings. Melted EVOH is then extruded from the dies, blow molding so as to form a layer of EVOH over the entire surface of the inner side in the tire radial direction of the tire case 17. When doing so, the extruded amount of the melted EVOH is determined such that the film thickness of the gas retaining layer 2B, described above, is 100 μm. After forming the gas retaining layer 2B, melted thermoplastic polyamide-based elastomer (the above "UBESTA XPA9055X1", manufactured by Ube Industries, Ltd.) is further extruded, forming a layer of thermoplastic polyamide-based elastomer over the EVOH layer surface by blow molding. The tire case 17 is thereby formed with the gas retaining layer 2B formed of EVOH at the second layer from the innermost side in the radial direction of the tire case 17. Note that blow molding may be performed in accordance with a known method.

Then, a sealing layer 24 formed of a soft material which is softer than the resin material is adhered to the bead portion 12 of the tire case 17 by using an adhesive or the like, thereby obtaining the tire 200.

(Operation)

The tire 200 of the present exemplary embodiment is formed with the gas retaining layer 2B with gas permeability coefficient of $1.00 \times 10^{-17}$ cm$^3$·cm/(cm$^2$·s·Pa) at the second layer from the innermost side in the tire radial direction of the tire case 17A, thereby enabling the gas retaining properties of the tire 10 to be raised. Thus when the tire 200 of the present exemplary embodiment is fitted onto the rim 20, the retaining properties to gas filled inside the tire 200 are high.

In the present exemplary embodiment, the gas retaining layer 2B is constituted with EVOH, and so increase in weight of the tire 200 is suppressed even when the gas retaining layer 2B is formed, and the adhesiveness (thermal fusing properties) to the tire case 17 formed with a thermoplastic polyamide-based elastomer is also high. Moreover, due to the stress of the gas retaining layer 2B under a 4% tensile elongation being 52 MPa, the durability of the gas retaining layer 2B, such as to impacts to the tire 200, is also high.

In the tire 200 of the present exemplary embodiment, since the tire case 17 is formed of a thermoplastic polyamide-based elastomer, the tire 200 is excellent in heat resistance, tensile elastic modulus, tensile strength, and fracture strain, and moreover weight is also lighter due to the structure being simpler than a conventional rubber-made tire. Accordingly, the tire 200 of the present exemplary embodiment has high abrasion resistance and high durability. Moreover, the melting point of the thermoplastic polyamide-based elastomer configuring the tire case 17 is 154° C., and hence due to, for example, approximately 210° C. being sufficient to perform binding of the tire case pieces 17A, this enables energy consumption to be suppressed, and enables costs for heating to be suppressed. Polyamide elastomers also have high adhesiveness to the coated cord member 26B.

As such, when the reinforcing cord layer 28 is configured to include the coated cord members 26B, the difference in hardness between the tire case 17 and the reinforcing cord layer 28 can be reduced as compared with the case of fixing the cord member 26A simply using a cushion rubber 29, whereby the coated cord member 26B can be further adhered and fixed to the tire case 17. As a result, incorporation of air described above can be effectively prevented, and the reinforcing cord member can be effectively prevented from moving at the time of driving.

Furthermore, when the cord member 26A is a steel cord, the cord member 26A can be easily separated and collected from the coated cord member 26B by heating at the time of tire disposal. Therefore, it is advantageous in view of the recyclability of the tire 200. Furthermore, since a thermoplastic polyamide-based elastomer has a lower loss factors (Tan δ) as compared with vulcanized rubbers, when the reinforcing cord layer 28 contains a thermoplastic polyamide-based elastomer in large amounts, the rolling property of the tire can be improved. Moreover, the thermoplastic polyamide-based elastomer has an advantage in that it has high in-plane shear rigidity, leading to excellent steering stability at the time of driving the tire and excellent abrasion resistance.

In the method for producing a tire according to the present exemplary embodiment, since the outer circumferential surface 17S of the tire case 17 is roughened before the tire case 17, the cushion rubber 29, and the tread rubber 30A are integrated, the bonding property (adhesion property) is increased owing to an anchor effect. Furthermore, since the resin material that forms the tire case 17 is dug up as a result of the collision of the projection material, wettability of the bonding agent is enhanced. Whereby, the bonding agent is retained in a uniformly applied state on the outer circumferential surface 17S of the tire case 17, and the bonding strength between the tire case 17 and the cushion rubber 29 can thus be secured.

Particularly, even when surface asperities 96 are formed on the outer circumferential surface 17S of the tire case 17, a roughening treatment in the vicinity of the concave sections (concave walls and concave bottoms) is achieved by causing a projection material to collide with the concave sections (gaps 28A). Thus, the bonding strength between the tire case 17 and the cushion rubber 29 can be secured.

On the other hand, since the cushion rubber 29 is superposed within the roughened region of the outer circumferential surface 17S of the tire case 17, the bonding strength between the tire case 17 and the cushion rubber 29 can be effectively secured.

In the vulcanizing step, when the cushion rubber 29 is vulcanized, the cushion rubber 29 flows into the surface-roughened asperities 96 that have been formed on the outer circumferential surface 17S of the tire case 17 by a roughening treatment. After completion of the vulcanization, an anchor effect is exhibited by the cushion rubber 29 that has flown into the surface-roughened asperities 96, and the bonding strength between the tire case 17 and the cushion rubber 29 is enhanced.

In the tire 200 that is produced by such a method for producing a tire, the bonding strength between the tire case 17 and the cushion rubber 29 is secured. In other words, the bonding strength between the tire case 17 and the tread 30 is secured by means of the cushion rubber 29. Thus, on the occasion of driving or the like, separation between the outer circumferential surface 17S of the tire case 17 and the cushion rubber 29 in the tire 200 is suppressed.

Furthermore, since the reinforcing cord layer 28 is formed on an outer circumference of the tire case 17, the resistance to puncture and resistance to cutting are enhanced as compared with the case where an outer circumference is formed of a member other than the reinforcing cord layer 28.

Furthermore, since the reinforcing cord layer 28 is formed by winding the coated cord member 26B, the rigidity in a circumferential direction of the tire 200 is increased. As the rigidity in a circumferential direction is increased, creeping (a phenomenon in which plastic deformation of the tire case 17 increases with time under a constant stress) in the tire case 17 is suppressed, and pressure resistance against the air pressure from the inner side in the tire radial direction is enhanced.

In the present exemplary embodiment, the outer circumferential surface 17S of the tire case 17 is configured to include surface asperities. However, the present invention is not intended to be limited to this, and the outer circumferential surface 17S may be flat.

Furthermore, in the tire case 17, the reinforcing cord layer may be formed such that the coated cord member that is wound and bonded to the crown portion of the tire case is covered with a thermoplastic material for coating. In this case, the thermoplastic material for coating that is in a molten or softened state may be ejected on the reinforcing cord layer 28, thereby forming a coating layer. Furthermore, a coating layer may be formed by heating a welding sheet to a molten or softened state and pasting the welding sheet on the surface (outer circumferential surface) of the reinforcing cord layer 28, without using an extruder.

In the above described exemplary embodiment 1-2, a configuration in which casing divisions (tire case half parts 17A) are bonded to form the tire case 17 is employed. However, the present invention is not intended to be limited to this configuration, and the tire case 17 may also be formed integrally using a mold or the like.

The tire 200 of the exemplary embodiment 1-2 is a so-called tubeless tire in which an air chamber is formed between the tire 200 and the rim 20 by mounting a bead portion 12 to the rim 20. However, the present invention is not intended to be limited to this configuration, and the tire 200 may also have, for example, a perfect tube shape.

In the exemplary embodiment 1-2, the cushion rubber 29 is disposed between the tire case 17 and the tread 30. However, the present invention is not intended to be limited to this, and a configuration in which the cushion rubber 29 is not disposed may be employed.

In the exemplary embodiment 1-2, a configuration in which the coated cord member 26B is helically wound in the crown portion 16 is employed. However, the present invention is not intended to be limited to this, and a configuration in which the coated cord members 26B are wound discontinuously in the width direction may also be used.

In the exemplary embodiment 1-2, a configuration is employed, in which a thermoplastic material is used as the resin material for coating 27 that forms the coated cord members 26B, and the coated cord member 26B is welded to the outer circumferential surface of the crown portion 16 by melting or softening the resin material for coating 27 by heating. However, the present invention is not intended to be limited to this configuration, and a configuration in which the coated cord member 26B is adhered to the outer circumferential surface of the crown portion 16 by using an adhesive or the like, without heating the resin material for coating 27, may be used.

Furthermore, a configuration in which a thermosetting resin is used as the resin material for coating 27, and the resin material for coating 27 is adhered to the outer circumferential surface of the crown portion 16 by using an adhesive or the like, without heating the coated cord member 26B, may also be used.

Moreover, a configuration in which a thermosetting resin is used as the resin material for coating 27 that forms the coated cord members 26B, and the tire case 17 is formed from a thermoplastic material, may also be employed. In this case, the coated cord members 26B may be adhered to the outer circumferential surface of the crown portion 16 by using an adhesive or the like, or the coated cord member 26B may be welded to the outer circumferential surface of the crown portion 16 after the site in the tire case 17 where the coated cord member 26B is to be arranged has been heated to a molten or softened state.

Also, a configuration in which a thermoplastic material is used as the resin material for coating 27 that forms the coated cord members 26B, and the tire case 17 is formed from a thermoplastic material, may also be employed.

In this case, the coated cord member 26B may be adhered to the outer circumferential surface of the crown portion 16 by using an adhesive or the like, or the coated cord member 26B may be welded to the outer circumferential surface of the crown portion 16 by heating the resin material for coating 27 to a molten or softened state, while heating the site in the tire case 17 where the coated cord member 26B is to be arranged, to a molten or softened state. When both the tire case 17 and the coated cord member 26B are heated to a molten or softened state, the bonding strength is increased since both components are highly miscible. Furthermore, in the case of the resin material that forms the tire case 17 as well as the resin material for coating 27 that forms the coated cord members 26B are thermoplastic materials, it is preferable that the thermoplastic materials are of the same kind, and particularly preferably are the same thermoplastic material.

In addition, the front surface of the outer circumferential surface 17S of the tire case 17 that has been subjected to a roughening treatment may be activated by a corona treatment, a plasma treatment or the like to increase hydrophilicity, and then an adhesive may be applied thereon.

Also, the procedures for producing the tire 200 are not intended to be limited to the procedures of the exemplary embodiment 1-2, and may be appropriately modified.

Thus, embodiments of the present invention have been explained by way of exemplary embodiments. However, these embodiments are only examples, and various modifications can be made to the extent that the gist is maintained. Furthermore, it is needless to say that the scope of rights of the present invention is not limited to these exemplary embodiments.

Moreover, although explanation has been given in the 1-1 exemplary embodiment and the 1-2 exemplary embodiment of exemplary embodiments in which reinforcing cord is wound onto the tire case, reinforcing cord is not an essential configuration element of the invention, and configuration may be made without winding reinforcing cord onto the tire case.

Second Exemplary Embodiment

A tire according to a second exemplary embodiment of the invention includes at least a circular tire frame body that is formed from a resin material and has a layered structure, wherein the tire frame body includes at least one gas retaining layer that includes a resin composition formed of a thermoplastic polyamide-based resin and an elastomer, and has a gas permeability coefficient of $2.0 \times 10^{-14}$ cm$^3$·cm/(cm$^2$·s·Pa) or less at 80° C.

When providing a gas retaining layer in a tire frame body, generally the higher the gas retaining properties of the layer (the gas barrier properties), the more desirable. A material having high gas barrier properties may be employed to raise the gas retaining properties of the gas retaining layer. For example, when, from the viewpoint of weight reduction of the tire, a thermoplastic resin is employed as the material of the gas retaining layer, a thermoplastic resin having high gas barrier properties may be appropriately selected. There is, however, the issue that a thermoplastic resin having high gas barrier properties normally has inversely proportionally low flexibility. Namely, in order to raise the gas barrier properties of a thermoplastic resin, the flexibility of the thermoplastic resin is inversely proportionally lowered. Moreover, when a gas retaining layer is formed using such a thermoplastic resin having low flexibility, a large difference arises in elastic moduli between the gas retaining layer and the tire frame body. It is accordingly anticipated that the gas retaining layer will be more susceptible to coming away from the tire frame body on impact or the like, and more susceptible to cracks developing in the gas retaining layer. Thus such a fall in durability of the gas retaining layer makes a drop in the gas retaining properties (internal pressure retaining properties) of the tire frame body more likely, and it is suspected that it will result a drop in the durability of the tire. The development of a gas retaining layer that is suitably applied to a tire employing a polymer material, and that has ample flexibility while also having high gas retaining properties is accordingly desired.

In the tire of the second exemplary embodiment of the invention, the tire frame body has a layered structure, and includes at least one gas retaining layer having a gas permeability coefficient of $2.0 \times 10^{-14}$ cm$^3$·cm/(cm$^2$·s·Pa) or less at 80° C. The gas retaining layer includes a resin composition formed of a thermoplastic polyamide-based resin and an elastomer. A tire according to the second exemplary embodiment of the invention has the gas retaining layer provided to the tire frame body, enabling the gas retaining properties of the tire frame body with respect to gases, such as air, nitrogen gas, or the like, to be improved. Thus a tire according to the invention is capable of being effectively employed in what is referred to as a pneumatic tire, in which the tire frame body is fitted onto a rim, and gas is filled into a void surrounded by the tire frame body and the rim. Raising the gas retaining properties of the tire also, at the same time, raises the internal pressure retaining properties of the tire.

The gas retaining layer includes the resin composition formed of a thermoplastic polyamide-based resin and an elastomer, thereby enabling the flexibility of the gas retaining layer to be raised compared to cases in which the gas retaining layer is formed by employing a thermoplastic polyamide-based resin alone. This thereby enables damage to the gas retaining layer, such as due to the tire absorbing an external impact or the like, to be suppressed, enabling the durability of the tire to be raised.

Moreover, in the tire according to the invention, the gas retaining layer is constituted with a thermoplastic polyamide-based resin and an elastomer, and so the gas retaining properties is raised while suppressing an increase in tire weight. The thermoplastic polyamide-based resin also has excellent adhesiveness (thermal fusing properties) to the tire frame body, due to the compatibility to the resin material that forms the tire frame body. The gas retaining layer accordingly has excellent adhesiveness to the resin material that constitutes the tire frame body, enabling the durability and productivity of the tire frame body to be improved.

In the present exemplary embodiment, from the viewpoint raising the durability of the tire frame body and the gas retaining layer in relation to the elastic modulus of the tire frame body, the stress of the gas retaining layer under a 4% tensile elongation is, normally, preferably 50 MPa or less, more preferably 40 MPa or less, and particularly preferably 30 MPa or less. There is no particular limitation to the lower limit of the stress of the gas retaining layer under a 4% tensile elongation.

A tire of the second exemplary embodiment of the invention may have a content ratio of the elastomer with respect to the thermoplastic polyamide-based resin in a range of from 10% by volume to 48% by volume. Setting the content ratio of the elastomer, with respect to the thermoplastic polyamide-based resin, at from 10% by volume to 48% by volume enables sufficient improvement effect to be obtained in flexibility and durability by being compounded with elastomer while retaining high gas barrier properties.

The content ratio of the elastomer with respect to the thermoplastic polyamide-based resin is more preferably from 20% by volume to 45% by volume.

A tire of the second exemplary embodiment of the invention may employ a thermoplastic elastomer as the elastomer. An increase in weight of the gas retaining layer can be suppressed by employing a thermoplastic elastomer as the elastomer.

A tire of the second exemplary embodiment of the invention may employ a thermoplastic polyolefin-based elastomer as the thermoplastic elastomer. Combining a thermoplastic polyolefin-based elastomer with the thermoplastic polyamide-based resin enables high gas retaining properties, flexibility, and durability, to be imparted to the gas retaining layer.

A tire according to the second exemplary embodiment of the invention may be configured such that the gas retaining layer has a stress under a 4% tensile elongation of 50 MPa or less. Setting the tensile elastic modulus of the gas retaining layer to 50 MPa or less enables sufficient flexibility of the gas retaining layer, and enables it to be close to the elastic modulus of the tire frame body formed from a resin material. This thereby enables cracks to be suppressed from developing in the gas retaining layer, such as due to impacts or the like which is caused by the force applied from the outside, and enables delamination from the tire frame body to be suppressed.

The tensile elastic modulus of the gas retaining layer is preferably 40 MPa or less and is more preferably 30 MPa or less.

In the tire of the second exemplary embodiment of the invention, a modified elastomer, or a mixture of a modified elastomer and an unmodified elastomer may be employed as the elastomer. Employing a modified elastomer, or a mixture of a modified elastomer and an unmodified elastomer, as the elastomer enables a fine sea-island structure to be obtained. This thereby enables high gas retaining properties of the gas retaining layer, and enables high flexibility and durability.

A tire of the second exemplary embodiment of the invention may have the gas retaining layer configured with the thermoplastic polyamide-based resin as a sea phase and the elastomer as an island phase, with the thermoplastic polyamide-based resin dispersed in scattered dot shapes within the island phase of the elastomer (a salami structure). Configuring the gas retaining layer by a salami structure enables the gas retaining properties per unit area to be raised while maintaining flexibility in comparison to cases in which, simply, an island phase of elastomer is formed in a sea phase of thermoplastic polyamide-based resin.

A tire according to the second exemplary embodiment of the invention may be configured to employ a thermoplastic resin as the resin material forming the tire frame body.

A tire according to the second exemplary embodiment of the invention may be configured to employ a thermoplastic elastomer as the resin material forming the tire frame body.

Exemplary Embodiment 2-1

Hereinafter, with respect to a second exemplary embodiment of the invention, a tire according to an exemplary embodiment 2-1 will be described with reference to the drawings. A tire according to the exemplary embodiment 2-1 of the invention is configured similarly to the tire of the exemplary embodiment 1-1, except in the point that the gas retaining layer 2A of the tire 10, explained with reference to FIG. 1 to FIG. 4, is a gas retaining layer ($2.0 \times 10^{-14}$ $cm^3 \cdot cm/(cm^2 \cdot s \cdot Pa)$) constituted with a resin composition formed of a thermoplastic polyamide-based resin (polyamide 6) and two types of polyolefin-based elastomer (ethylene/butene copolymer). Therefore FIG. 1 to FIG. 4 will be employed in the following explanation of the present exemplary embodiment, and explanation of similar members will be omitted.

A tire 10 of the present exemplary embodiment will be explained. In the present exemplary embodiment, a gas retaining layer ($2.0 \times 10^{-14}$ $cm^3 \cdot cm/(cm^2 \cdot s \cdot Pa)$) is provided at the innermost side in the tire radial direction of the tire case 10 constituted with a resin composition formed of a thermoplastic polyamide-based resin (polyamide 6) and two types of polyolefin-based elastomer (ethylene/butene copolymer).

The gas retaining layer 2A according to the present exemplary embodiment will be described with reference to FIG. 2. The gas retaining layer 2A in the present exemplary embodiment is configured with a resin composition formed of polyamide 6 ("Nylon 6 1022B", manufactured by Ube Industries, Ltd.), and an acid-modified thermoplastic polyolefin-based elastomer ("TAFMER MH7010", manufactured by Mitsui Chemicals, Inc.) and an unmodified thermoplastic polyolefin-based elastomer ("TAFMER A1050", manufactured by Mitsui Chemicals, Inc.) (volume ratio (1022B:MH7010:A1050)=90:5:5). The polyamide 6 and the thermoplastic polyolefin-based elastomer may be mixed in a general twin screw kneading-extruder (for example "TEX-30", manufactured by Japan Steel Works Ltd.).

In the present exemplary embodiment, the film thickness of the gas retaining layer 2A is approximately 100 μm, the gas permeability coefficient is $2.0 \times 10^{-14}$ $cm^3 \cdot cm/(cm^2 \cdot s \cdot Pa)$, and the stress under a 4% tensile elongation is 30 MPa. The gas retaining layer 2A in FIG. 2 is positioned at the inner side in the tire radial direction of a crown portion 16, however, in the present exemplary embodiment, the gas retaining layer is provided across the entire region of the inner side in the tire radial direction of the tire case 17, including at the side portions 14.

Figure 8:
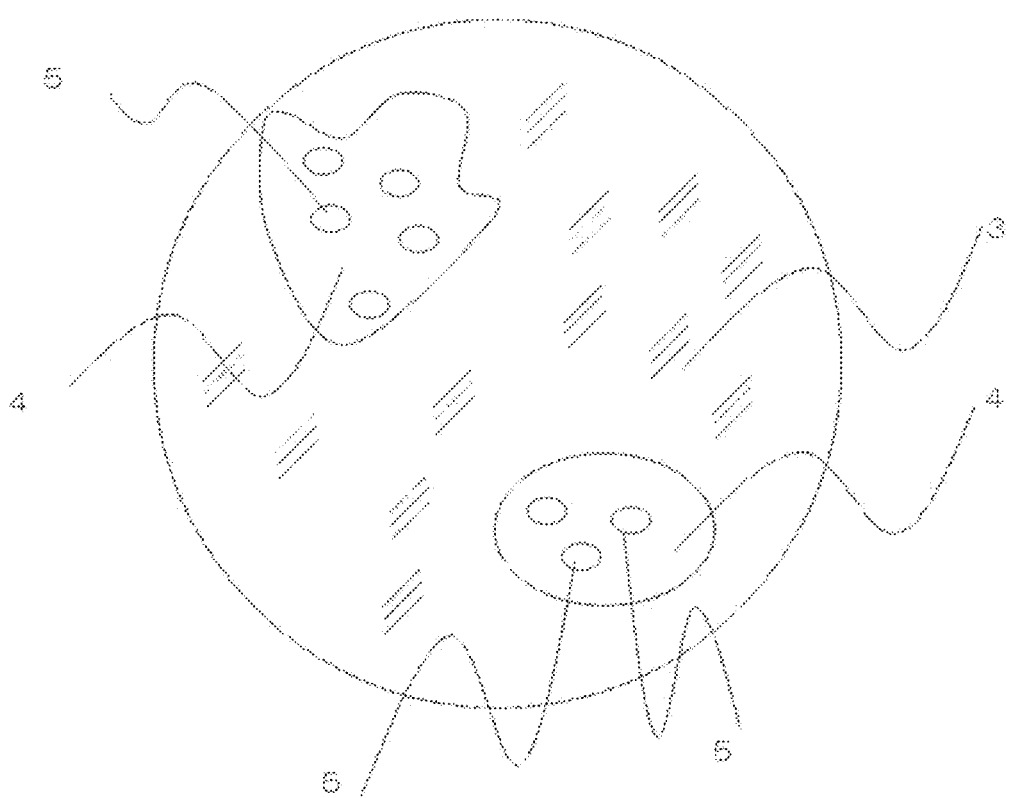
FIG. 8 is a schematic diagram to explain a salami structure of a gas retaining layer.

As illustrated in FIG. 8, the gas retaining layer 2A has a salami structure composed of the polyamide 6 and the thermoplastic polyolefin-based elastomer. FIG. 8 is a schematic diagram to explain a salami structure of the gas retaining layer. As illustrated in FIG. 8, the gas retaining layer 2A has a salami structure that includes a sea phase 3 composed of a thermoplastic polyamide-based resin (polyamide 6), an island phase 4 composed of a thermoplastic polyolefin-based elastomer (ethylene/butene copolymer), and a pond phase 5 composed of a thermoplastic polyamide-based resin (polyamide 6). As illustrated in FIG. 8, the pond phase 5 is present as scattered dot shapes in the island phase 4.

A method for producing a tire of the present exemplary embodiment is similar to that of the exemplary embodiment 1-1, except in that, in a gas retaining layer forming step in the exemplary embodiment 1-1, when the tire case 17 is positioned in a blow molding machine, a melted mixture of polyamide 6 and thermoplastic polyolefin-based elastomer (two types) is extruded from the dies.

(Operation)

The tire 10 of the present exemplary embodiment is formed with the gas retaining layer 2A with gas permeability coefficient of $2.0 \times 10^{-14}$ cm$^3$·cm/(cm$^2$·s·Pa) at the inner side in the tire radial direction of the tire case 17A, that contains the resin composition formed of a thermoplastic polyamide-based resin (polyamide 6) and polyolefin-based elastomer (ethylene/butene copolymer (two types)), thereby enabling the gas retaining properties of the tire 10 to be improved while raising the flexibility of the gas retaining layer 2A. Thus when the tire 10 of the present exemplary embodiment is fitted onto the rim 20, the retaining properties to gas filled inside the tire 10 are high.

In the present exemplary embodiment, the gas retaining layer 2A is constituted with the polyamide 6, that is a thermoplastic polyamide-based resin, and so increase in weight of the tire 10 is suppressed even when the gas retaining layer 2A is formed, and the adhesiveness (thermal fusing properties) to the tire case 17 formed of a thermoplastic polyamide-based elastomer is also high. Moreover, due to the stress of the gas retaining layer 2A under a 4% tensile elongation being 30 MPa, the durability of the gas retaining layer 2A, such as to impacts to the tire 10, is also high.

In the tire 10 of the present exemplary embodiment, since the tire case 17 is formed of a thermoplastic polyamide-based elastomer, the tire 10 is excellent in heat resistance, tensile elastic modulus, tensile strength, and fracture strain, and moreover weight is also lighter due to the structure being simpler than a conventional rubber-made tire. Accordingly, the tire 10 of the present exemplary embodiment has high abrasion resistance and high durability. Moreover, the melting point of the thermoplastic polyamide-based elastomer configuring the tire case 17 is 162° C., and hence due to, for example, approximately 210° C. being sufficient to perform binding of the tire case pieces 17A, this enables energy consumption to be suppressed, and enables costs for heating to be suppressed.

Polyamide elastomers have high adhesiveness to the reinforcing cord 26, and moreover excellent fixing ability, such as welding strength. Therefore, the phenomenon in which air remains (incorporation of air) in the vicinity of the reinforcing cord 26 in the reinforcing cord winding step can be suppressed. When the resin material has high adhesiveness and welding properties to the reinforcing cord 26, and incorporation of air into the vicinity of the reinforcing cord members is suppressed, it is possible to effectively prevent the movement of the reinforcing cord 26 which is caused by the force applied thereto at the time of driving or the like. As a result, for example, since the movement of the reinforcing cord members is suppressed, even in the case where a tire-constituting member is arranged so as to cover the entirety of the reinforcing cord members in an outer circumference of the tire frame, the occurrence of separation or the like between these members (including the tire frame) is suppressed, and durability of the tire 10 is enhanced.

Furthermore, in the tire 10 of the present exemplary embodiment, since the reinforcing cord 26 having a higher rigidity than that of the thermoplastic polyamide-based elastomer is helically wound in a circumferential direction on the outer circumferential surface of the crown portion 16 of the tire case 17 that is formed from the thermoplastic resin material, the resistance to puncture, resistance to cutting, and rigidity in a circumferential direction of the tire are enhanced. In addition, as the rigidity in a circumferential direction of the tire 10 is enhanced, creeping in the tire case 17 formed from the thermoplastic resin material is prevented.

Since, in the cross-sectional view dissected along the axial direction of the tire case 17 (cross-section illustrated in FIG. 1A), at least a portion of the reinforcing cord 26 is embedded in the outer circumferential surface of the crown portion 16 of the tire case 17 formed of a thermoplastic polyamide-based elastomer, and the reinforcing cord is adhering to the thermoplastic polyamide-based elastomer, incorporation of air at the time of production is suppressed, and the movement of the reinforcing cord 26 caused by the force applied thereto at the time of driving or the like is prevented. As a result, the occurrence of separation or the like of the reinforcing cord 26, tire case 17 and tread 30 is suppressed, and durability of the tire 10 is enhanced.

As illustrated in FIG. 3, since the depth L of embedding of the reinforcing cord 26 is ⅕ or more of the diameter D, incorporation of air at the time of production is effectively suppressed, and the movement of the reinforcing cord 26 caused by the force applied thereto at the time of driving or the like is further suppressed.

As such, when the reinforcing cord layer 28 is composed by including a thermoplastic polyamide-based elastomer, the difference in hardness between the tire case 17 and the reinforcing cord layer 28 can be made small as compared with the case of fixing the reinforcing cord 26 using a cushion rubber, and therefore, the reinforcing cords 26 can be further adhered and fixed to the tire case 17. As a result, the incorporation of air described above can be effectively prevented, and the reinforcing cord members can be effectively prevented from moving around at the time of driving.

Furthermore, when the reinforcing cord 26 is a steel cord, since the reinforcing cord 26 can be easily separated and collected from the thermoplastic polyamide-based elastomer by heating at the time of disposal of the tire, it is advantageous in view of the recyclability of the tire 10.

Furthermore, since the polyamide-based thermoplastic elastomer has a lower loss factors (Tan δ) as compared with vulcanized rubbers, the rolling property of the tire can be enhanced when the reinforcing cord 28 contains a large proportion of a thermoplastic polyamide-based elastomer.

Moreover, the thermoplastic polyamide-based elastomer has an advantage in that the elastomer has high in-plane shear rigidity, leading to excellent steering stability at the time of driving the tire and excellent abrasion resistance.

Since the tread 30 that is brought into contact with the road surface is constructed from a rubber material having a higher abrasion resistance than the thermoplastic polyamide-based elastomer, abrasion resistance of the tire 10 is enhanced.

Furthermore, since the annular bead core 18 formed of a metal material is embedded in the bead portion 12, the tire case 17, that is, the tire 10, is maintained rigid against the rim 20, similarly to the conventional pneumatic tires made of rubber.

Also, since a sealing layer 24 which is formed of a rubber material and has a higher sealing property than the thermoplastic polyamide-based elastomer, is provided at the area of the bead portion 12 which is in contact with the rim 20, the sealing property between the tire 10 and the rim 20 is enhanced. Therefore, as compared with the case of sealing the rim 20 with a thermoplastic polyamide-based elastomer, air leakage in the tire is further suppressed. Also, as the sealing layer 24 is provided, rim fittability is also enhanced.

In the above exemplary embodiment, the reinforcing cord 26 is heated, and the thermoplastic polyamide-based elastomer at the area that is brought into contact with the heated reinforcing cord 26 is melted or softened. However, the present invention is not intended to be limited to this configuration, and it is also acceptable to adopt a configuration in which the reinforcing cord 26 is not heated, but the outer circumferential surface of the crown portion 16 where the reinforcing cord 26 is to be embedded is heated using a hot air generating apparatus, followed by embedding the reinforcing cord 26 in the crown portion 16.

In the exemplary embodiment 2-1, the heat source of the cord heating device 59 includes a heater and a fan. However, the present invention is not limited to this configuration, and a configuration in which the reinforcing cord 26 is directly heated by radiant heat (for example, infrared radiation) may be adopted.

In the configuration of the exemplary embodiment 2-1, the area of the thermoplastic resin material having the reinforcing cord 26 embedded therein which has been melted or softened, is forcibly cooled using a second roller 64 made of a metal. However, the present invention is not intended to be limited to this configuration, and a configuration in which cold air is directly blown to the area where the thermoplastic resin material has been melted or softened, to forcibly cool and solidify the area where the thermoplastic resin material has been melted or softened, may also be adopted.

In the configuration of the exemplary embodiment 2-1, the reinforcing cord 26 is heated. However, for example, a configuration in which an outer circumference of the reinforcing cord 26 is coated with the same thermoplastic resin material as that used in the tire case 17 may also be adopted. In this case, when the coated reinforcing cord is wound around the crown portion 16 of the tire case 17, the thermoplastic resin material that is coating the reinforcing cord is also heated together with the reinforcing cord 26, whereby incorporation of air at the time of embedding in the crown portion 16 can be effectively suppressed.

The tire 10 of the exemplary embodiment 2-1 is a so-called tubeless tire in which an air chamber is formed between the tire 10 and the rim 20 by mounting the bead portion 12 on the rim 20. However, the present invention is not intended to be limited to this configuration, and a complete tube shape may also be employed.

Furthermore, helically winding the reinforcing cord 26 is easier in view of production, but a method of winding the reinforcing cords 26 discontinuously in the width direction, or the like may also be considered.

The exemplary embodiment of the present invention has been explained by way of embodiments. However, these embodiments are only examples, and various modifications may be carried out to the extent that the gist is maintained. Also, it is needless to say that the scope of the present invention is not intended to be limited to these embodiments.

Exemplary Embodiment 2-2

Hereinafter, a tire according to an exemplary embodiment 2-2 will be described with reference to the drawings. A tire according to the exemplary embodiment 2-2 of the invention is configured similarly to the tire of the exemplary embodiment 1-2, except in the point that the gas retaining layer 2B of the tire 200 explained with respect to FIG. 5 to FIG. 7 is a gas retaining layer (gas permeability $1.0 \times 10^{-14}$ cm$^3$·cm/(cm$^2$·s·Pa)) constituted with a resin composition formed of a thermoplastic polyamide-based resin (polyamide MX) and a polyolefin-based elastomer (ethylene/butene copolymer). Thus FIG. 5 to FIG. 7 are employed in the following explanation regarding the present exemplary embodiment, and explanation of similar members is omitted.

The gas retaining layer 2B according to the present exemplary embodiment will be described with reference to FIG. 6. The gas retaining layer 2B in the present exemplary embodiment is constituted with a resin composition formed of polyamide MX ("MX06-DA S6011", manufactured by Mitsubishi Gas Chemical Company, Inc.) and a polyolefin-based thermoplastic elastomer ("TAFMER MH7010", manufactured by Mitsui Chemicals, Inc.) (volume ratio: (55:45). The polyamide 6 and the polyolefin-based thermoplastic elastomer may be mixed in a general twin screw kneading-extruder (for example "TEX-30", manufactured by Japan Steel Works Ltd.).

In the present exemplary embodiment, the film thickness of the gas retaining layer 2B is approximately 100 μm, the gas permeability coefficient is $1.0 \times 10^{-14}$ cm$^3$·cm/(cm$^2$·s·Pa), and the stress under a 4% tensile elongation is 38 MPa. The gas retaining layer 2B in FIG. 6 is positioned at the inner side (at the second layer from the innermost side) in the tire radial direction of a crown portion 16; however, the gas retaining layer in the present exemplary embodiment is provided across the entire region of the inner side in the tire radial direction of the tire case 17, including at the side portions 14. The gas retaining layer 2B has a salami structure, such as that illustrated in FIG. 8.

A method for producing a tire of the present exemplary embodiment is similar to that of the 1-2 exemplary embodiment, except in that, in a gas retaining layer forming step in the exemplary embodiment 1-2, when the tire case 17 is positioned in a blow molding machine, a resin composition of the polyamide MX and the polyolefin-based thermoplastic elastomer is extruded from the dies.

(Operation)

The tire 200 of the present exemplary embodiment is formed with the gas retaining layer 2B with gas permeability coefficient of $1.0 \times 10^{-14}$ cm$^3$·cm/(cm$^2$·s·Pa) at the second layer from the innermost side in the tire radial direction of the tire case 17A, that contains the resin composition formed of a thermoplastic polyamide-based resin (polyamide MX) and polyolefin-based elastomer (ethylene/butene copolymer), thereby enabling the gas retaining properties of the tire 200 to be improved while raising the flexibility of the gas retaining layer 2B. Thus when the tire 200 of the present exemplary embodiment is fitted onto the rim 20, the retaining properties to gas filled inside the tire 200 are high.

In the present exemplary embodiment, the gas retaining layer 2B is formed of the thermoplastic polyamide-based resin, that is a thermoplastic polyamide-based resin, and a polyolefin-based elastomer and so increase in weight of the tire 200 is suppressed even when the gas retaining layer 2B is formed, and the adhesiveness (thermal fusing properties) to the tire case 17 formed of a thermoplastic polyamide-based elastomer is also high. Moreover, due to the stress of the gas retaining layer 2B under a 4% tensile elongation being 38 MPa, the durability of the gas retaining layer 2B, such as to impacts to the tire 200, is also high.

In the tire 200 of the present exemplary embodiment, since the tire case 17 is formed of a thermoplastic polyamide-based elastomer, the tire 200 is excellent in heat resistance, tensile elastic modulus, tensile strength, and fracture strain, and moreover weight is also lighter due to the structure being simpler than a conventional rubber-made tire. Accordingly, the tire 10 of the present exemplary embodiment has high abrasion resistance and high durability. Moreover, the melting point of the thermoplastic polyamide-based elastomer configuring the tire case 17 is 162° C., and hence due to, for example, approximately 210° C. being sufficient to perform binding of the tire case pieces 17A, this enables energy consumption to be suppressed, and enables costs for heating to be suppressed. Further, polyamide elastomers have high adhesiveness to the coated cord members 26B.

As such, when the reinforcing cord layer 28 is configured to include the coated cord members 26B, the difference in hardness between the tire case 17 and the reinforcing cord layer 28 can be reduced as compared with the case of fixing the cord member 26A simply using a cushion rubber 29, whereby the coated cord member 26B can be further adhered and fixed to the tire case 17. As a result, incorporation of air described above can be effectively prevented, and the reinforcing cord member can be effectively prevented from moving at the time of driving.

Furthermore, when the cord member 26A is a steel cord, the cord member 26A can be easily separated and collected from the coated cord member 26B by heating at the time of tire disposal. Therefore, it is advantageous in view of the recyclability of the tire 200. Furthermore, since a thermoplastic polyamide-based elastomer has a lower loss factors (Tan δ) as compared with vulcanized rubbers, when the reinforcing cord layer 28 contains a thermoplastic polyamide-based elastomer in large amounts, the rolling property of the tire can be improved. Moreover, a thermoplastic polyamide-based elastomer having a relatively higher elastic modulus compared with vulcanized rubbers, has an advantage in that the elastomer exhibits high in-plane shear rigidity, leading to excellent steering stability at the time of tire driving and excellent abrasion resistance.

In the present method for producing a tire, since the outer circumferential surface 17S of the tire case 17 is roughened before the tire case 17, the cushion rubber 29, and the tread rubber 30A are integrated, the bonding property (adhesion property) is increased owing to an anchor effect. Furthermore, since the resin material that forms the tire case 17 is dug up as a result of the collision of the projection material, wettability of the bonding agent is enhanced. Whereby, the bonding agent is retained in a uniformly applied state on the outer circumferential surface 17S of the tire case 17, and the bonding strength between the tire case 17 and the cushion rubber 29 can thus be secured.

Particularly, even when surface asperities 96 are formed on the outer circumferential surface 17S of the tire case 17, a roughening treatment in the vicinity of the concave sections (concave walls and concave bottoms) is achieved by causing a projection material to collide with the concave sections (gaps 28A). Thus, the bonding strength between the tire case 17 and the cushion rubber 29 can be secured.

On the other hand, since the cushion rubber 29 is superposed within the roughened region of the outer circumferential surface 17S of the tire case 17, the bonding strength between the tire case 17 and the cushion rubber 29 can be effectively secured.

In the vulcanizing step, when the cushion rubber 29 is vulcanized, the cushion rubber 29 flows into the surface-roughened asperities 96 that have been formed on the outer circumferential surface 17S of the tire case 17 by a roughening treatment. After completion of the vulcanization, an anchor effect is exhibited by the cushion rubber 29 that has flown into the surface-roughened asperities 96, and the bonding strength between the tire case 17 and the cushion rubber 29 is enhanced.

In the tire 200 that is produced by such a method for producing a tire, the bonding strength between the tire case 17 and the cushion rubber 29 is secured. In other words, the bonding strength between the tire case 17 and the tread 30 is secured by means of the cushion rubber 29. Thus, on the occasion of driving or the like, separation between the outer circumferential surface 17S of the tire case 17 and the cushion rubber 29 in the tire 200 is suppressed.

Furthermore, since the reinforcing cord layer 28 is formed on an outer circumference of the tire case 17, the resistance to puncture and resistance to cutting are enhanced as compared with the case where an outer circumference is configured to include a member other than the reinforcing cord layer 28.

Furthermore, since the reinforcing cord layer 28 is formed by winding the coated cord member 26B, the rigidity in a circumferential direction of the tire 200 is increased. As the rigidity in a circumferential direction is increased, creeping (a phenomenon in which plastic deformation of the tire case 17 increases with time under a constant stress) in the tire case 17 is suppressed, and pressure resistance against the air pressure from the inner side in the tire radial direction is enhanced.

In the present exemplary embodiment, the outer circumferential surface 17S of the tire case 17 is configured to include surface asperities. However, the present invention is not intended to be limited to this, and the outer circumferential surface 17S may be flat.

Furthermore, in the tire case 17, the reinforcing cord layer may be formed such that the coated cord member that is wound and bonded to the crown portion of the tire case is covered with a thermoplastic material for coating. In this case, the thermoplastic material for coating that is in a molten or softened state may be ejected on the reinforcing cord layer 28, thereby forming a coating layer. Furthermore, a coating layer may be formed by heating a welding sheet to a molten or softened state and pasting the welding sheet on the surface (outer circumferential surface) of the reinforcing cord layer 28, without using an extruder.

In the above described exemplary embodiment 2-2, a configuration in which casing divisions (tire case half parts 17A) are bonded to form the tire case 17 is employed. However, the present invention is not intended to be limited to this configuration, and the tire case 17 may also be formed integrally using a mold or the like.

The tire 200 of the exemplary embodiment 2-2 is a so-called tubeless tire in which an air chamber is formed between the tire 200 and the rim 20 by mounting a bead portion 12 to the rim 20. However, the present invention is not intended to be limited to this configuration, and the tire 200 may also have, for example, a perfect tube shape.

In the exemplary embodiment 2-2, the cushion rubber 29 is disposed between the tire case 17 and the tread 30. However, the present invention is not intended to be limited to this, and a configuration in which the cushion rubber 29 is not disposed may be employed.

In the exemplary embodiment 2-2, a configuration in which the coated cord member 26B is helically wound in the crown portion 16 is employed. However, the present invention is not intended to be limited to this, and a configuration in which the coated cord members 26B are wound discontinuously in the width direction may also be used.

In the exemplary embodiment 2-2, a configuration is employed, in which a thermoplastic material is used as the resin material for coating 27 that forms the coated cord members 26B, and the coated cord member 26B is welded to the outer circumferential surface of the crown portion 16 by melting or softening the resin material for coating 27 by heating. However, the present invention is not intended to be limited to this configuration, and a configuration in which the coated cord member 26B is adhered to the outer circumferential surface of the crown portion 16 by using an adhesive or the like, without heating the resin material for coating 27, may be used.

Furthermore, a configuration in which a thermosetting resin is used as the resin material for coating 27, and the resin material for coating 27 is adhered to the outer circumferential surface of the crown portion 16 by using an adhesive or the like, without heating the coated cord member 26B, may also be used.

Moreover, a configuration in which a thermosetting resin is used as the resin material for coating 27 that forms the coated cord members 26B, and the tire case 17 is formed from a thermoplastic material, may also be employed. In this case, the coated cord members 26B may be adhered to the outer circumferential surface of the crown portion 16 by using an adhesive or the like, or the coated cord member 26B may be welded to the outer circumferential surface of the crown portion 16 after the site in the tire case 17 where the coated cord member 26B is to be arranged has been heated to a molten or softened state.

Also, a configuration in which a thermoplastic material is used as the resin material for coating 27 that forms the coated cord members 26B, and the tire case 17 is formed from a thermoplastic material, may also be employed. In this case, the coated cord member 26B may be adhered to the outer circumferential surface of the crown portion 16 by using an adhesive or the like, or the coated cord member 26B may be welded to the outer circumferential surface of the crown portion 16 by heating the resin material for coating 27 to a molten or softened state, while heating the site in the tire case 17 where the coated cord member 26B is to be arranged, to a molten or softened state. When both the tire case 17 and the coated cord member 26B are heated to a molten or softened state, the bonding strength is increased since both components are highly miscible. Furthermore, in the case of the resin material that forms the tire case 17 as well as the resin material for coating 27 that forms the coated cord members 26B are thermoplastic materials, it is preferable that the thermoplastic materials are of the same kind, and particularly preferably are the same thermoplastic material.

In addition, the front surface of the outer circumferential surface 17S of the tire case 17 that has been subjected to a roughening treatment may be activated by a corona treatment, a plasma treatment or the like to increase hydrophilicity, and then an adhesive may be applied thereon.

Also, the procedures for producing the tire 200 are not intended to be limited to the procedures of the exemplary embodiment 2-2, and may be appropriately modified.

Thus, embodiments of the present invention have been explained by way of exemplary embodiments. However, these embodiments are only examples, and various modifications can be made to the extent that the gist is maintained. Furthermore, it is needless to say that the scope of rights of the present invention is not limited to these exemplary embodiments.

Moreover, although explanation has been given in the exemplary embodiment 2-1 and the exemplary embodiment 2-2 of exemplary embodiments in which reinforcing cord is wound onto the tire case, reinforcing cord is not an essential configuration element of the invention, and configuration may be made without winding reinforcing cord onto the tire case.

Third Exemplary Embodiment

A tire according to a third exemplary embodiment of the invention includes at least a circular tire frame body that is formed from a resin material and has a layered structure, wherein the tire frame body includes at least one gas retaining layer including an ethylene-vinyl alcohol copolymer and an elastomer.

When providing a gas retaining layer in a tire frame body, generally the higher the gas retaining properties of the layer (the gas barrier properties), the more desirable. A material having high gas barrier properties may be employed to raise the gas retaining properties of the gas retaining layer. For example, when, from the viewpoint of weight reduction of the tire, a thermoplastic resin is employed as the material of the gas retaining layer, a thermoplastic resin having high gas barrier properties may be appropriately selected. There is, however, the issue that a thermoplastic resin having high gas barrier properties normally has inversely proportionally low flexibility. Namely, in order to raise the gas barrier properties of a thermoplastic resin, the flexibility of the thermoplastic resin is inversely proportionally lowered. Moreover, when a gas retaining layer is formed using such a thermoplastic resin having low flexibility, a large difference arises in elastic moduli between the gas retaining layer and the tire frame body. It is accordingly anticipated that the gas retaining layer will be more susceptible to coming away from the tire frame body on impact or the like, and more susceptible to cracks developing in the gas retaining layer. Thus such a fall in durability of the gas retaining layer makes a drop in the gas retaining properties (internal pressure retaining properties) of the tire frame body more likely, and it is suspected that it will result a drop in the durability of the tire. The development of a gas retaining layer that is suitably applied to a tire employing a polymer material, and that has ample flexibility while also having high gas retaining properties is accordingly desired.

In the tire of the third exemplary embodiment of the invention, the tire frame body has a layered structure, and includes at least one gas retaining layer. The gas retaining layer includes an ethylene-vinyl alcohol copolymer and an elastomer. Due to the ethylene-vinyl alcohol copolymer being a material with excellent gas barrier properties, equipping the tire frame body with the gas retaining layer in the tire according to the invention enables the gas retaining properties of the tire frame body with respect to gases, such as air, nitrogen gas, or the like, to be improved. Thus a tire according to the invention is capable of being effectively employed in what is referred to as a pneumatic tire, in which the tire frame body is fitted onto a rim, and gas is filled into a void surrounded by the tire frame body and the rim. Raising the gas retaining properties of the tire also, at the same time, raises the internal pressure retaining properties of the tire.

The gas retaining layer includes a ethylene-vinyl alcohol copolymer and an elastomer, thereby enabling the flexibility of the gas retaining layer to be raised compared to cases in which the gas retaining layer is formed by employing a ethylene-vinyl alcohol copolymer alone. This thereby enables damage to the gas retaining layer, such as due to the tire absorbing an external impact or the like, to be suppressed, enabling the durability of the tire to be raised.

A gas retaining layer including an ethylene-vinyl alcohol copolymer and an elastomer also has sufficient strength and adhesiveness, with the advantage of enabling the gas retaining layer to be made thinner.

Moreover, in the tire according to the invention, the gas retaining layer is formed of an ethylene-vinyl alcohol copolymer and an elastomer, and so the gas retaining properties is improved while suppressing an increase in tire weight. The ethylene-vinyl alcohol copolymer also has excellent adhesiveness (thermal fusing properties) to the tire frame body, due to the compatibility to the resin material that forms the tire frame body. The gas retaining layer accordingly has excellent adhesiveness to the resin material that constitutes the tire frame body, enabling the durability and productivity of the tire frame body to be improved.

The content ratio of ethylene in the ethylene-vinyl alcohol copolymer is preferably from 25% by mol to 50% by mol, and is more preferably from 27% by mol to 40% by mol.

A tire of the third exemplary embodiment of the invention may have a content ratio of the elastomer with respect to the ethylene-vinyl alcohol copolymer in a range of from 10% by volume to 48% by volume. Setting the content ratio of the elastomer, with respect to the ethylene-vinyl alcohol copolymer, at from 10% by volume to 48% by volume enables sufficient improvement effect to be obtained in flexibility and durability by being compounded with elastomer while retaining high gas barrier properties.

The content ratio of the elastomer with respect to the ethylene-vinyl alcohol copolymer is more preferably from 25% by volume to 45% by volume.

A tire of the third exemplary embodiment of the invention may employ a thermoplastic elastomer as the elastomer. An increase in weight of the gas retaining layer can be suppressed by employing a thermoplastic elastomer as the elastomer.

A tire of the third exemplary embodiment of the invention may employ a thermoplastic polyolefin-based elastomer as the thermoplastic elastomer. Combining a thermoplastic polyolefin-based elastomer with the ethylene-vinyl alcohol copolymer enables high gas retaining properties, flexibility, and durability, to be imparted to the gas retaining layer.

A tire according to the third exemplary embodiment of the invention may be configured such that the gas retaining layer has a stress under a 4% tensile elongation of 40 MPa or less. Setting the tensile elastic modulus of the gas retaining layer to a stress under a 4% tensile elongation of 40 MPa or less enables sufficient flexibility of the gas retaining layer, and enables it to be close to the elastic modulus of the tire frame body formed by a resin material. This thereby enables cracks to be suppressed from developing in the gas retaining layer, such as due to impacts or the like which is caused by the force applied from the outside, and enables delamination from the tire frame body to be suppressed.

The tensile elastic modulus of the gas retaining layer is more preferably 30 MPa or less.

In the tire of the third exemplary embodiment of the invention, a modified elastomer, or a mixture of a modified elastomer and an unmodified elastomer may be employed as the elastomer. Employing a modified elastomer, or a mixture of a modified elastomer and an unmodified elastomer, as the elastomer enables a fine sea-island structure to be obtained. This thereby enables high gas retaining properties of the gas retaining layer, and enables high flexibility and durability.

A tire of the third exemplary embodiment of the invention may have the gas retaining layer configured with the ethylene-vinyl alcohol copolymer as a sea phase and the elastomer as an island phase, with the ethylene-vinyl alcohol copolymer dispersed in scattered dot shapes within the island phase of the elastomer (a salami structure). Configuring the gas retaining layer by a salami structure enables the gas retaining properties per unit area to be raised while maintaining flexibility in comparison to cases in which, simply, an island phase of elastomer is formed in a sea phase of ethylene-vinyl alcohol copolymer.

A tire according to the third exemplary embodiment of the invention may be configured to employ a thermoplastic resin as the resin material forming the tire frame body.

A tire according to the third exemplary embodiment of the invention may be configured to employ a thermoplastic elastomer as the resin material forming the tire frame body.

Exemplary Embodiment 3-1

Hereinafter, with respect to a third exemplary embodiment of the invention, a tire according to an exemplary embodiment 3-1 will be described with reference to the drawings. A tire 10 of the present exemplary embodiment will be explained. A tire according to the exemplary embodiment 3-1 of the invention is configured similarly to the tire of the exemplary embodiment 1-1, except in the point that the gas retaining layer 2A of the tire 10, explained with reference to FIG. 1 to FIG. 4, is a gas retaining layer formed of an ethylene-vinyl alcohol copolymer (ethylene content ratio: 27% by mol) and two types of polyolefin-based elastomer (ethylene/butene copolymer). Therefore FIG. 1 to FIG. 4 will be employed in the following explanation of the present exemplary embodiment, and explanation of similar members will be omitted.

A tire 10 of the present exemplary embodiment will be explained. In the present exemplary embodiment, a gas retaining layer is configured at the innermost side in the tire radial direction of the tire case 10, and the gas retaining layer is formed of an ethylene-vinyl alcohol copolymer (ethylene content ratio: 27% by mol) and two types of polyolefin-based elastomer (ethylene/butene copolymer).

The gas retaining layer 2A according to the present exemplary embodiment will be described with reference to FIG. 2. The gas retaining layer 2A in the present exemplary embodiment is formed of EVOH (EVOH "L-101", manufactured by Kuraray Co., Ltd. (ethylene content: 27% by mol)), and an acid-modified thermoplastic polyolefin-based elastomer (α-olefin elastomer "MH 7010", manufactured by Mitsui Chemicals, Inc.) and an unmodified thermoplastic polyolefin-based elastomer ("TAFMER A1050", manufactured by Mitsui Chemicals, Inc.) (volume ratio (L-101: MH7010:A1050)=90:5:5). The EVOH and the thermoplastic polyolefin-based elastomer may be mixed in a general twin screw kneading-extruder (for example "TEX-30", manufactured by Japan Steel Works Ltd.).

In the present exemplary embodiment, the film thickness of the gas retaining layer 2A is approximately 100 μm, the gas permeability coefficient is $8.50 \times 10^{-17}$ cm$^3$·cm/(cm$^2$·s·Pa), the elastic modulus is, and the stress under a 4% tensile elongation is 28 MPa. The gas retaining layer 2A in FIG. 2 is positioned at the inner side in the tire radial direction of a crown portion 16, however, in the present exemplary embodiment, the gas retaining layer is provided across the entire region of the inner side in the tire radial direction of the tire case 17, including at the side portions 14.

As illustrated in FIG. 8, employed to explain the exemplary embodiment 2-1, the gas retaining layer 2A has a salami structure composed of EVOH and the thermoplastic polyolefin-based elastomer. As illustrated in FIG. 8, in the present exemplary embodiment, the gas retaining layer 2A has a salami structure that includes a sea phase 3 composed of an ethylene-vinyl alcohol copolymer (EVOH), an island phase 4 composed of a thermoplastic polyolefin-based elastomer (ethylene/butene copolymer), and a pond phase 5 composed of an ethylene-vinyl alcohol copolymer (EVOH). As illustrated in FIG. 8, the pond phase 5 is present as scattered dot shapes in the island phase 4.

A method for producing a tire of the present exemplary embodiment is similar to that of the exemplary embodiment 1-1, except in that, in a gas retaining layer forming step in the exemplary embodiment 1-1, when the tire case 17 is positioned in a blow molding machine, a melted mixture of EVOH described above and thermoplastic polyolefin-based elastomer (two types) is extruded from the dies.

(Operation)

The tire 10 of the present exemplary embodiment is formed with the gas retaining layer 2A at the inner side in the tire radial direction of the tire case 17A, the gas retaining layer 2A is formed of a mixture of an ethylene-vinyl alcohol copolymer (EVOH) and polyolefin-based elastomer (ethylene/butene copolymer (two types)), thereby enabling the gas retaining properties of the tire 10 to be improved while raising the flexibility of the gas retaining layer 2A. Thus when the tire 10 of the present exemplary embodiment is fitted onto the rim 20, the retaining properties to gas filled inside the tire 10 are high.

In the present exemplary embodiment, the gas retaining layer 2A is configured to include the ethylene-vinyl alcohol copolymer (EVOH), and so increase in weight of the tire 10 is suppressed even when the gas retaining layer 2A is formed, and the adhesiveness (thermal fusing properties) to the tire case 17 formed with a thermoplastic polyamide-based elastomer is also high. Moreover, due to the stress of the gas retaining layer 2A under a 4% tensile elongation being 28 MPa, the durability of the gas retaining layer 2A, such as to impacts to the tire 10, is also high.

In the tire 10 of the present exemplary embodiment, since the tire case 17 is formed of a thermoplastic polyamide-based elastomer, the tire 10 is excellent in heat resistance, tensile elastic modulus, tensile strength, and fracture strain, and moreover weight is also lighter due to the structure being simpler than a conventional rubber-made tire. Accordingly, the tire 10 of the present exemplary embodiment has high abrasion resistance and high durability. Moreover, the melting point of the thermoplastic polyamide-based elastomer configuring the tire case 17 is 162° C., and hence due to, for example, approximately 210° C. being sufficient to perform binding of the tire case pieces 17A, this enables energy consumption to be suppressed, and enables costs for heating to be suppressed.

Polyamide elastomers have high adhesiveness to the reinforcing cord 26, and moreover excellent fixing ability, such as welding strength. Therefore, the phenomenon in which air remains (incorporation of air) in the vicinity of the reinforcing cord 26 in the reinforcing cord winding step can be suppressed. When the resin material has high adhesiveness and welding properties to the reinforcing cord 26, and incorporation of air into the vicinity of the reinforcing cord members is suppressed, it is possible to effectively prevent the movement of the reinforcing cord 26 which is caused by the force applied thereto at the time of driving or the like. As a result, for example, since the movement of the reinforcing cord members is suppressed, even in the case where a tire-constituting member is arranged so as to cover the entirety of the reinforcing cord members in an outer circumference of the tire frame, the occurrence of separation or the like between these members (including the tire frame) is suppressed, and durability of the tire 10 is enhanced.

Furthermore, in the tire 10 of the present exemplary embodiment, since the reinforcing cord 26 having a higher rigidity than that of the thermoplastic polyamide-based elastomer is helically wound in a circumferential direction on the outer circumferential surface of the crown portion 16 of the tire case 17 that is formed of the thermoplastic resin material, the resistance to puncture, resistance to cutting, and rigidity in a circumferential direction of the tire are enhanced. In addition, as the rigidity in a circumferential direction of the tire 10 is enhanced, creeping in the tire case 17 formed of the thermoplastic resin material is prevented.

Since, in the cross-sectional view dissected along the axial direction of the tire case 17 (cross-section illustrated in FIG. 1), at least a portion of the reinforcing cord 26 is embedded in the outer circumferential surface of the crown portion 16 of the tire case 17 formed of a thermoplastic polyamide-based elastomer, and the reinforcing cord is adhering to the thermoplastic polyamide-based elastomer, incorporation of air at the time of production is suppressed, and the movement of the reinforcing cord 26 caused by the force applied thereto at the time of driving or the like is prevented. As a result, the occurrence of separation or the like of the reinforcing cord 26, tire case 17 and tread 30 is suppressed, and durability of the tire 10 is enhanced.

As illustrated in FIG. 3, since the depth L of embedding of the reinforcing cord 26 is ⅕ or more of the diameter D, incorporation of air at the time of production is effectively suppressed, and the movement of the reinforcing cord 26 caused by the force applied thereto at the time of driving or the like is further suppressed.

As such, when the reinforcing cord layer 28 is composed by including a thermoplastic polyamide-based elastomer, the difference in hardness between the tire case 17 and the reinforcing cord layer 28 can be made small as compared with the case of fixing the reinforcing cord 26 using a cushion rubber, and therefore, the reinforcing cords 26 can be further adhered and fixed to the tire case 17. As a result, the incorporation of air described above can be effectively prevented, and the reinforcing cord members can be effectively prevented from moving around at the time of driving.

Furthermore, when the reinforcing cord 26 is a steel cord, since the reinforcing cord 26 can be easily separated and collected from the thermoplastic polyamide-based elastomer by heating at the time of disposal of the tire, it is advantageous in view of the recyclability of the tire 10.

Furthermore, since the polyamide-based thermoplastic elastomer has a lower loss factors (Tan δ) as compared with vulcanized rubbers, the rolling property of the tire can be enhanced when the reinforcing cord 28 contains a large proportion of a thermoplastic polyamide-based elastomer.

Moreover, the thermoplastic polyamide-based elastomer has an advantage in that the elastomer has high in-plane shear rigidity, leading to excellent steering stability at the time of driving the tire and excellent abrasion resistance.

Since the tread 30 that is brought into contact with the road surface is formed of a rubber material having a higher abrasion resistance than the thermoplastic polyamide-based elastomer, abrasion resistance of the tire 10 is enhanced.

Furthermore, since the annular bead core 18 formed of a metal material is embedded in the bead portion 12, the tire case 17, that is, the tire 10, is maintained rigid against the rim 20, similarly to the conventional pneumatic tires made of rubber.

Also, since a sealing layer 24 which is formed of a rubber material and has a higher sealing property than the thermoplastic polyamide-based elastomer, is provided at the area of the bead portion 12 which is in contact with the rim 20, the sealing property between the tire 10 and the rim 20 is enhanced. Therefore, as compared with the case of sealing the rim 20 with a thermoplastic polyamide-based elastomer, air leakage in the tire is further suppressed. Also, as the sealing layer 24 is provided, rim fittability is also enhanced.

In the above exemplary embodiment, the reinforcing cord 26 is heated, and the thermoplastic polyamide-based elastomer at the area that is brought into contact with the heated reinforcing cord 26 is melted or softened. However, the present invention is not intended to be limited to this configuration, and it is also acceptable to adopt a configuration in which the reinforcing cord 26 is not heated, but the outer circumferential surface of the crown portion 16 where the reinforcing cord 26 is to be embedded is heated using a hot air generating apparatus, followed by embedding the reinforcing cord 26 in the crown portion 16.

In the exemplary embodiment 3-1, the heat source of the cord heating device 59 includes a heater and a fan. However, the present invention is not limited to this configuration, and a configuration in which the reinforcing cord 26 is directly heated by radiant heat (for example, infrared radiation) may be adopted.

In the configuration of the exemplary embodiment 3-1, the area of the thermoplastic resin material having the reinforcing cord 26 embedded therein which has been melted or softened, is forcibly cooled using a second roller 64 made of a metal. However, the present invention is not intended to be limited to this configuration, and a configuration in which cold air is directly blown to the area where the thermoplastic resin material has been melted or softened, to forcibly cool and solidify the area where the thermoplastic resin material has been melted or softened, may also be adopted.

In the configuration of the exemplary embodiment 3-1, the reinforcing cord 26 is heated. However, for example, a configuration in which an outer circumference of the reinforcing cord 26 is coated with the same thermoplastic resin material as that used in the tire case 17 may also be adopted. In this case, when the coated reinforcing cord is wound around the crown portion 16 of the tire case 17, the thermoplastic resin material that is coating the reinforcing cord is also heated together with the reinforcing cord 26, whereby incorporation of air at the time of embedding in the crown portion 16 can be effectively suppressed.

The tire 10 of the exemplary embodiment 3-1 is a so-called tubeless tire in which an air chamber is formed between the tire 10 and the rim 20 by mounting the bead portion 12 on the rim 20. However, the present invention is not intended to be limited to this configuration, and a complete tube shape may also be employed.

Furthermore, helically winding the reinforcing cord 26 is easier in view of production, but a method of winding the reinforcing cords 26 discontinuously in the width direction, or the like may also be considered.

The exemplary embodiment of the present invention has been explained by way of embodiments. However, these embodiments are only examples, and various modifications may be carried out to the extent that the gist is maintained. Also, it is needless to say that the scope of the present invention is not intended to be limited to these embodiments.

Exemplary Embodiment 3-2

Hereinafter, a tire according to an exemplary embodiment 3-2 will be described with reference to the drawings. A tire according to the exemplary embodiment 3-2 of the invention is configured similarly to the tire of the exemplary embodiment 1-2, except in the point that the gas retaining layer 2B of the tire 200 explained with respect to FIG. 5 to FIG. 7 is a gas retaining layer constituted with an ethylene-vinyl alcohol copolymer (ethylene content ratio: 27% by mol) and a polyolefin-based elastomer (ethylene/butene copolymer). Thus FIG. 5 to FIG. 7 are employed in the following explanation regarding the present exemplary embodiment, and explanation of similar members is omitted.

The gas retaining layer 2B according to the present exemplary embodiment will be described with reference to FIG. 6. The gas retaining layer 2B in the present exemplary embodiment is constituted with EVOH (EVOH "L-101", manufactured by Kuraray Co., Ltd. (ethylene content: 27% by mol)), and a polyolefin-based thermoplastic elastomer (α-olefin elastomer "MH 7010", manufactured by Mitsui Chemicals, Inc.) (volume ratio: 55:45). The polyamide 6 and the polyolefin-based thermoplastic elastomer may be mixed in a general twin screw kneading-extruder (for example "TEX-30", manufactured by Japan Steel Works Ltd.).

In the present exemplary embodiment, the film thickness of the gas retaining layer 2B is approximately 100 μm, the gas permeability coefficient is $2.0 \times 10^{-13}$ cm$^3$·cm/(cm$^2$·s·Pa), the elastic modulus is, and the stress under a 4% tensile elongation is 28 MPa. The gas retaining layer 2B in FIG. 6 is positioned at the inner side in the tire radial direction of a crown portion 16; however, the gas retaining layer in the present exemplary embodiment is provided across the entire region of the inner side in the tire radial direction of the tire case 17, including at the side portions 14. The gas retaining layer 2B has a salami structure, such as that illustrated in FIG. 8.

A manufacturing method of a tire of the present exemplary embodiment is similar to that of the 1-2 exemplary embodiment, except in that, in a gas retaining layer forming step in the exemplary embodiment 1-2, when the tire case 17 is positioned in a blow molding machine, a resin composition of the EVOH and the polyolefin-based thermoplastic elastomer is extruded from the dies.

(Operation)

The tire 200 of the present exemplary embodiment is formed with the gas retaining layer 2B at the second layer from the innermost side in the tire radial direction of the tire case 17A, that is formed of a mixture of ethylene-vinyl alcohol copolymer (EVOH) and polyolefin-based elastomer (ethylene/butene copolymer), thereby enabling the gas retaining properties of the tire 200 to be improved while raising the flexibility of the gas retaining layer 2B. Thus when the tire 200 of the present exemplary embodiment is fitted onto the rim 20, the retaining properties to gas filled inside the tire 200 are high.

In the present exemplary embodiment, the gas retaining layer 2B is formed of the ethylene-vinyl alcohol copolymer, that is an ethylene-vinyl alcohol copolymer, and a polyolefin-based elastomer and so increase in weight of the tire 200 is suppressed even when the gas retaining layer 2B is formed, and the adhesiveness (thermal fusing properties) to the tire case 17 formed with a thermoplastic polyamide-based elastomer is also high. Moreover, due to the stress of the gas retaining layer 2B under a 4% tensile elongation being 28 MPa, the durability of the gas retaining layer 2B, such as to impacts to the tire 200, is also high.

In the tire 200 of the present exemplary embodiment, since the tire case 17 is formed of a thermoplastic polyamide-based elastomer, the tire 200 is excellent in heat resistance, tensile elastic modulus, tensile strength, and fracture strain, and moreover weight is also lighter due to the structure being simpler than a conventional rubber-made tire. Accordingly, the tire 10 of the present exemplary embodiment has high abrasion resistance and high durability. Moreover, the melting point of the thermoplastic polyamide-based elastomer configuring the tire case 17 is 162° C., and hence due to, for example, approximately 210° C. being sufficient to perform binding of the tire case pieces 17A, this enables energy consumption to be suppressed, and enables costs for heating to be suppressed. Further, polyamide elastomers have high adhesiveness to the coated cord members 26B.

As such, when the reinforcing cord layer 28 is configured to include the coated cord members 26B, the difference in hardness between the tire case 17 and the reinforcing cord layer 28 can be reduced as compared with the case of fixing the cord member 26A simply using a cushion rubber 29, whereby the coated cord member 26B can be further adhered and fixed to the tire case 17. As a result, incorporation of air described above can be effectively prevented, and the reinforcing cord member can be effectively prevented from moving at the time of driving.

Furthermore, when the cord member 26A is a steel cord, the cord member 26A can be easily separated and collected from the coated cord member 26B by heating at the time of tire disposal. Therefore, it is advantageous in view of the recyclability of the tire 200. Furthermore, since a thermoplastic polyamide-based elastomer has a lower loss factors (Tan δ) as compared with vulcanized rubbers, when the reinforcing cord layer 28 contains a thermoplastic polyamide-based elastomer in large amounts, the rolling property of the tire can be improved. Moreover, the thermoplastic polyamide-based elastomer has an advantage in that it has high in-plane shear rigidity, leading to excellent steering stability at the time of driving the tire and excellent abrasion resistance.

In the present method for producing a tire, since the outer circumferential surface 17S of the tire case 17 is roughened before the tire case 17, the cushion rubber 29, and the tread rubber 30A are integrated, the bonding property (adhesion property) is increased owing to an anchor effect. Furthermore, since the resin material that forms the tire case 17 is dug up as a result of the collision of the projection material, wettability of the bonding agent is enhanced. Whereby, the bonding agent is retained in a uniformly applied state on the outer circumferential surface 17S of the tire case 17, and the bonding strength between the tire case 17 and the cushion rubber 29 can thus be secured.

Particularly, even when surface asperities 96 are formed on the outer circumferential surface 17S of the tire case 17, a roughening treatment in the vicinity of the concave sections (concave walls and concave bottoms) is achieved by causing a projection material to collide with the concave sections (gaps 28A). Thus, the bonding strength between the tire case 17 and the cushion rubber 29 can be secured.

On the other hand, since the cushion rubber 29 is superposed within the roughened region of the outer circumferential surface 17S of the tire case 17, the bonding strength between the tire case 17 and the cushion rubber can be effectively secured.

In the vulcanizing step, when the cushion rubber 29 is vulcanized, the cushion rubber 29 flows into the surface-roughened asperities 96 that have been formed on the outer circumferential surface 17S of the tire case 17 by a roughening treatment. After completion of the vulcanization, an anchor effect is exhibited by the cushion rubber 29 that has flown into the surface-roughened asperities 96, and the bonding strength between the tire case 17 and the cushion rubber 29 is enhanced.

In the tire 200 that is produced by such a method for producing a tire, the bonding strength between the tire case 17 and the cushion rubber 29 is secured. In other words, the bonding strength between the tire case 17 and the tread 30 is secured by means of the cushion rubber 29. Thus, on the occasion of driving or the like, separation between the outer circumferential surface 17S of the tire case 17 and the cushion rubber 29 in the tire 200 is suppressed.

Furthermore, since the reinforcing cord layer 28 is formed on an outer circumference of the tire case 17, the resistance to puncture and resistance to cutting are enhanced as compared with the case where an outer circumference is configured to include a member other than the reinforcing cord layer 28.

Furthermore, since the reinforcing cord layer 28 is formed by winding the coated cord member 26B, the rigidity in a circumferential direction of the tire 200 is increased. As the rigidity in a circumferential direction is increased, creeping (a phenomenon in which plastic deformation of the tire case 17 increases with time under a constant stress) in the tire case 17 is suppressed, and pressure resistance against the air pressure from the inner side in the tire radial direction is enhanced.

In the present exemplary embodiment, the outer circumferential surface 17S of the tire case 17 is configured to have surface asperities. However, the present invention is not intended to be limited to this, and the outer circumferential surface 17S may be flat.

Furthermore, in the tire case 17, the reinforcing cord layer may be formed such that the coated cord member that is wound and bonded to the crown portion of the tire case is covered with a thermoplastic material for coating. In this case, the thermoplastic material for coating that is in a molten or softened state may be ejected on the reinforcing cord layer 28, thereby forming a coating layer. Furthermore, a coating layer may be formed by heating a welding sheet to a molten or softened state and pasting the welding sheet on the surface (outer circumferential surface) of the reinforcing cord layer 28, without using an extruder.

In the above described exemplary embodiment 3-2, a configuration in which casing divisions (tire case half parts 17A) are bonded to form the tire case 17 is employed. However, the present invention is not intended to be limited to this configuration, and the tire case 17 may also be formed integrally using a mold or the like.

The tire 200 of the exemplary embodiment 3-2 is a so-called tubeless tire in which an air chamber is formed between the tire 200 and the rim 20 by mounting a bead portion 12 to the rim 20. However, the present invention is not intended to be limited to this configuration, and the tire 200 may also have, for example, a perfect tube shape.

In the exemplary embodiment 3-2, the cushion rubber 29 is disposed between the tire case 17 and the tread 30. However, the present invention is not intended to be limited to this, and a configuration in which the cushion rubber 29 is not disposed may be employed.

In the exemplary embodiment 3-2, a configuration in which the coated cord member 26B is helically wound in the crown portion 16 is employed. However, the present invention is not intended to be limited to this, and a configuration in which the coated cord members 26B are wound discontinuously in the width direction may also be used.

In the exemplary embodiment 3-2, a configuration is employed, in which a thermoplastic material is used as the resin material for coating 27 that forms the coated cord members 26B, and the coated cord member 26B is welded to the outer circumferential surface of the crown portion 16 by melting or softening the resin material for coating 27 by heating. However, the present invention is not intended to be limited to this configuration, and a configuration in which the coated cord member 26B is adhered to the outer circumferential surface of the crown portion 16 by using an adhesive or the like, without heating the resin material for coating 27, may be used.

Furthermore, a configuration in which a thermosetting resin is used as the resin material for coating 27, and the resin material for coating 27 is adhered to the outer circumferential surface of the crown portion 16 by using an adhesive or the like, without heating the coated cord member 26B, may also be used.

Moreover, a configuration in which a thermosetting resin is used as the resin material for coating 27 that forms the coated cord members 26B, and the tire case 17 is formed from a thermoplastic material, may also be employed. In this case, the coated cord members 26B may be adhered to the outer circumferential surface of the crown portion 16 by using an adhesive or the like, or the coated cord member 26B may be welded to the outer circumferential surface of the crown portion 16 after the site in the tire case 17 where the coated cord member 26B is to be arranged has been heated to a molten or softened state.

Also, a configuration in which a thermoplastic material is used as the resin material for coating 27 that forms the coated cord members 26B, and the tire case 17 is formed from a thermoplastic material, may also be employed. In this case, the coated cord member 26B may be adhered to the outer circumferential surface of the crown portion 16 by using an adhesive or the like, or the coated cord member 26B may be welded to the outer circumferential surface of the crown portion 16 by heating the resin material for coating 27 to a molten or softened state, while heating the site in the tire case 17 where the coated cord member 26B is to be arranged, to a molten or softened state. When both the tire case 17 and the coated cord member 26B are heated to a molten or softened state, the bonding strength is increased since both components are highly miscible. Furthermore, in the case of the resin material that forms the tire case 17 as well as the resin material for coating 27 that forms the coated cord members 26B are thermoplastic materials, it is preferable that the thermoplastic materials are of the same kind, and particularly preferably are the same thermoplastic material.

In addition, the front surface of the outer circumferential surface 17S of the tire case 17 that has been subjected to a roughening treatment may be activated by a corona treatment, a plasma treatment or the like to increase hydrophilicity, and then an adhesive may be applied thereon.

Also, the procedures for producing the tire 200 are not intended to be limited to the procedures of the exemplary embodiment 3-2, and may be appropriately modified.

Thus, embodiments of the present invention have been explained by way of exemplary embodiments. However, these embodiments are only examples, and various modifications can be made to the extent that the gist is maintained. Furthermore, it is needless to say that the scope of rights of the present invention is not limited to these exemplary embodiments.

Moreover, although explanation has been given in the exemplary embodiment 3-1 and the exemplary embodiment 3-2 of exemplary embodiments in which reinforcing cord is wound onto the tire case, reinforcing cord is not an essential configuration element of the invention, and configuration may be made without winding reinforcing cord onto the tire case.

Specific embodiments of the present invention have been described above by way of the first to the third exemplary embodiments, but the present invention is not intended to be limited to the embodiments described above.

EXAMPLES

Hereinbelow, the present invention will be more specifically explained by way of Examples. However, the present invention is not intended to be limited to these.

Example 1

First, various tires of the Examples and Comparative Example shown in the following Table 1 were molded according to the first exemplary embodiment and the exemplary embodiment 1-2 described above. The obtained tires of each of the Examples included a gas retaining layer, either as the innermost layer or as the second layer from the innermost side. A gas retaining layer was not provided to the tire in the Comparative Example 1-1. The internal pressure retaining properties (gas retaining properties) of each of the obtained tires were measured according to the following description.

The gas permeability coefficient of the gas retaining layer, for each material, was measured using the gas permeability measuring apparatus "GTR-30X", manufactured by GTE Tech Corporation, under conditions of cell temperature: 80° C., and absolute pressure difference: 0.30 Pa. Moreover, for the tensile elastic modulus of the gas retaining layer, a tensile test was performed according to JIS K6404-3, and the elastic modulus measured from the slope of the stress-strain curve over a linear elastic range of strain from 0% to 4%. A film thickness of 300 μm was employed as the resin sample when this was performed.

[Evaluation of Internal Pressure Retaining Properties]

Molded tires were fitted onto rims, and air filled into the tires until the internal pressure was 0.3 MPa. The obtained tires were left for 3 months in a temperature and humidity controlled tank in which the environment was maintained at 40° C./50% RH. The internal pressure was measured after each elapsed month, and the rate of fall in internal pressure measured in units of months. The monthly average rate of fall in internal pressure was computed from the obtained results, and the internal pressure retaining properties of the tires evaluated according to the following criteria.

(Criteria)

A: rate of fall in internal pressure is 0.002 MPa/month or less.

B: rate of fall in internal pressure is greater than 0.002 MPa/month, up to and including 0.005 MPa/month.

C: rate of fall in internal pressure is greater than 0.005 MPa/month, up to and including 0.009 MPa month.

D: rate of fall in internal pressure is greater than 0.009 MPa/month.

TABLE 1

|  |  | Example 1-1 | Example 1-2 | Example 1-3 | Example 1-4 | Example 1-5 | Example 1-6 | Example 1-7 | Example 1-8 | Comparative Example 1-1 |
|---|---|---|---|---|---|---|---|---|---|---|
| Gas Retaining Layer | Position | Innermost Layer | Innermost Layer | Innermost Layer | Innermost Layer | Second Layer | Second Layer | Second Layer | Second Layer | — |
|  | Material | Polyamide 6 | Polyamide MX | EVOH-A | EVOH-B | Polyamide 6 | Polyamide MX | EVOH-A | EVOH-B | — |
|  | Film Thickness | 100 μm | 100 μm | 100 μm | 100 μm | 100 μm | 100 μm | 100 μm | 100 μm | — |
|  | Gas Permeability Coefficient | 2.00E−15 | 6.00E−16 | 1.00E−17 | 5.00E−16 | 2.00E−15 | 6.00E−16 | 1.00E−17 | 5.00E−16 | — |
|  | Tensile Elastic Modulus | 33 | 61 | 42 | 35 | 33 | 61 | 42 | 35 | — |
| Tire Case Evaluation | Material | PA1 | PA1 | PA1 | PA1 | PA1 | PA1 | PA1 | PA1 | PA1 |
|  | Internal Pressure Retaining Properties | B | B | A | B | B | B | A | B | C |

Polyamide 6: "UBE Nylon 1022B", manufactured by Ube Industries, Ltd. (melting point 220° C., glass transition temperature 48° C.)
Polyamide MX: "MX Nylon-S S6011", manufactured by Mitsubishi Gas Chemical Company, Inc. (melting point 237° C., glass transition temperature 85° C.)
EVOH-A: "EVAL L-101", manufactured by Kuraray Co., Ltd. (ethylene content 27% by mol, melting point 191° C., glass transition temperature 72° C.)
EVOH-B: "EVAL E-105", manufactured by Kuraray Co., Ltd. (ethylene content 44% by mol, melting point 165° C., glass transition temperature 55° C.)
PA1: thermoplastic polyamide-based elastomer ("UBESTA XPA9055X1", manufactured by Ube Industries, Ltd., melting point 162° C.)
gas permeability coefficient (unit): $cm^3 \cdot cm/(cm^2 \cdot s \cdot Pa)$
tensile elastic modulus (unit): MPa As is apparent from Table 1, the internal pressure retaining properties for the tires of all of the Examples was "B" or above, and excellent internal pressure retaining properties are seen. It is accordingly apparent that the tires of the Examples had excellent air retaining properties. In contrast thereto, the tire of Comparative Example 1 had internal pressure retaining properties of "C", and inferior internal pressure retaining properties to those of the tires including the gas retaining layer.

Example 2

Various tires of the Examples including as the innermost layer the gas retaining layers shown in the following Table 2 were molded according to the exemplary embodiment 2-1 as described above. The internal pressure retaining properties (gas retaining properties) of each of the obtained tires and the gas permeability coefficient of the gas retaining layer were measured under substantially similar conditions to the Example 1.

[Durability]

Molded tires were fitted onto rims, and then, after running for 100,000 km on a drum test machine at standard internal pressure and standard loading, the state of the gas retaining layer was observed by visual inspection, and evaluated according to the following criteria.

(Criteria)

A: absolutely no cracking of the gas retaining layer, or coming away from the frame body, was observed.

B: although no complete cracking or coming away was observed, some locations were observed where it looks likely that there will cracking of the gas retaining layer, or coming away from the frame body.

C: some cracking of the gas retaining layer, or coming away from the frame body, was observed, but not at a level to cause problems with safety during running.

D: multiple instances of cracking of the gas retaining layer, or coming away from the frame body, were observed.

TABLE 2

|  |  |  | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Gas Retaining Layer | Position | | Innermost Layer | Innermost Layer | Innermost Layer | Innermost Layer | Innermost Layer | Innermost Layer | Innermost Layer | Innermost Layer |
|  | Compounding Content (% by volume) of Resin Composition Forming Gas Retaining Layer | Polyamide 6 | 90.0 | 80.0 | 65.0 | — | — | — | 100.0 | — |
|  |  | MX Polyamide | — | — | — | 90.0 | 80.0 | 95.0 | — | 100.0 |
|  |  | TAFMER A | 5.0 | 10.0 | 17.5 | 5.0 | 10.0 | 17.5 | — | — |
|  |  | TAFMER M | 5.0 | 10.0 | 17.5 | 5.0 | 10.0 | 17.5 | — | — |
|  | Physical Properties | Gas Permeability Coefficient of Gas Retaining Layer | 5.00E−15 | 8.00E−15 | 2.00E−14 | 9.00E−16 | 2.00E−15 | 8.00E−15 | 2.00E−15 | 6.00E−16 |
|  |  | Salami Structure | Yes | Yes | Yes | Yes | Yes | Yes | No | No |
|  |  | Tensile Elastic Modulus Of Gas Retaining Layer | 28 | 22 | 19 | 50 | 43 | 31 | 33 | 61 |
|  |  | Gas Retaining Layer Thickness | 100 μm | 100 μm | 100 μm | 100 μm | 100 μm | 100 μm | 100 μm | 100 μm |

TABLE 2-continued

| | | Example | | | | | | | |
|---|---|---|---|---|---|---|---|---|---|
| | | 2-1 | 2-2 | 2-3 | 2-4 | 2-5 | 2-6 | 2-7 | 2-8 |
| Tire Case Evaluation | Material | PA1 | PA1 | PA1 | PA1 | PA1 | PA1 | PA1 | PA1 |
| | Internal Pressure Retaining Properties | A | B | B | A | A | B | B | B |
| | Durability | B | A | A | B | B | A | C | C |

Figure 9:
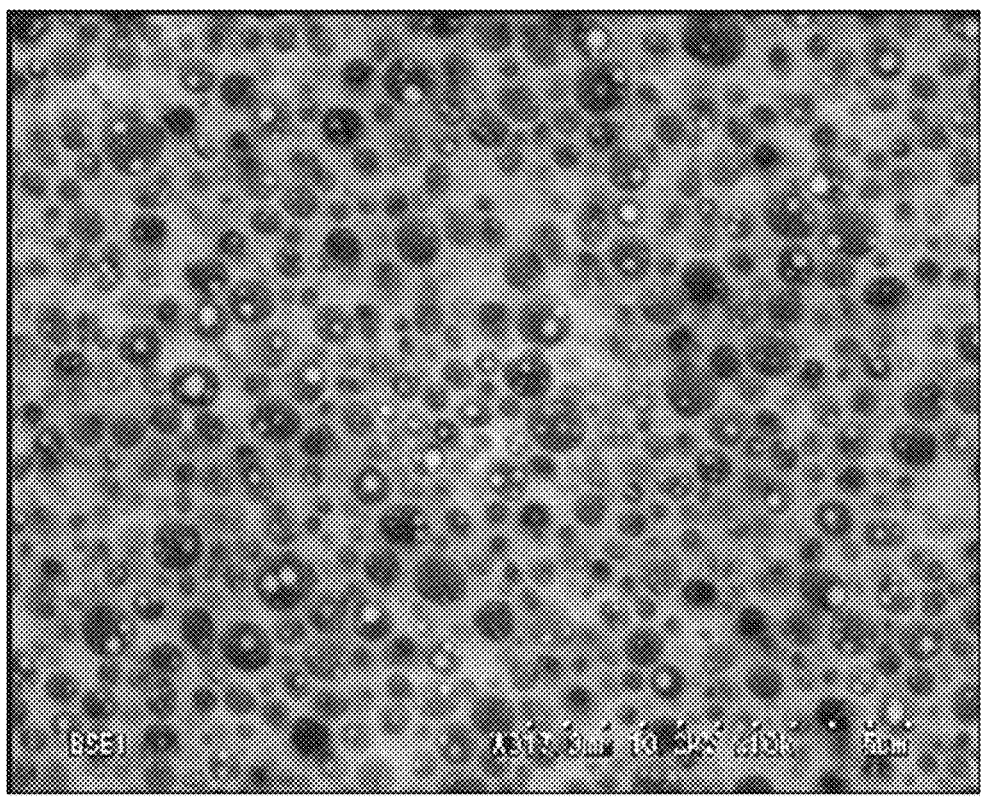
FIG. 9 is an SEM image showing a structure of a gas retaining layer according to an exemplary embodiment 2-1.

Polyamide 6: "UBE Nylon 1022B", manufactured by Ube Industries, Ltd. (melting point 220° C., glass transition temperature 48° C.)
MX Polyamide: "MX Nylon-S S6011", manufactured by Mitsubishi Gas Chemical Company, Inc. (melting point 237° C., glass transition temperature 85° C.)
TAFMER A: "TAFMER A1050", manufactured by Mitsui Chemicals, Inc. (unmodified α polyolefin elastomer, glass transition temperature −70° C.)
TAFMER M: "TAFMER MH7010", manufactured by Mitsui Chemicals, Inc. (unmodified α polyolefin elastomer, glass transition temperature −65° C.)
PA1: polyamide-based thermoplastic elastomer ("UBESTA XPA9055X1", manufactured by Ube Industries, Ltd., melting point 162° C.)
gas permeability coefficient (unit): $cm^3 \cdot cm/(cm^2 \cdot s \cdot Pa)$
tensile elastic modulus (unit): MPa The structure of the gas retaining layer of Example 2-1 was observed using a scanning electron microscope (SEM: device name "S-3000M", manufactured by Hitachi Ltd.), and confirmed to have a salami structure. An SEM image of the gas retaining layer of Example 2-1 is illustrated in FIG. 9.

As is apparent from Table 2, in the Examples 2-1 to 2-6 in which an elastomer was employed in combination with a thermoplastic polyamide-based resin in the gas retaining layer of $2.0 \times 10^{-14}$ $cm^3 \cdot cm/(cm^2 \cdot s \cdot Pa)$ or less, it is apparent that both the internal pressure retaining properties and the durability were excellent. In contrast thereto, in the Examples 2-7 to 2-8 in which thermoplastic polyamide-based resin was employed alone, it is apparent that although the internal pressure retaining properties was sufficient, the durability was inferior to that of the Examples 2-1 to 2-6. It is accordingly apparent that the air retaining properties of the tires of the Examples were excellent.

Example 3

Various tires of the Examples shown in the following Table 3 were molded according to the exemplary embodiment 3-1 as described above. The internal pressure retaining properties (gas retaining properties) of each of the obtained tires and the gas permeability coefficient of the gas retaining layer were measured under substantially similar conditions to the Example 2.

TABLE 3

| | | | Examples | | | | | | | |
|---|---|---|---|---|---|---|---|---|---|---|
| | | | 3-1 | 3-2 | 3-3 | 3-4 | 3-5 | 3-6 | 3-7 | 3-8 |
| Gas Retaining Layer | Position | | Innermost Layer | Innermost Layer | Innermost Layer | Innermost Layer | Innermost Layer | Innermost Layer | Innermost Layer | Innermost Layer |
| | Compounding Content (% by Volume) of Resin Composition Forming Gas Retaining Layer | EVOH-A | 90.0 | 80.0 | 65.0 | — | — | — | 100.0 | — |
| | | EVOH-B | — | — | — | 90.0 | 80.0 | 95.0 | — | 100.0 |
| | | TAFMER A | 5.0 | 10.0 | 17.5 | 5.0 | 10.0 | 17.5 | — | — |
| | | TAFMER M | 5.0 | 10.0 | 17.5 | 5.0 | 10.0 | 17.5 | — | — |
| | Physical Properties | Gas Permeability Coefficient of Gas Retaining Layer | 8.50E−17 | 1.00E−16 | 3.00E−16 | 9.00E−16 | 2.00E−15 | 8.00E−15 | 1.00E−17 | 5.00E−16 |
| | | Salami Structure | Yes | Yes | Yes | Yes | Yes | Yes | No | No |
| | | Tensile Elastic Modulus Of Gas Retaining Layer | 38 | 35 | 28 | 32 | 28 | 23 | 42 | 35 |
| | | Gas Retaining Layer Thickness | 100 μm | 100 μm | 100 μm | 100 μm | 100 μm | 100 μm | 100 μm | 100 μm |
| Tire Case Evaluation | Material | | PA1 | PA1 | PA1 | PA1 | PA1 | PA1 | PA1 | PA1 |
| | Internal Pressure Retaining Properties | | A | B | B | A | A | B | A | B |
| | Durability | | B | A | A | B | B | A | C | C |

Figure 10:
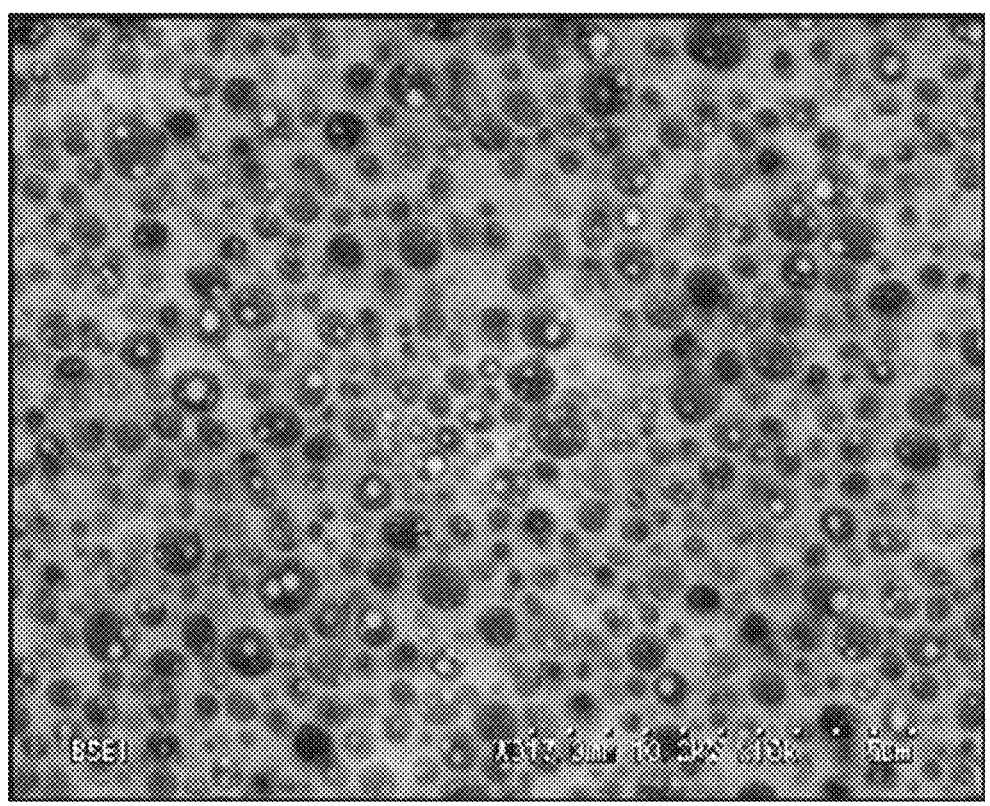
FIG. 10 is an SEM image showing a structure of a gas retaining layer according to an exemplary embodiment 3-1.

EVOH-A: "EVAL L-101", manufactured by Kuraray Co., Ltd. (ethylene content 27% by mol, melting point 191° C., glass transition temperature 72° C.)
EVOH-B: "EVAL G-156", manufactured by Kuraray Co., Ltd. (ethylene content 47% by mol, melting point 157° C., glass transition temperature 50° C.)
TAFMER A: "TAFMER A1050", manufactured by Mitsui Chemicals, Inc. (unmodified α polyolefin elastomer, glass transition temperature −70° C.)
TAFMER M: "TAFMER MH7010", manufactured by Mitsui Chemicals, Inc. (unmodified α polyolefin elastomer, glass transition temperature −65° C.)
PA1: polyamide-based thermoplastic elastomer ("UBESTA XPA9055X1", manufactured by Ube Industries, Ltd., melting point 162° C.)
gas permeability coefficient (unit): $cm^3 \cdot cm/(cm^2 \cdot s \cdot Pa)$
tensile elastic modulus (unit): MPa The structure of the gas retaining layer of Examples 1 was observed using a Scanning Electron Microscope (SEM: device name "S-3000M", manufactured by Hitachi Ltd.), and confirmed to have a salami structure. An SEM image of the gas retaining layer of Example 3-1 is illustrated in FIG. 10.

As is apparent from Table 3, in the Examples 3-1 to 3-6 in which an elastomer was employed in combination with an ethylene-vinyl alcohol copolymer in the gas retaining layer, that both the internal pressure retaining properties and the durability were excellent. In contrast thereto, in the Examples 3-7 to 3-8 in which ethylene-vinyl alcohol copolymer was employed alone, it is apparent that although the internal pressure retaining properties was sufficient, the durability was inferior to that of the Examples 3-1 to 3-6. It is accordingly apparent that the air retaining properties of the tires of the Examples were excellent.

The disclosures of Japanese Patent Application Nos. 2012-29912, 2012-29913, and 2012-29914 are incorporated by reference within the present specification.

The invention claimed is:

1. A tire comprising:
at least a circular tire frame body that is formed from a resin material and has a layered structure, wherein the tire frame body includes at least one gas retaining layer, the gas retaining layer includes an ethylene-vinyl alcohol copolymer and an elastomer, and the gas retaining layer is configured with the ethylene-vinyl alcohol copolymer as a sea phase, and the elastomer as an island phase, with ethylene-vinyl alcohol copolymer dispersed in scattered dot shapes within the island phase of the elastomer.

2. The tire according to claim 1, wherein the gas retaining layer has a gas permeability coefficient of $2.0 \times 10^{-15}$ cm$^3 \cdot$cm/(cm$^2 \cdot$s$\cdot$Pa) or less at 80° C.

3. The tire according to claim 1, wherein a stress of the gas retaining layer under a 4% tensile elongation is 70 MPa or less.

4. The tire according to claim 1, wherein a content ratio of the elastomer with respect to the ethylene-vinyl alcohol copolymer in the sea phase is from 10% by mass to 48% by mass.

5. The tire according to claim 1, wherein the elastomer is a thermoplastic elastomer.

6. The tire according to claim 5, wherein the thermoplastic elastomer is a polyolefin-based thermoplastic elastomer.

7. The tire according to claim 1, wherein a stress of the gas retaining layer under a 4% tensile elongation is 40 MPa or less.

8. The tire according to claim 1, wherein the elastomer is a modified elastomer, or a mixture of a modified elastomer and an unmodified elastomer.

9. The tire according to claim 1, wherein the resin material forming the tire frame body is a thermoplastic resin.

10. The tire according to claim 9, wherein the thermoplastic resin is a thermoplastic elastomer.

* * * * *